United States Patent [19]

Nakanishi et al.

[11] Patent Number: 5,204,715
[45] Date of Patent: Apr. 20, 1993

[54] RANGE-FINDING-DIRECTION-CHANGEABLE-CAMERA

[75] Inventors: Kazuhiro Nakanishi; Takemi Miyazaki; Kenichi Iwaida; Hironobu Mikoshiba, all of Hachioji, Japan

[73] Assignee: Konica Corporation, Tokyo, Japan

[21] Appl. No.: 664,935

[22] Filed: Mar. 5, 1991

[30] Foreign Application Priority Data

Mar. 8, 1990 [JP] Japan .................................. 2-57268

[51] Int. Cl.$^5$ ...................... G03B 17/20; G03B 13/12
[52] U.S. Cl. ............................... 354/475; 354/195.13; 354/222; 354/289.1
[58] Field of Search ................ 354/409, 195.1, 195.13, 354/222, 106, 465, 471, 474, 475, 219, 289.1

[56] References Cited

U.S. PATENT DOCUMENTS

| | | | |
|---|---|---|---|
| 4,478,493 | 10/1984 | Yokota | 354/222 |
| 4,583,831 | 4/1986 | Harvey | 354/195.1 |
| 4,716,429 | 12/1987 | Misawa | 354/409 |
| 4,780,735 | 10/1988 | Taniguchi et al. | 354/106 |
| 4,855,782 | 8/1989 | Kobayashi et al. | 354/195.13 |
| 4,945,371 | 7/1990 | Hashimoto et al. | 354/195.13 |
| 5,014,078 | 5/1991 | Kudo et al. | 354/195.1 |
| 5,019,852 | 5/1991 | Yamamoto et al. | 354/409 |

Primary Examiner—Russell E. Adams
Attorney, Agent, or Firm—Jordan B. Bierman

[57] ABSTRACT

A zoom camera being capable of changing a distance measuring direction to measure an object distance, and more particularly a camera which indicates the distance measuring direction overlapped on an object image in a view finder display. An object image is displayed in a finder display through an optical system, thereby the magnification of the object image in the view finder changes in accordance with a zooming of the camera. An indicator array is arranged on the view finder display, and the distance measuring direction is indicated by an activation of an indicator element of the indicator array located at a corresponding position to an object position in the distance measuring direction. For the purpose of coordinating with the change of magnification of the view image, the corresponding position is determined based on the focal length information obtained by a focal length detector in addition to distance measuring direction information and distance information, each obtained by each of a direction detector and a distance detector.

6 Claims, 73 Drawing Sheets

F I G. 10
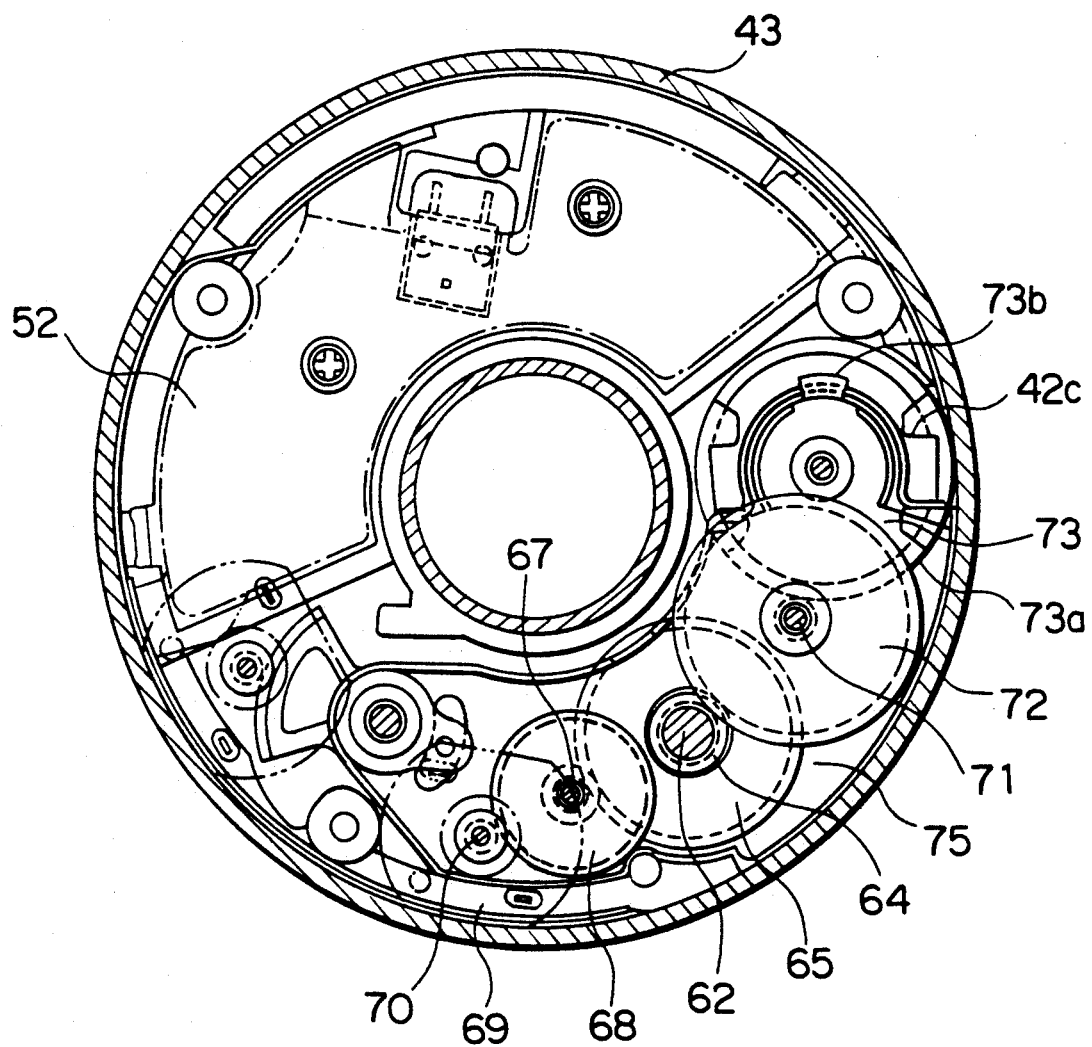

PRINCIPLE OF FOCUS COMPENSATION

FIG. 17-a
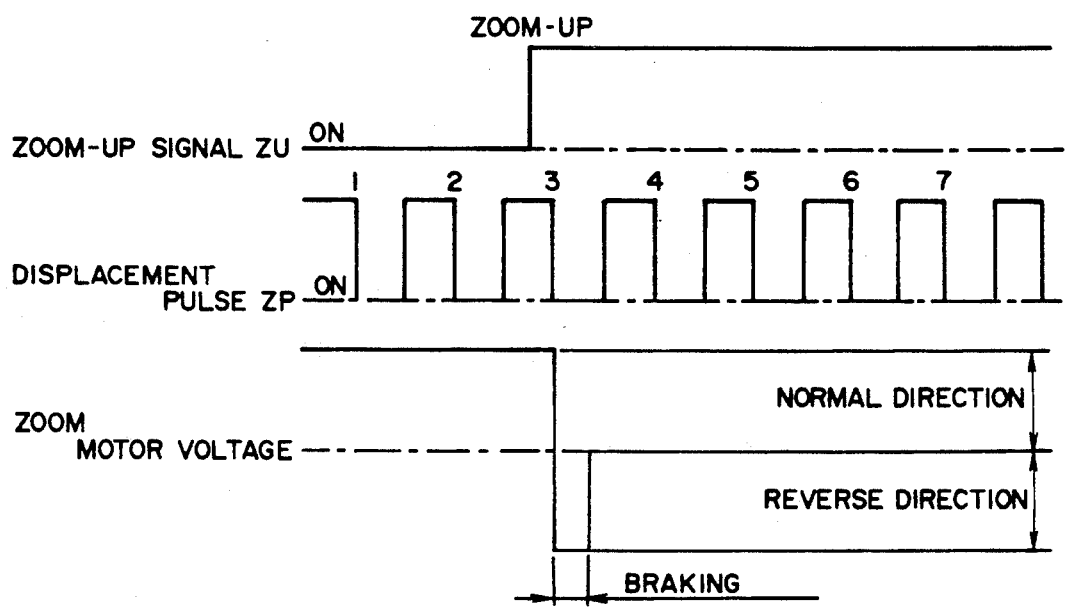
FIG. 17-b
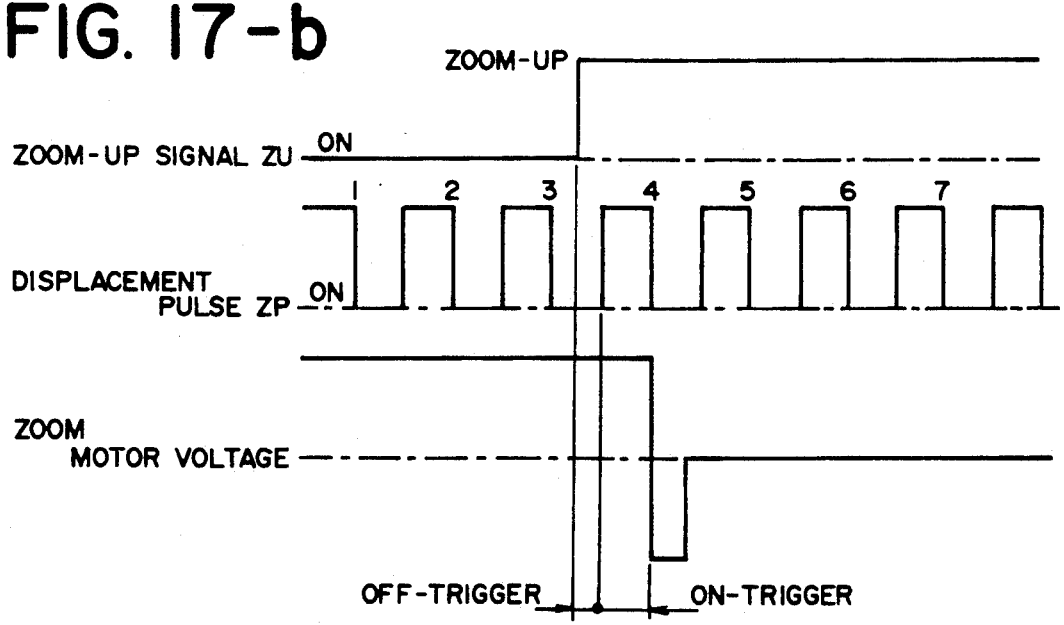

FIG. 17-c
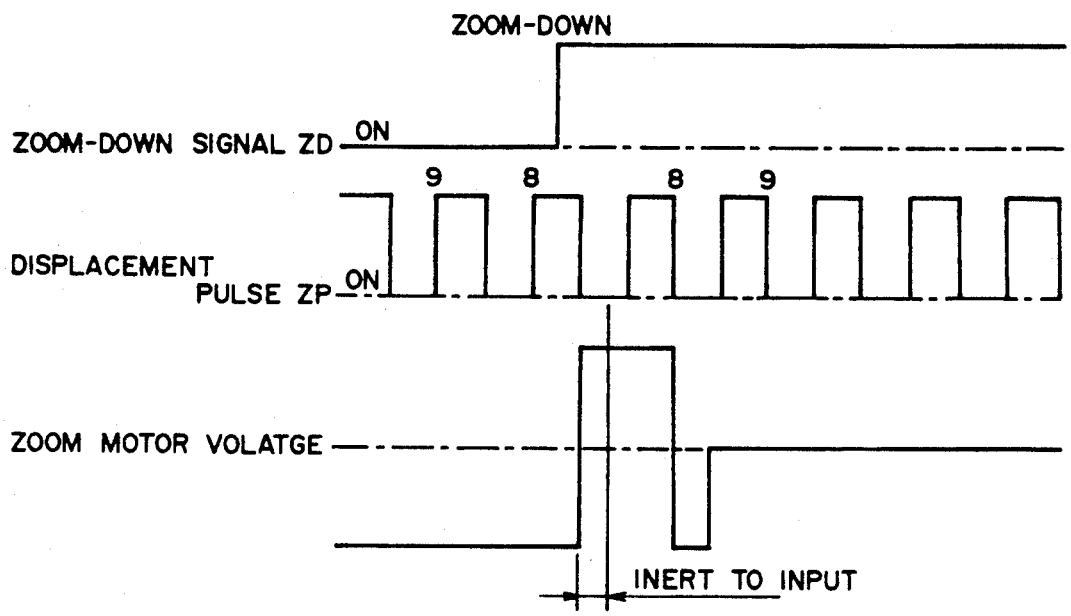
FIG. 17-d
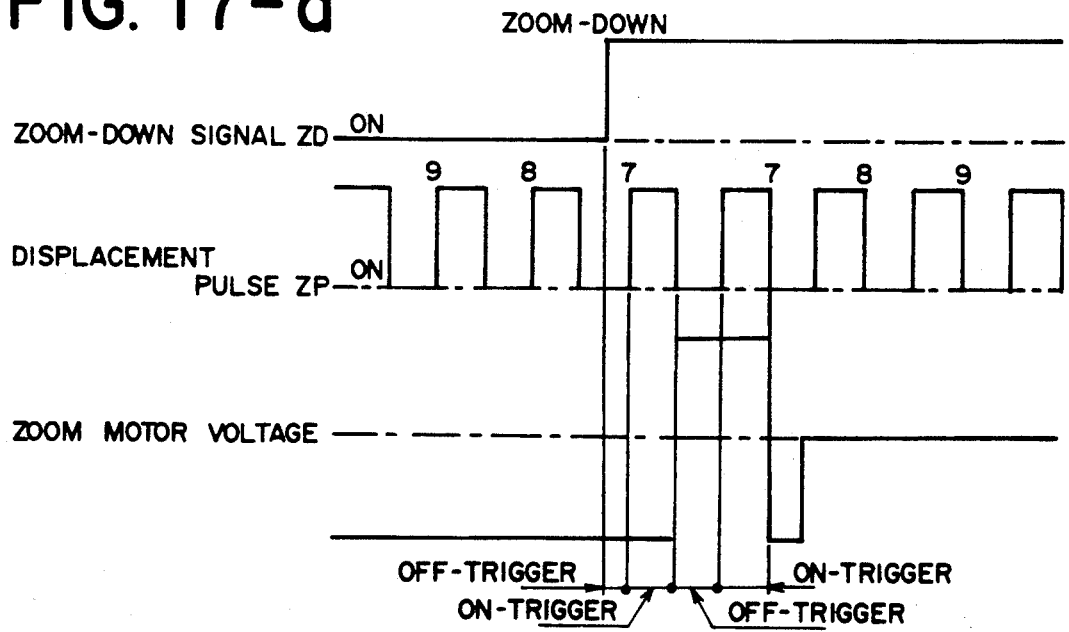

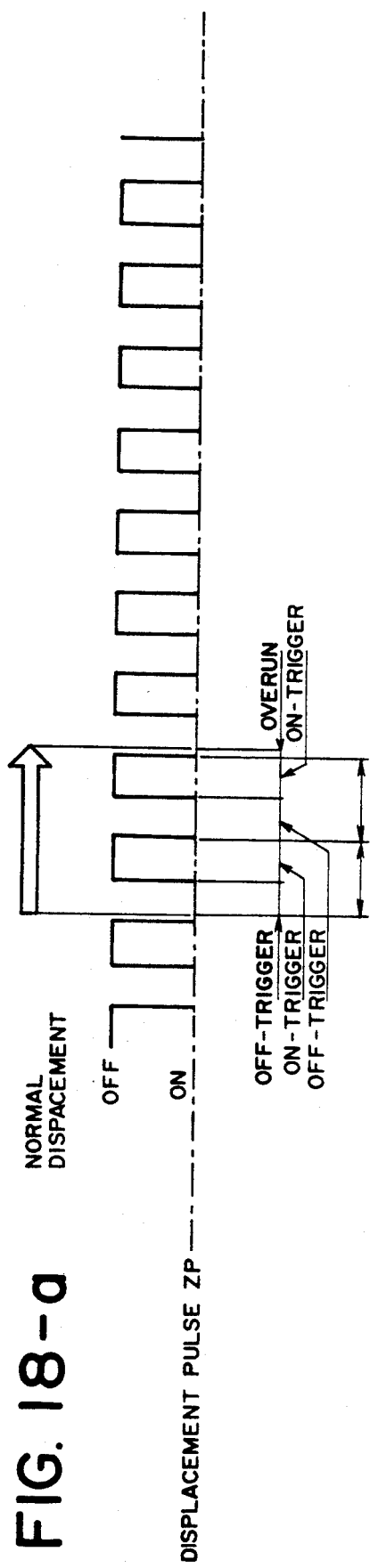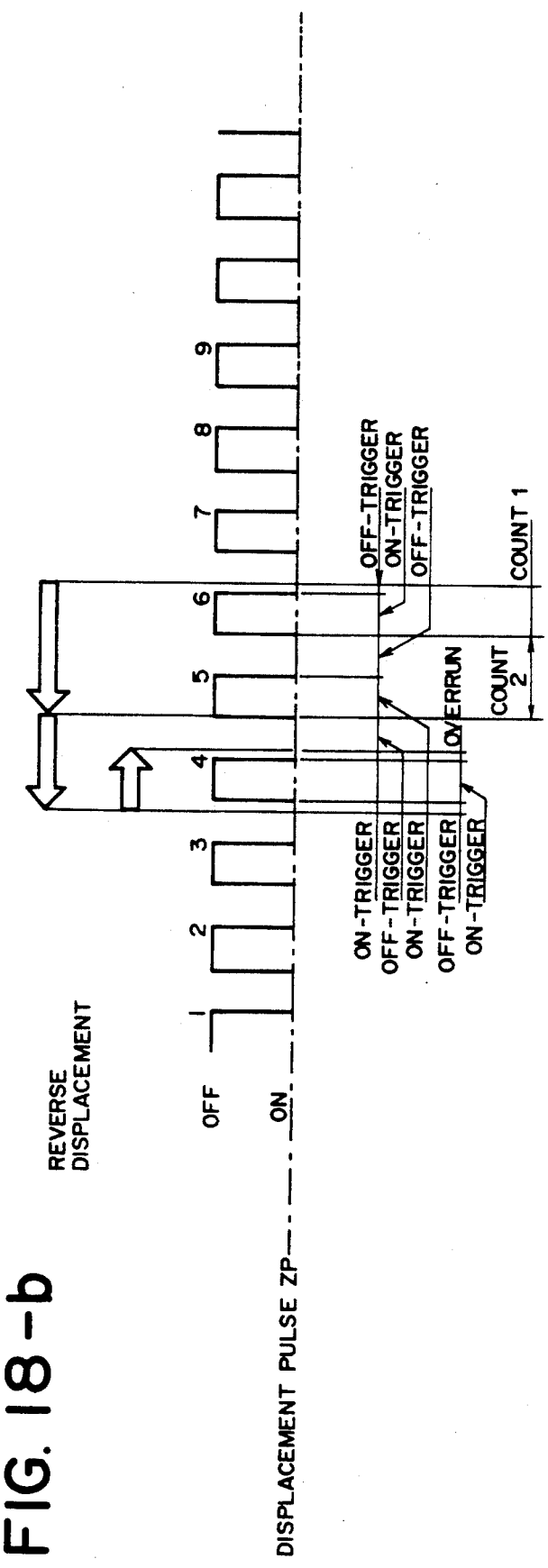

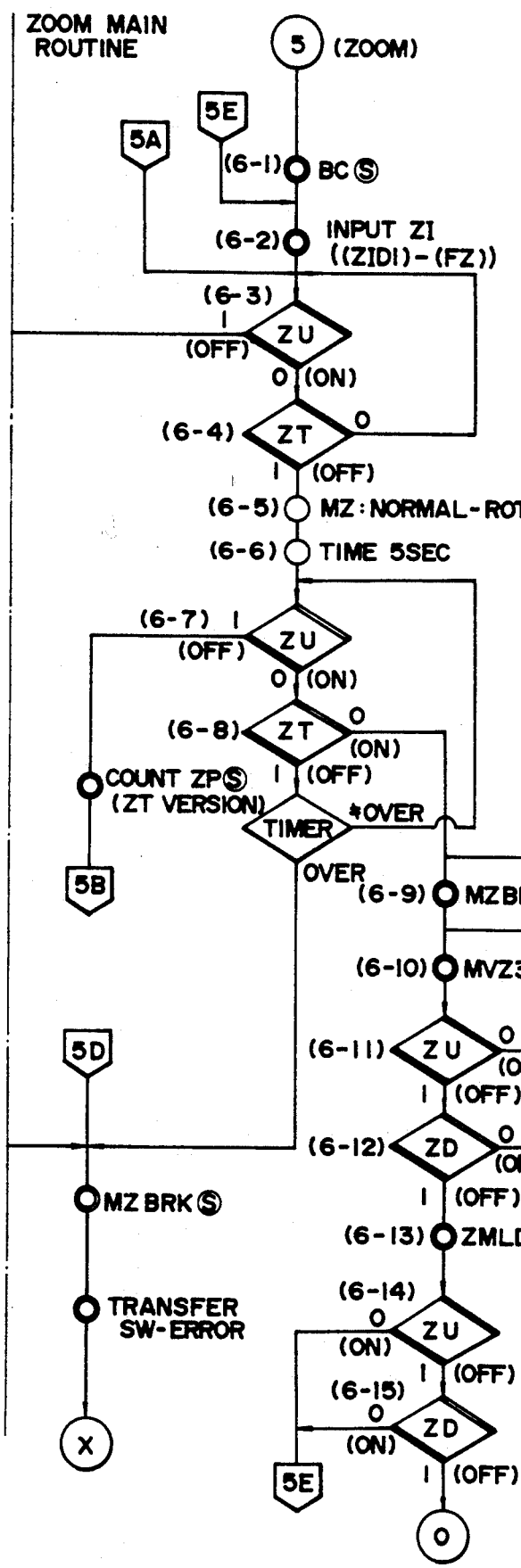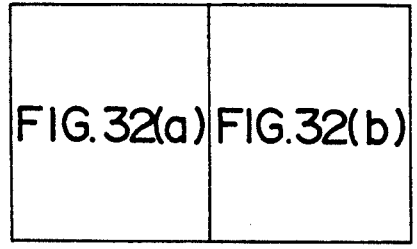

MOVING TARGET
MAIN ROUTINE

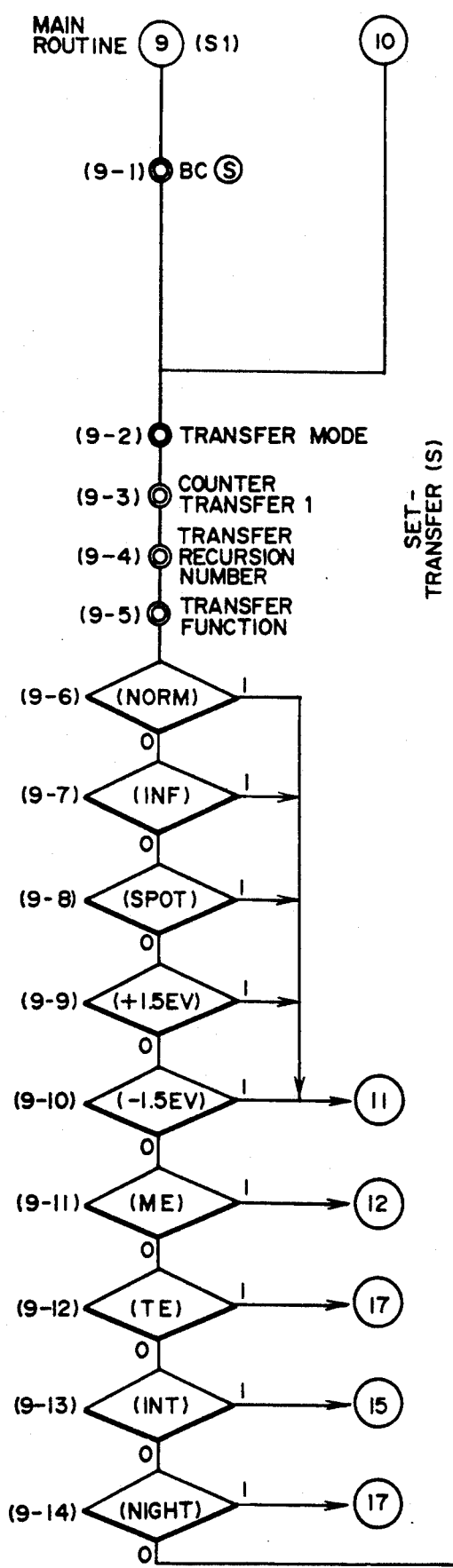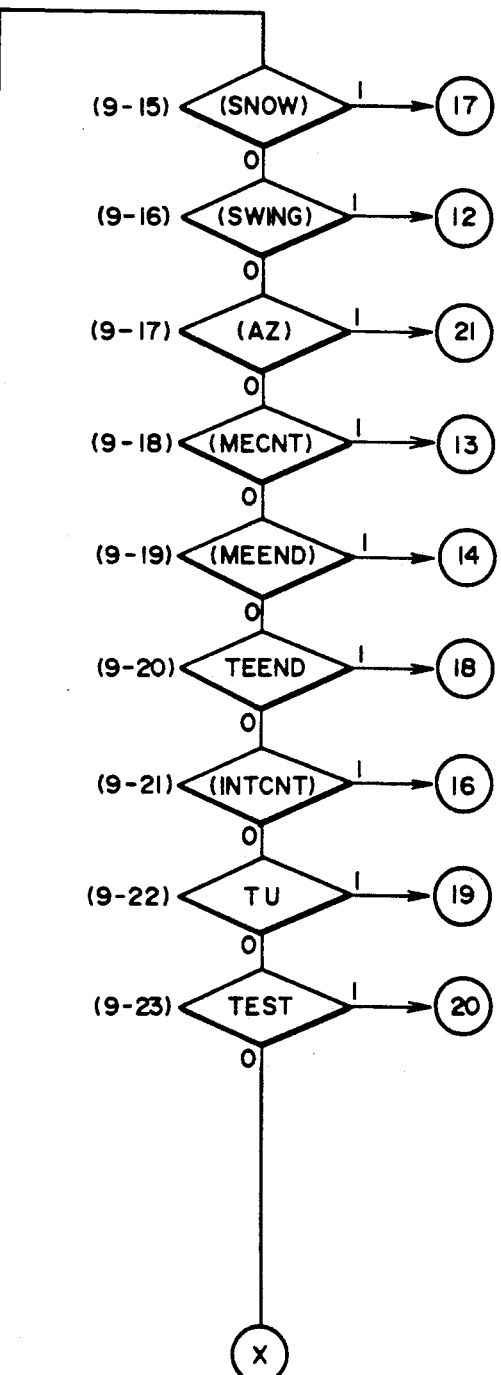
FIG. 35

| FIG.36(a) | FIG.36(b) |

| FIG.38(a) | FIG.38(b) |

AF TABLE

| X (m) | (AFZ) | (NZZ) | f |
|---|---|---|---|
| ∞ ~ 3.5 | 0 ~ 44 | 23 | TELE |
| ~ 3.0 | ~ 51 | 18 | ↕ |
| ~ 2.5 | ~ 61 | 13 | |
| ~ 2.0 | ~ 76 | 8 | |
| ~ 1.5 | ~ 102 | 3 | |
| 1.5 ~ | 103 ~ | 0 | WIDE |

| FIG.47(a) | FIG.47(b) |
|---|---|

ZOOM FOCUSING SUBROUTINE

| FIG.65(a) | FIG.65(b) |

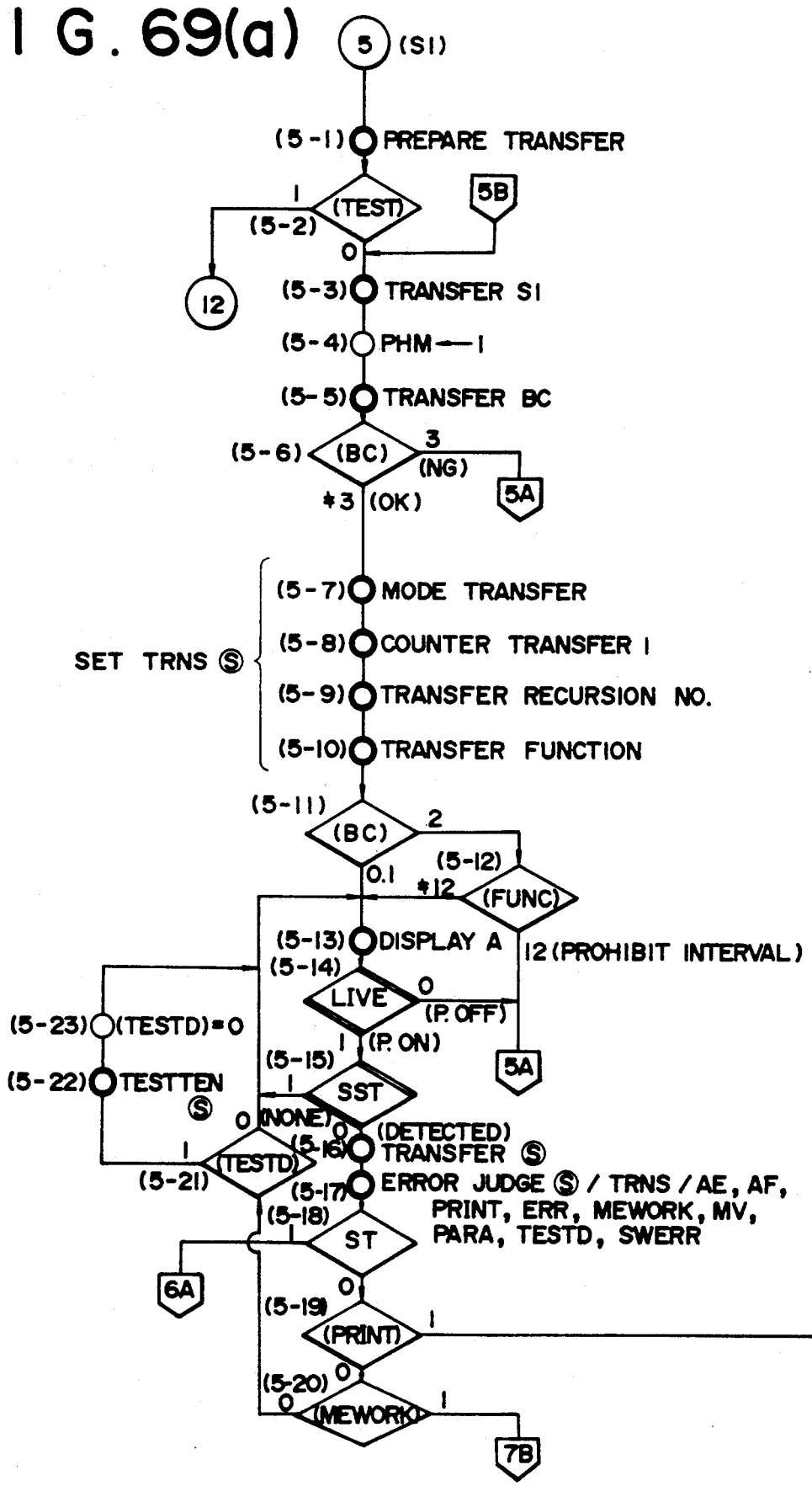

RANGE-FINDING-DIRECTION-CHANGEABLE-CAMERA

BACKGROUND OF THE INVENTION

The present invention relates to a camera of which the range finding direction is changeable, and more particularly relates to a camera of which the range finding direction is changeable and which can precisely indicate a range finding point in a viewfinder.

A range finding device is provided to a camera in order to find the range from the camera to a subject and adjust the focus of the lens. Since focus adjustment is conducted by placing a range finding point on a subject in order to find the range for the purpose of focal adjustment, subjects located in front of and behind the range finding point become out of focus.

Therefore, a camera is provided in which the range finding point (the target) can be changed by a photographer so that range finding of a predetermined subject can be conducted. The range finding system described above is called a moving target system.

In the case described above, the range finding point is changed by changing the direction of the range finding device. When the change of the range finding point is linked with the change of a target indication position displayed in a viewfinder, a photographer can easily operate the camera. For that reason, the viewfinder is provided with a plurality of target frames which are changed in accordance with the change of range finding point and which can be selected according to the range finding information. In the case of a range-finding-direction-changeable-camera having a zoom lens, if the moving target frame is set in accordance with a field angle of either telephotography or wide-angle-photography, the found range differs since the focal distances of telephotography and wide-angle-photography are different. Consequently, the indicating position of a moving target frame in a viewfinder differs from the range-finding-direction position of the range finding device. Especially when the moving target frame is set in accordance with the field angle of wide-angle-photography, the following problem is caused: in telephotography, the field angle is small, so that range finding is conducted outside the field angle.

Accordingly, in the case of a camera having a zoom lens, it is important that the position of an actual range finding point agrees with the indicating position of a moving target frame in a viewfinder.

Due to the circumstances described above, the present invention has been accomplished. A primary object of the present invention is to provide a range-finding-direction-changable-camera in which the indicating position of a moving target frame in a viewfinder agrees with the range finding direction position of a range finding device, so that the change of a range finding point can be prevented by changing the focal distance.

SUMMARY OF THE INVENTION

In order to solve the problems described above, the present invention is to provide a camera having a variable focal lens, which is provided with a picture-taking lens optical system composed of a variable focal lens, a range finding optical system composed of a range finding device to measure the camera-to-subject distance, and a viewfinder optical system that changes magnification in accordance with a variable magnification operation of said picture-taking lens optical system, and which comprises: a focal distance detection means which detects focal distance information of said picture-taking lens optical system; a range finding direction changing means which can change the range finding direction of said range finding device; a range finding direction detecting means which detects the range finding direction that is set by said range finding direction changing means; and an indication means which indicates the range finding direction in a viewfinder according to the focal distance information detected by said focal distance detection means and according to the range finding direction information detected by said range finding direction detecting means.

When the range finding point is changed by changing the range finding direction in the camera of the invention, the indicating positional of the range finding direction in a viewfinder is determined according to the focal distance information of a zoom lens and the position information of the range finding direction. Therefore, it is possible that the indicating position of the range finding direction in a viewfinder agrees with the range finding position of a range finding device, so that the variation of the range finding point can be prevented when the focal distance is changed by selecting between telephotography and wide-angle-photography.

BRIEF DESCRIPTION OF THE DRAWINGS

FIG. 1 is a front view of the camera;

FIG. 2 is a rear view of the camera;

FIG. 3 is a plan view of the camera;

FIG. 10 is a sectional view taken on line XII—XII in FIG. 6;

FIGS. 17(a) to 17(d) are timing charts of zooming operations;

FIGS. 18(a) and 18(b) are illustrations which show movement of a lens in the automatic zoom mode illustrated in FIGS. 17(a) and 17(b);

FIG. 29 to FIG. 78 are flow charts of the control circuit;

FIG. 29 and FIG. 30 are drawings which show the main routine of MAIN-CPU;

FIG. 32 to FIG. 63 are drawings which show the sub-routine of MAIN-CPU; and

FIG. 64 to FIG. 78 are drawings which show the sub-routine of SUB-CPU.

DETAILED DESCRIPTION OF THE INVENTION

EXAMPLES

With reference now to the drawings, the present invention will be explained in detail as follows.

Figure 1:
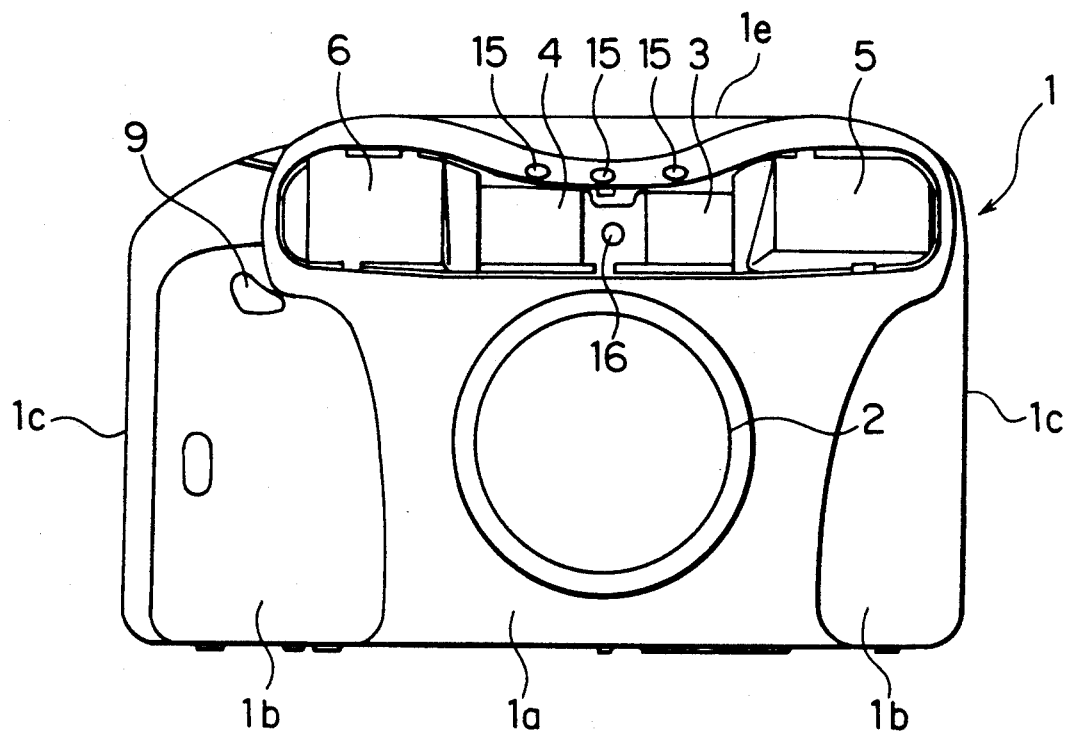
FIGS. 1 to 3 show a camera to which the present invention is applied.
Figure 2:
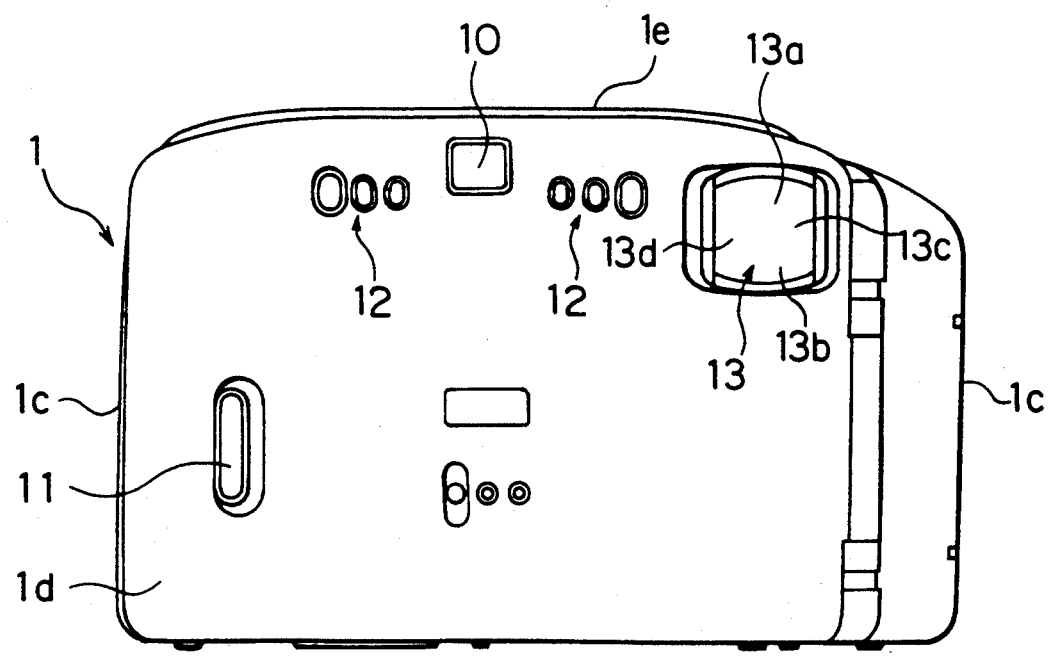
Figure 3:
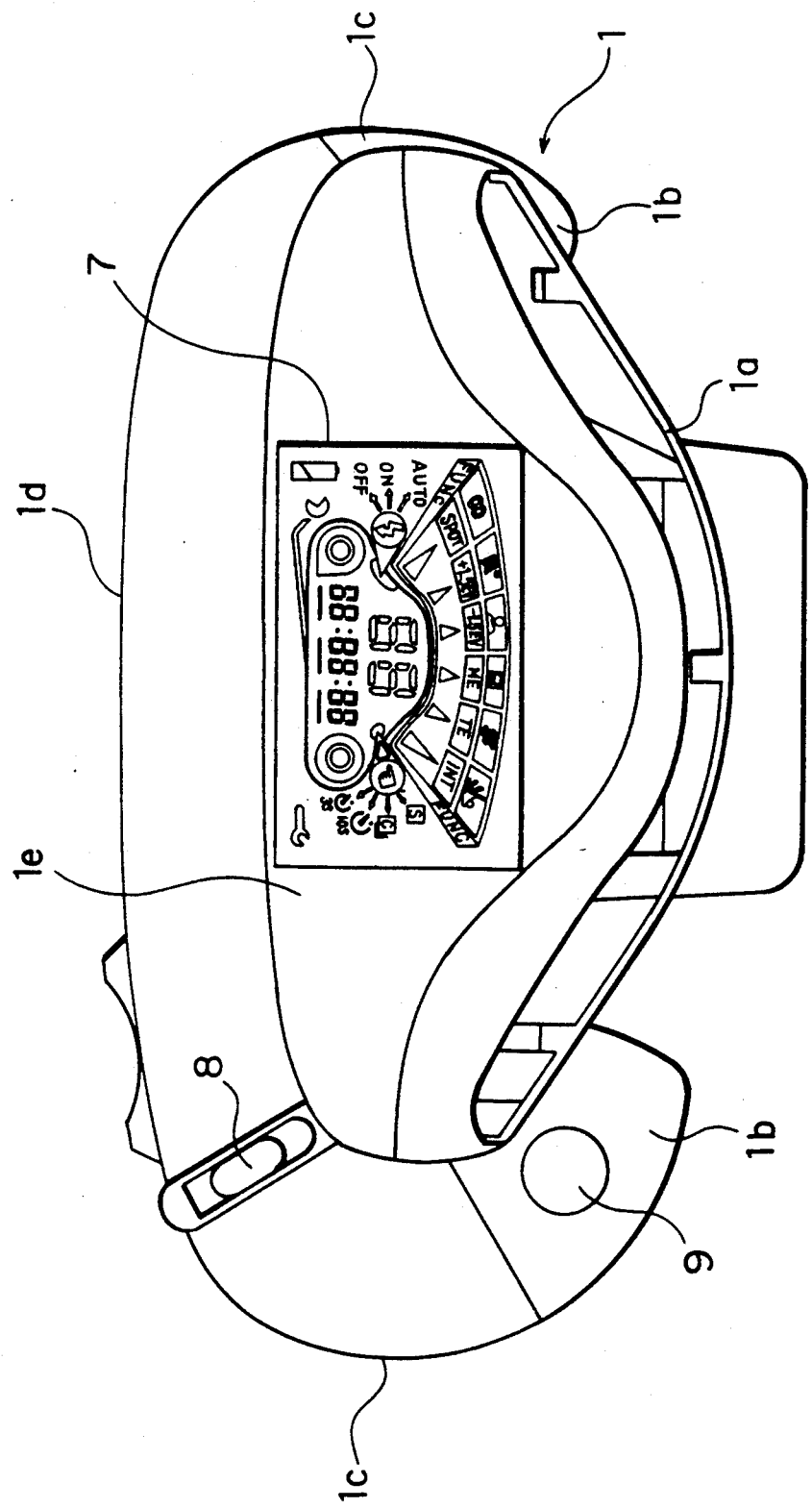
Figure 4:
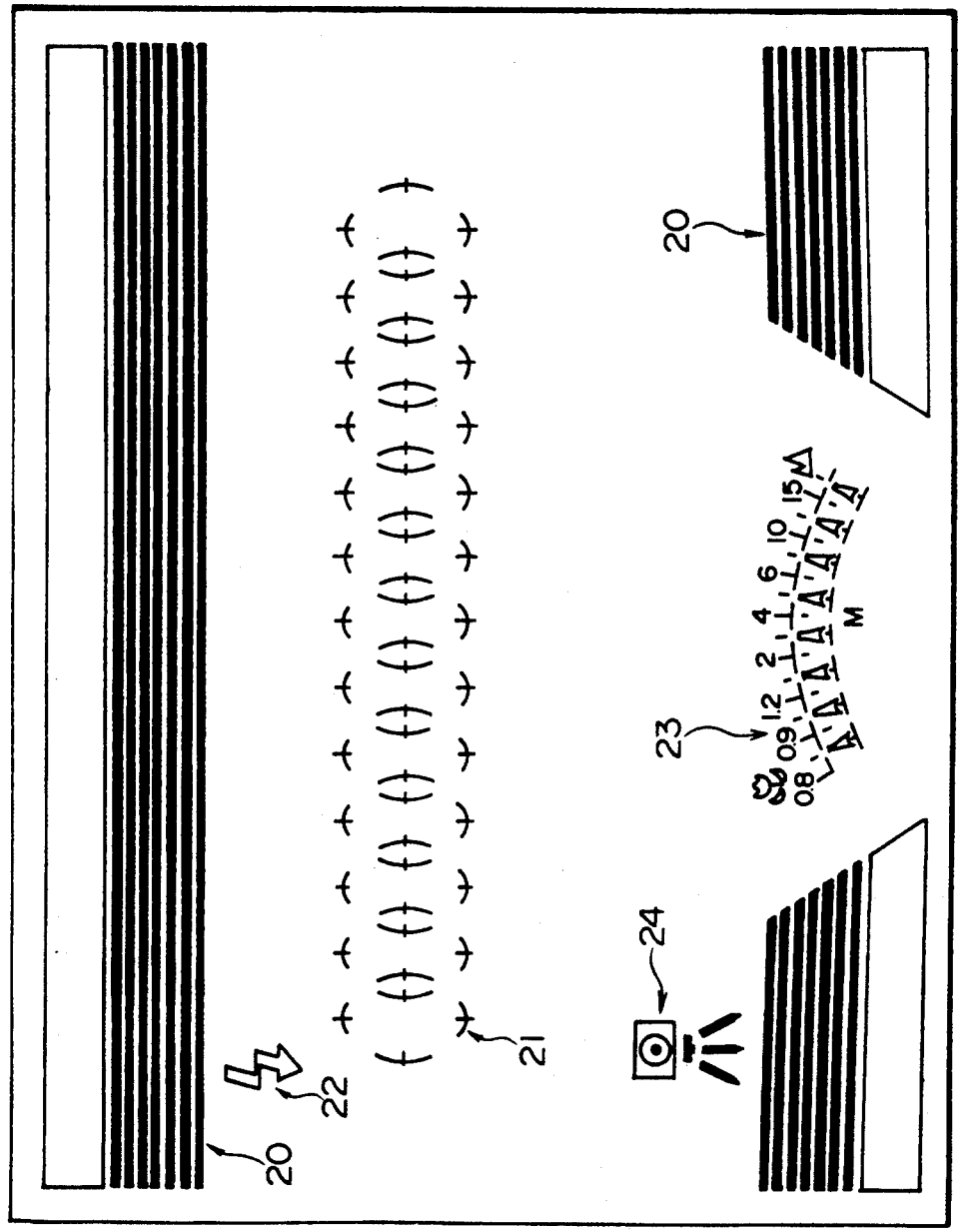
FIG. 4 is an illustration which shows the display in a viewfinder.
Figure 5:
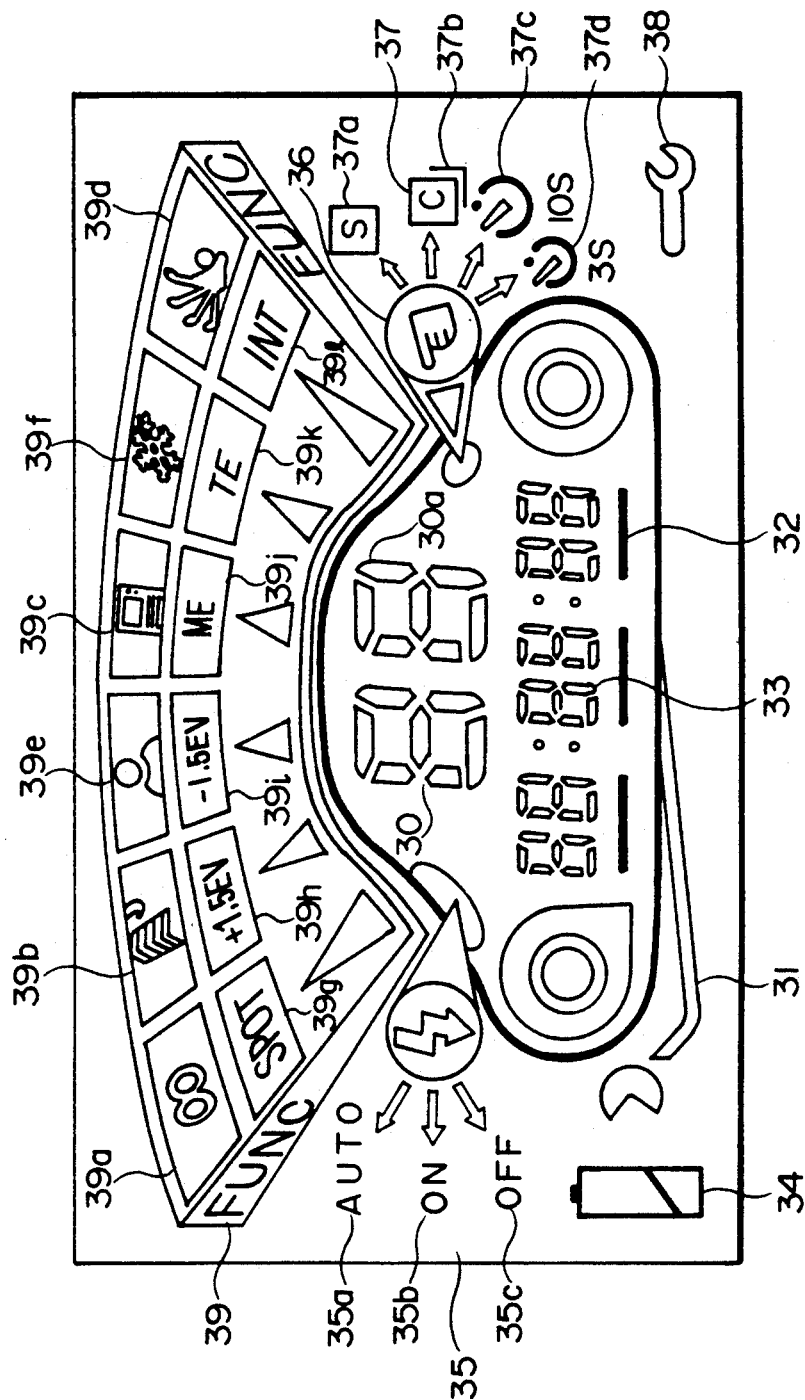
FIG. 5 is an enlarged view which shows the liquid crystal display.

FIG. 1 to FIG. 3 are drawings showing a camera to which the present invention is applied. FIG. 1 is a front view of the camera; FIG. 2 is a rear view of the camera; FIG. 3 is a plan view of the camera; FIG. 4 is an illustration which shows the display in a viewfinder; and FIG. 5 is an enlarged view which shows a liquid crystal display.

CAMERA BODY

The grip portions 1b which protrude in the optical path direction are formed on both sides of the camera 1. The grip portions 1b, the side portions 1c and the rear portion 1d are formed into a curved surface, so that a photographer feels comfortable when he holds the camera to take a photograph. The viewfinder ocular window 10 is located in the center of the rear portion of the main body with regard to the longitudinal direction, so that the photographer's hands do not interfere with the viewfinder ocular window 10 during camera operation. As a result, the photographer can hold the camera so firmly that camera-shake is seldom caused. Furthermore, the operation button 13 and the release button 9 are located on the camera body so that they can be easily operated.

The lens barrel 2 is provided to the central position of the front side 1a of the camera 1; the viewfinder 3 and the range finding light emitting window 4 are located in the upper portion of the lens barrel 2; the strobe light window 5 is located on the side of the viewfinder 3; and the range finding light receiving window 6 is located on the side of the range finding light emitting window 4. Three of the LED indicating units 15 are provided above the range finding light emitting window 4 and the viewfinder 3. When photographing is conducted by a self-timer operation, the lapse of time is indicated by the LED indicating units 15 which are turned on and off at a predetermined timing, for example three LED units are turned on and off in sequence. The photographer can check the direction of the moving target when the LED indicating unit 15 corresponding to the range finding position of the range finding device is turned on. The photometry unit 16 is placed above the lens barrel 2.

A large liquid crystal display unit 7 is provided on the upper portion 1e of the camera 1 so that many pieces of photographing information can be displayed. Further, the main switch 8 and the release button 9 are provided to the camera. In the initial pressing stroke of the release button 9, switch S1 is turned on, and after that switch S2 is turned on.

The rear lid composing the back 1d of the camera 1 is provided with the viewfinder ocular window 10, the patrone check window 11, various switch buttons 12 and the operation button 13. The operation button 13 is operated in such a manner that: when the operating portion 13a is pressed, the focal distance of the zoom lens is moved to the telephotography side; when the operating 13b is pressed, the focal distance is moved to the wide-angle photography side; when the operating portion 13d is pressed, the direction of the moving target is changed to the left; and when the operating portion 13c is pressed, the direction of the moving target is changed to the right. This operation button 13 conducts both the zooming operation and the moving target operation. A strap ring to which a strap is hooked, is provided to the side portion 1c of the camera 1.

Picture-Taking Lens

An inner focal type of zoom lens is used as a picture-taking lens. The lens structure is a 4-group-zoom. Zooming operation is conducted by an electrical zoom drive system which is activated by pressing the operation button.

VIEWFINDER

A real image zoom viewfinder is used. A real image is displayed in the viewfinder by a liquid crystal display which is placed on the real image surface in the optical path of the viewfinder. As illustrated in FIG. 4, a liquid crystal display is used for the display of the viewfinder. FIG. 4 shows the state of the viewfinder in which all the segments are lit. In the viewfinder, there are displayed; the automatic parallax correction visual field frame 20 which automatically sets a visual field according to the focal distance information of the picture-taking lens and the subject distance information detected by range finding operation; the moving target mark 21 which lights the position corresponding to the range finding position of the range finding device, wherein the range finding position is adjustable; the strobe light emitting mark 22; the range finding distance indication 23; and the warning mark 24 which indicates possible blurring of the picture due to an unsteady hold on the camera.

FOCUS ADJUSTMENT

In the range finding device, infrared rays are projected by a light emitting element through a light projecting lens so that the emitted light is illuminated on a subject. An infrared ray active type of range finding device is used which detects the distance from the camera to a subject in such a manner that: the reflected light from the subject is received by a light receiving element through a light receiving lens; and the distance is detected by the light reviewing position on the light receiving element. In the case of the above-described range finding device, the range finding position can be changed to the right and left with regard to the optical axis of the picture-taking lens. The system explained above is called a moving target system.

The range finding device is activated by the operation of switch S1 ON which is attained by the first step operation of the release button 9, and the result of the range finding is held. Then, the result is displayed by the range finding distance indication 23 in the viewfinder. When the subject is located in a position closer than a predetermined distance, a warning is displayed by the range finding indication 23. When the operation of switch S2 ON is conducted, the focal lens is driven so that the subject can come into focus. When the distance measured by the above-described range finding operation is shorter than the predetermined value, a release lock is activated in order to prohibit photographing.

EXPOSURE CONTROL

The light receiving portion of the photometry device is composed of a 2-divided-silicon-photodiode, and provided with a photometry element for spot use which performs the photometry of the central portion of the picture, and provided with a photometry element for average use, which performs photometry for the peripheral portion of the picture. Exposure control is conducted in accordance with the subject luminance information detected by these two photometry elements and the film sensitivity information.

STROBE LIGHT

Charging of a strobe light device is conducted in such a manner that: an electrical current, the voltage of which is automatically boosted from the power source, is accumulated in a condenser by the operation of winding of a frame of film. The strobe light is activated by turning on the main switch, and pressing the release button.

Concerning strobe light selection modes, there are: an automatic light emitting mode in which emitting or non-emitting of strobe light is determined according to the luminance information of the subject, a forcible light emitting mode which emits strobe light without any relation to the luminance information of the subject, and a non-light emitting mode which does not emit strobe light, with no relation to the luminance information of the subject light.

LIQUID CRYSTAL DISPLAY

The display of the liquid crystal display unit 7 is shown in FIG. 5, wherein FIG. 5 shows the state in which all the lights are lit for the purpose of explanation.

The display 30 is used as a film counter 30a which counts frame numbers in sequence. The following are displayed in the liquid display unit 7: the rear lid opening indication 31; the film state indication 32; the time indication 33 which shows the interval time and exposure time; the battery residual capacity indication 34; the strobe mode indication 35 (the automatic light emitting mode 35a, the forcible light emitting mode 35b and the non-light emitting mode 35c); the release operation indication 36; the drive mode indication 37 (the single shot mode 37a and the successive shot mode 37b); the self-timer photography mode 37c in which photographing is conducted in order to take a picture of the photographer himself 10 seconds after a release operation has been performed; the short period self-timer photography mode 37d which is mainly used for preventing blurred of pictures caused by an unsteady hold on the camera, and in which photographing is conducted 3 seconds after a release operation has been conducted; a fault indication 38; the special photographing mode indication 39 (INF mode 39a in which photographing is conducted by forcibly moving the focal lens to an infinite focus position without activating the range finding means); the NIGHT mode 39b in which a long period exposure is conducted; the TV mode 39c for taking a picture of a TV screen at a shutter speed of 1/30 second without using a strobe light; the swing mode 39d for multiple exposure in which the shutter is successively opened and closed 6 times for one frame of film; the AZ mode 39e in which a zoom lens is automatically driven so that a burst shot can be conducted according to the distance information obtained by the detection of the distance from the camera to a subject; the snow mode 39f in which photometry is conducted on a subject, the background of which is as white as a snow-covered landscape, and the higher the measured luminance is, the larger correction is conducted on the plus side; the SPOT mode 39g in which spot photometry is conducted; the +1.5 EV mode 39h in which photographing is conducted under the condition that the exposure is 1.5 EV higher than the proper one; the −1.5 EV mode 39i in which photographing is conducted under the condition that the exposure is 1.5 EV lower than the proper one; the ME mode 39j of multiple exposure photography in which the exposure time can be set; the TE mode 39k of bulb exposure photography in which the exposure time can be set; and INT mode 39l in which the number and interval of photographing are set so as to conduct an interval photographing.

ILM FEEDING

The automatic load system is used for film feed in which a conventional motor is applied for a drive power force. Film feed is started when the rear lid has been closed after a film was loaded in the camera, and four frames of film are fed without being exposed. The film is fed by a spool drive system, and the number of frames is indicated by a counter in sequence. The film is automatically rewound when it is tightly stretched or when the final frame of film has been photographed. Further, when a single switch is manually operated, the film is also rewound.

STRUCTURE OF LENS BARREL

Figure 6:
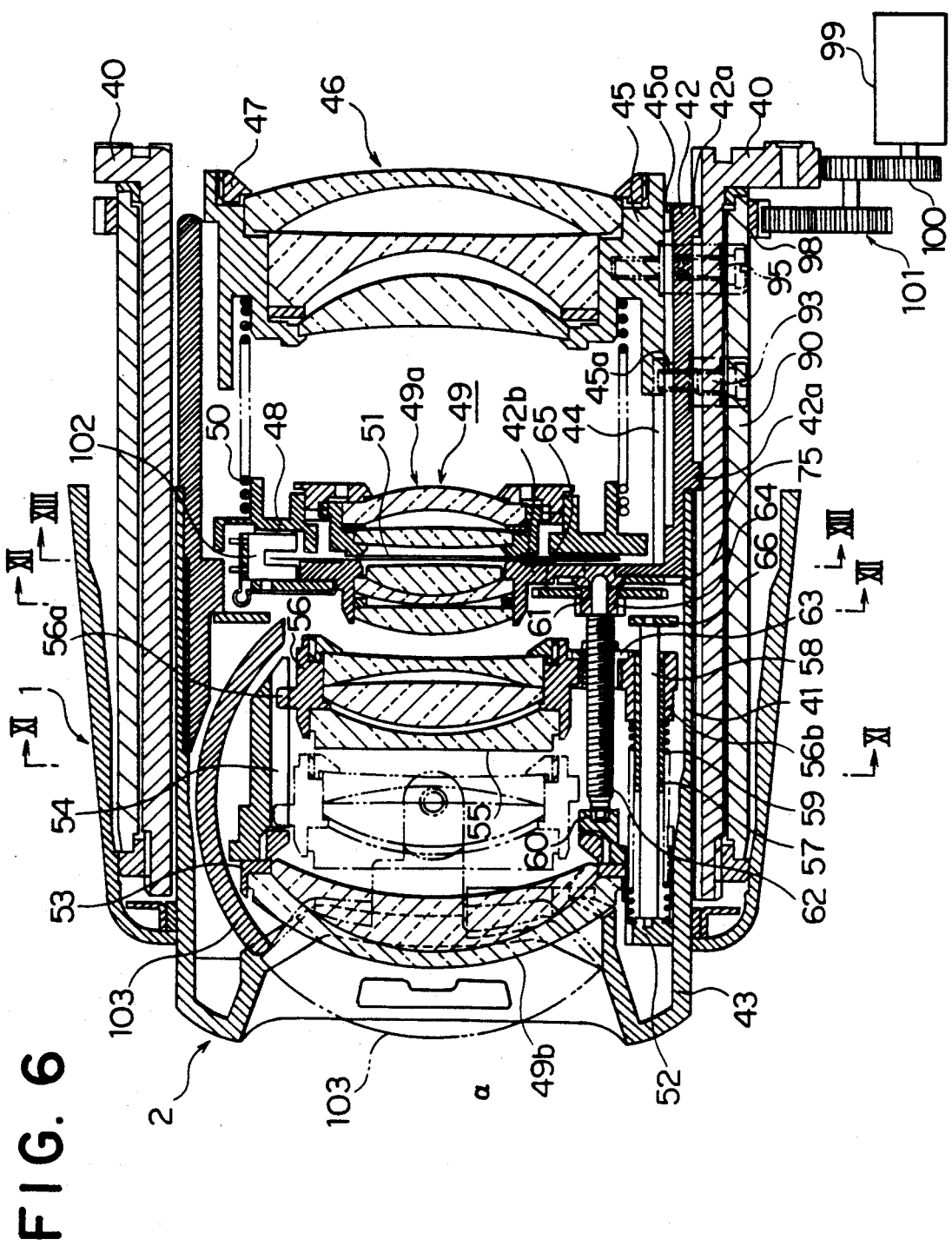
FIG. 6 is a sectional view which shows the lens barrel of a picture-taking lens.
Figure 7:
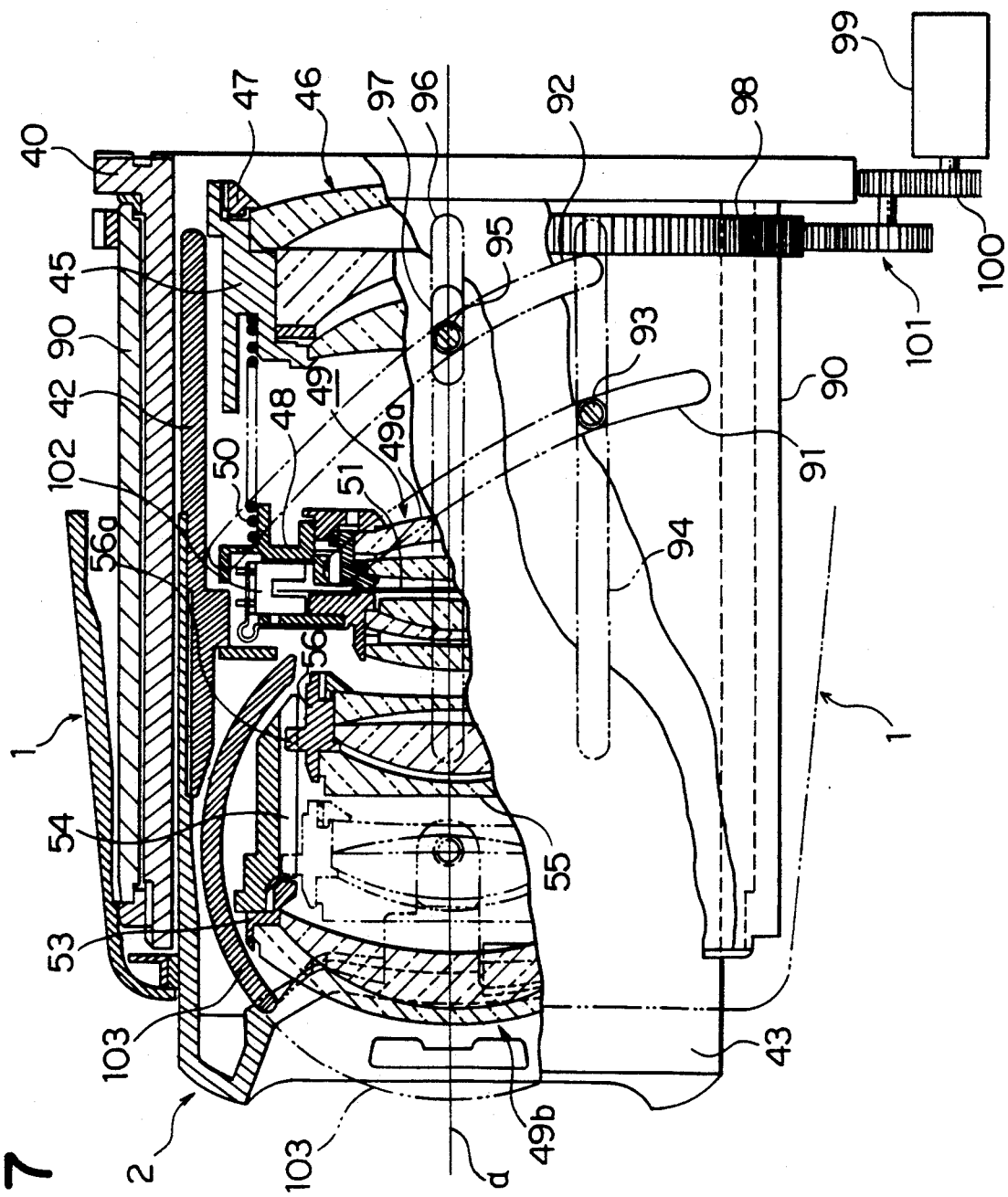
FIG. 7 is a partly cutaway sectional view of the lens barrel.
Figure 8:
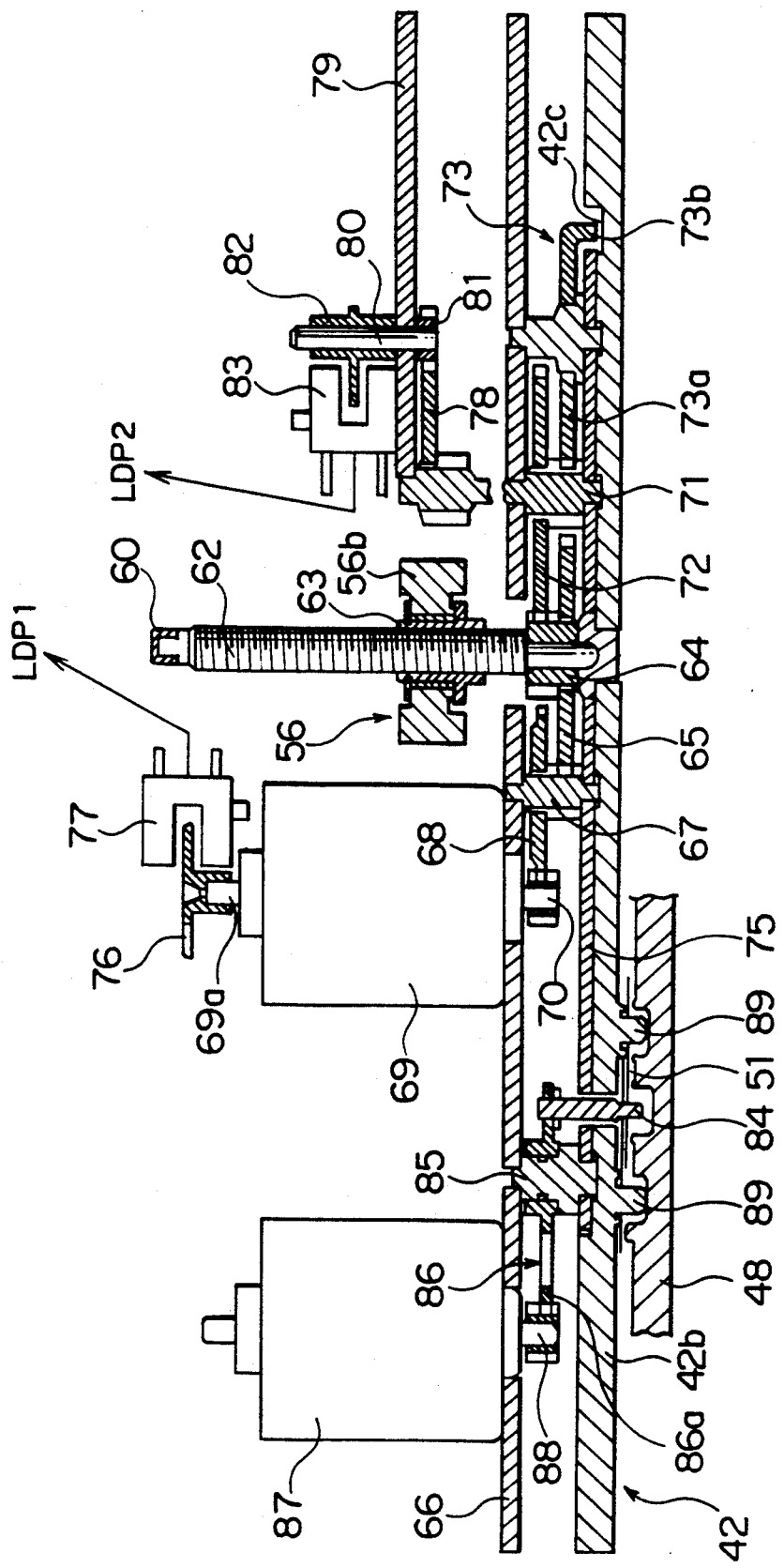
FIG. 8 is a sectional view of a mechanism which drives a lens barrel.
Figure 9:
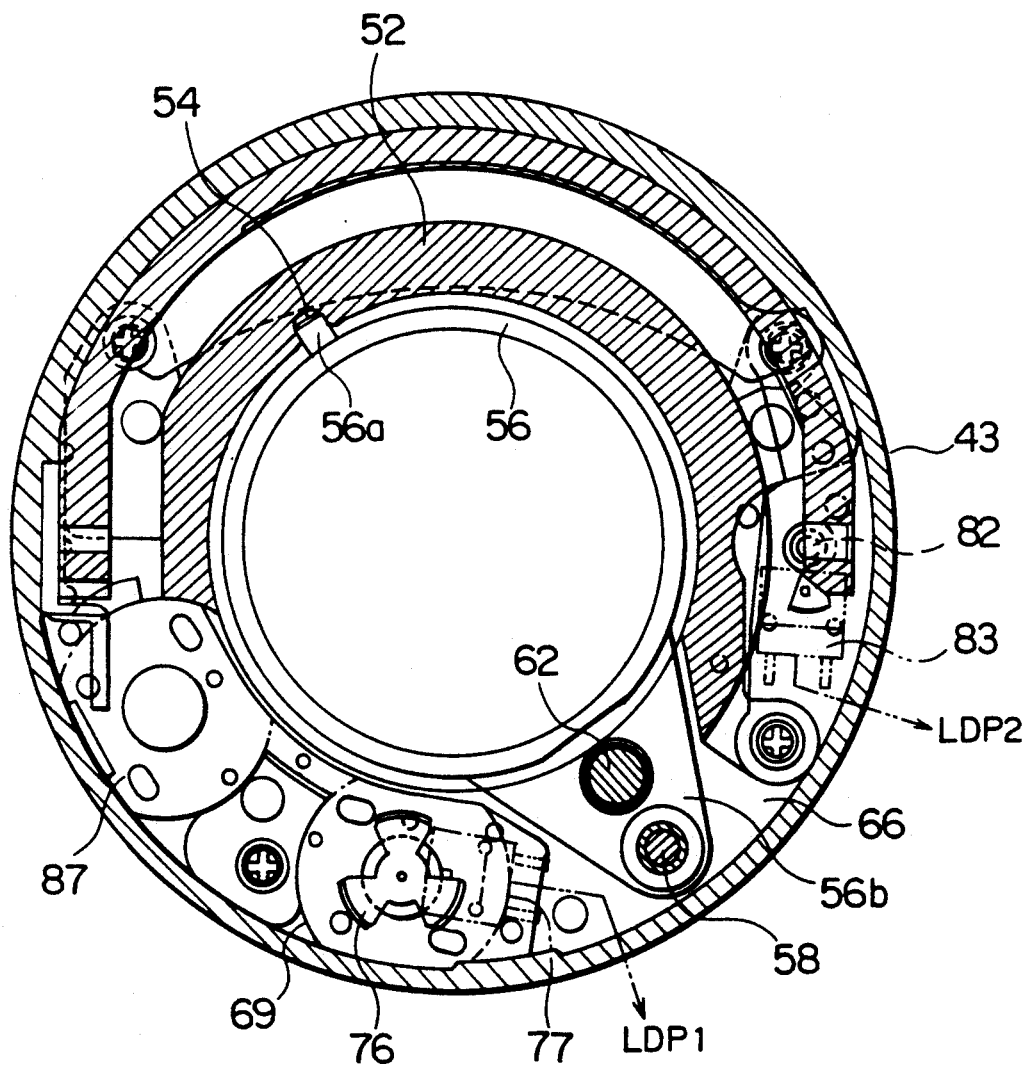
FIG. 9 is a sectional view taken on line XI—XI in FIG. 8.
Figure 11:
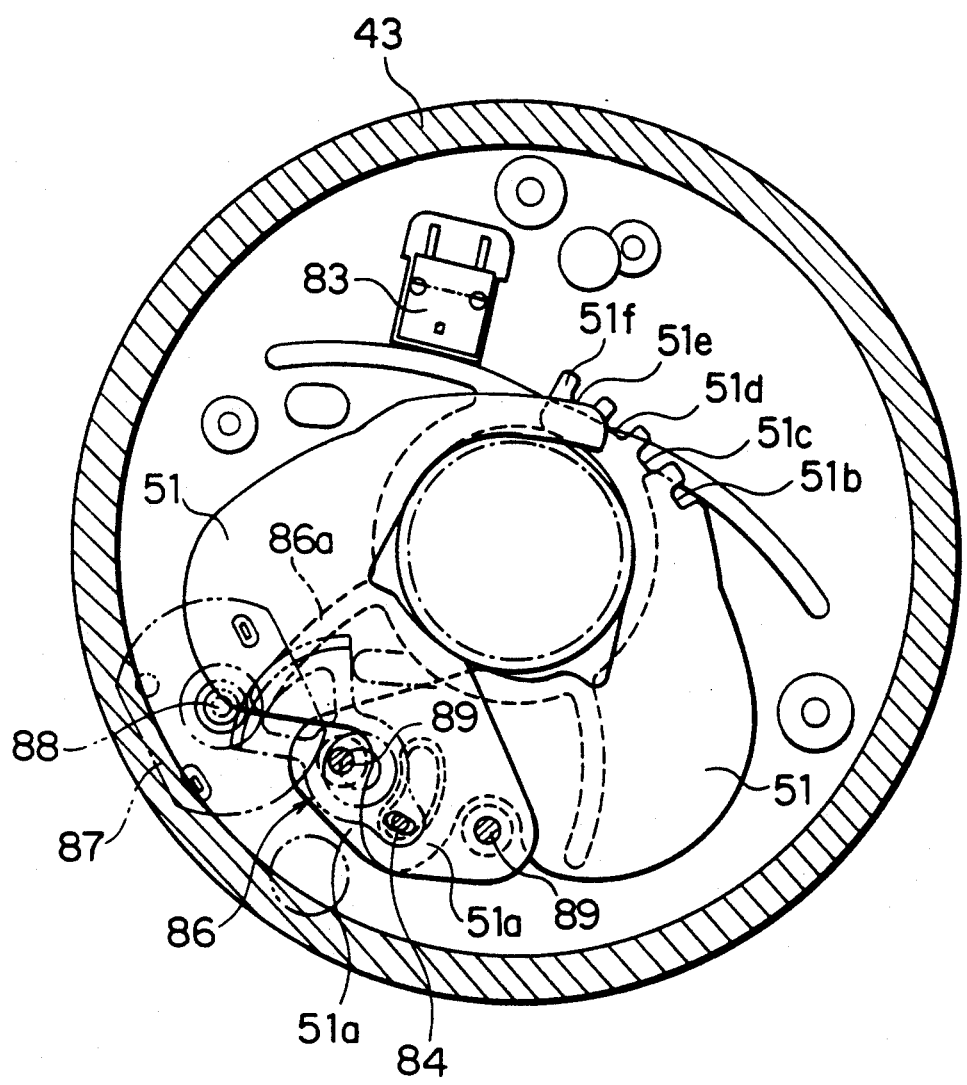
FIG. 11 is a drawing which shows a signal detection means for controlling shutter blades.

FIG. 6 is a sectional view of the lens barrel of a picture-taking lens; FIG. 7 is a side view of the lens barrel of the picture-taking lens, wherein a portion of the lens barrel is cutaway in the drawing; FIG. 8 is a sectional view of a mechanism which drives the picture-taking lens; FIG. 9 is a sectional view taken on line XI—XI in FIG. 6; FIG. 10 is a sectional view taken on line XII—XII in FIG. 6; and FIG. 11 is a drawing showing the signal detection means of shutter blade control.

The lens barrel 2 has a cylindrical fixed barrel 40 which is fixed to the front side of the main body of the camera 1. A plurality of sliding grooves 41 which are extended in parallel with the optical lens axis a, are formed on the inner circumferential surface of the fixed lens barrel 40. The cylindrical front sliding frame 42, the outer circumferential surface of which is provided with the sliding protrusion 42a which can be moved along the sliding groove 41 in the direction of lens optical axis $\alpha$, is arranged inside the fixed lens barrel 40. The cylindrical movable barrel 43 is fixed to the front sliding frame 42. A plurality of sliding grooves 44 which are extended in parallel with the lens optical axis $\alpha$, are formed in the same way on the inner circumferential surface of the front sliding frame 42. The rear sliding frame 45, from the outer circumferential surface of which is protruded the sliding protrusion 45a which can be moved along the sliding groove 44 in the direction of lens optical axis $\alpha$, is arranged inside the front sliding frame 42. The fourth variable magnification lens group 46 is comprised of three lenses, assembled to the rear inside of the rear sliding frame 45. This fourth variable magnification lens group 46 is fixed by the ring screw 47 which is screwed to the inner circumference of the rear sliding frame 45.

Three lenses are installed in the partition portion 42b which separates the inside of the front sliding frame 42, and two lenses are installed in the rear side holder 48 which is placed in the position opposed to the partition portion 42b. The third variable magnification lens group 49a is comprised of these five lenses. The spring 50 is provided between the rear holder 48 and the rear sliding frame 45 so that the fourth variable magnification lens group 46 of the rear sliding frame 45 can be always pushed in such a manner that the fourth variable magnification lens group 46 is separated from the third variable magnification lens group 49a. Two shutter blades 51 are provided to the rear holder 48, and these shutter blades 51 are located in the third variable magnification lens group 49a.

The front holder 52 is fixed to the inside of the movable barrel 43, and the lens holder 53 is screwed to the front side of the front holder 52 in order to fix the first variable magnification lens group 49 composed of two lenses. This first variable magnification lens group 49b and the third variable magnification lens group 49a compose the first-third lens group 49 which is integrally moved.

The guide groove 54 is formed inside the front holder 52 in the direction of lens optical axis $\alpha$. This guide groove 54 is engaged with the protrusion 56a of the lens holder 56 in which the second variable magnification lens group 55 composed of three lenses is assembled. The support portion 56b of the lens holder 56 is slidably provided to the sleeve 57. The guide pin 58 which is made from stainless steel and installed in the direction of lens optical axis $\alpha$, is slidably inserted into the sleeve 57 in order to eliminate the play of lenses and improve the linearity. This guide pin 58 is supported between the tip portion of the front holder 52 and the plate 66 supported by the front supporting frame 42. The coil spring 59 into which the guide pin 58 is inserted, is provided between the support portion 56b of the lens holder 56 and the tip portion of the front holder 52, and the coil spring 59 always pushes the second variable magnification lens group 55 in the direction of the third variable magnification lens group 49a. The screw shaft 62 is rotatably supported between the bearing 60 mounted on the front holder 52 and the partition portion 42b of the front sliding frame 42. This screw shaft 62 is installed in parallel with the direction of lens optical axis $\alpha$. The nut member 63 which is mounted on the support portion 56b of the lens holder 56, is screwed to this screw shaft 62, and when the screw shaft 52 is rotated, the second variable magnification lens group 55 can be moved through the lens holder 56 in the direction of lens optical axis $\alpha$.

The pinion gear 64 is fixed to the screw shaft 62; the gear 65 is fixed to the shaft of this pinion gear 64; this gear 65 is engaged with the gear shaft 67 shown in FIG. 8; the gear 65 is engaged with the drive pinion 70 of the focusing motor 69 through the gear 68; and when the focusing motor 69 is driven, the drive force is transmitted through the gear mechanism and the second variable magnification lens group 55 can be moved in the direction of lens optical axis $\alpha$. On the other hand, the pinion gear 64 mounted on the screw shaft 62, is engaged with the gear 72 mounted on the gear shaft 71; the gear 73a of the stopper member 73 is engaged with the gear shaft 71; the rotation is restricted when the stopper portion 73b comes into contact with the edge of the fan-shaped cut-out portion 42c which is formed on the partition portion 42b of the front sliding frame 42; and the movement of the second variable magnification lens group 55 can be restricted. These gear mechanisms are supported between the plate 66 and the partition portion 42b, and between the plate 66 and the plate 75.

The three-blades 76 are mounted on the rotative shaft 69a of the focusing motor 69, and pulse LDPI can be obtained by the photointerrupter 77 provided in the position opposed to the three-blades 76 when the focusing motor 69 is rotated.

The gear 78 is mounted on the gear shaft 71; the gear 78 is engaged with the pinion gear 81 mounted on the rotative shaft 80 which is rotatably provided to the plate 79; and one-blade 82 is mounted on the rotative shaft 80. The photointerrupter 83 is installed in the position opposed to this one-blade 82 so that pulse LDP2 can be obtained when the focusing motor 69 is rotated.

The above-described three-blades 76 and one-blade 82 are made from polyacetal, a resin which does not transmit light. Since the blades are made from polyacetal, the rotative shaft 69a of the motor can be easily press-fitted into the blades, and further the blades can be easily positioned with regard to the rotative direction after press-fitting.

As illustrated in FIG. 7, the cam cylinder 40 is rotatably provided to the fixed barrel 40, wherein the cam cylinder 40 can be rotated around the center of the fixed barrel 40. The circumferential surface of the above-described cam cylinder 90 is provided with the first correction cam groove 91 which moves the front sliding frame 42 and movable barrel 43 in the direction of lens optical axis $\alpha$, and corrects the amount of movement in accordance with the change of magnification, and provided with the second correction cam groove 92 which moves the rear sliding frame 45 in the direction of lens optical axis $\alpha$, and corrects the amount of movement in accordance with the change of magnification. The front cam pin 93 protruded from the outer circumferential surface of the front sliding frame 42, penetrates the slot 94 formed on the circumferential surface of the fixed barrel 40 in parallel with the lens optical axis $\alpha$ and protrudes into the first correction cam groove 91 so that the front cam pin 93 can be moved in the direction of lens optical axis $\alpha$ in accordance with the rotation of the cam cylinder 90. The rear cam pin 95 protruded from the outer circumferential surface of the rear sliding frame 45 penetrates the slot 96 formed on the circumferential surface of the fixed barrel 40 in parallel with lens optical axis a, and the clearance groove 97 of the front sliding frame 42, and protrudes into the second correction cam groove 92.

The ring gear 98 is fixed to the position close to the base portion on the outer circumferential surface of the above-described cam cylinder 90, and the ring gear 98 is connected with the drive pinion 100 of the zoom drive motor 99 which is fixed to the camera body, through the reduction gear train 101. Accordingly, when zoom operations are conducted, the ring gear 98 and the cam cylinder 90 are rotated by the zoom drive motor 99 in the direction of wide-angle photography or telephotography, the first to third variable magnification lens system 49 is moved in the same direction, and the adjusted position of the fourth variable magnification lens system 46 is automatically determined according to the amount of movement of the first to third variable magnification lens system 49.

The barrier 103 is provided inside the movable barrel 43. When the above-described movable barrel 43 is moved from the wide-angle position to the stored position, the above-described barrier 103 is moved from the open position shown in the drawing to the closed position shown by a two-dotted-chain-line in the drawing so that the lens can be protected.

Lens Position Control

Next, the position control of an inner focal type of lens will be explained in detail.

Figure 12:
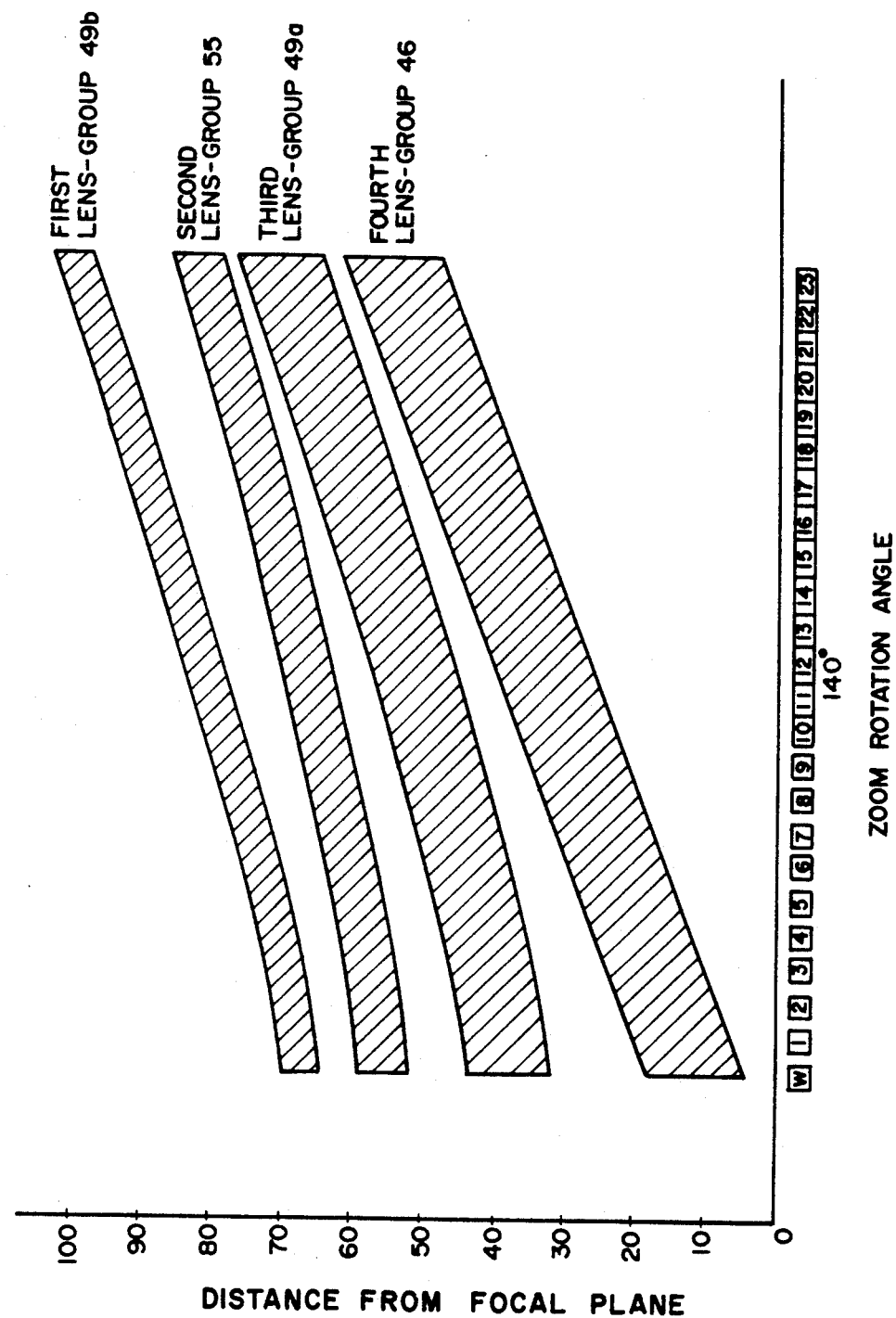
FIG. 12 is a diagram which shows a curve of lens movement.

FIG. 12 is a graph showing a lens movement curve, wherein the horizontal axis represents the rotation angle of the zoom lens and the vertical axis represents the distance from the camera to the surface to be photographed. The first-third variable magnification lens system 49 is composed of the first variable magnification lens group 49b and the third variable magnification lens group 49a, wherein both of them are connected and moved integrally. The fourth variable magnification lens group 46 is provided on the side of the surface to be photographed and linked with the first-third variable magnification lens system 49 through a zoom-cam-mechanism, and both of them are moved by different distances.

The second variable magnification lens group 55 are placed between the first variable magnification lens group 49b and the third variable magnification lens group 49a, and moved by the focusing motor 69 which is a focusing actuator. The second variable magnification lens group 55 is moved in such a manner that the distance from the first-third variable magnification lens group 49 or the fourth variable magnification lens group 46 is changed.

The zooming control of the fourth variable magnification lens group 46 is conducted in such a manner that: the angle of rotation from the wide-angle photographing end to the telephotographing end is 140°; and step control of 24 steps is conducted, wherein one step is set to about 6°.

Figure 13:
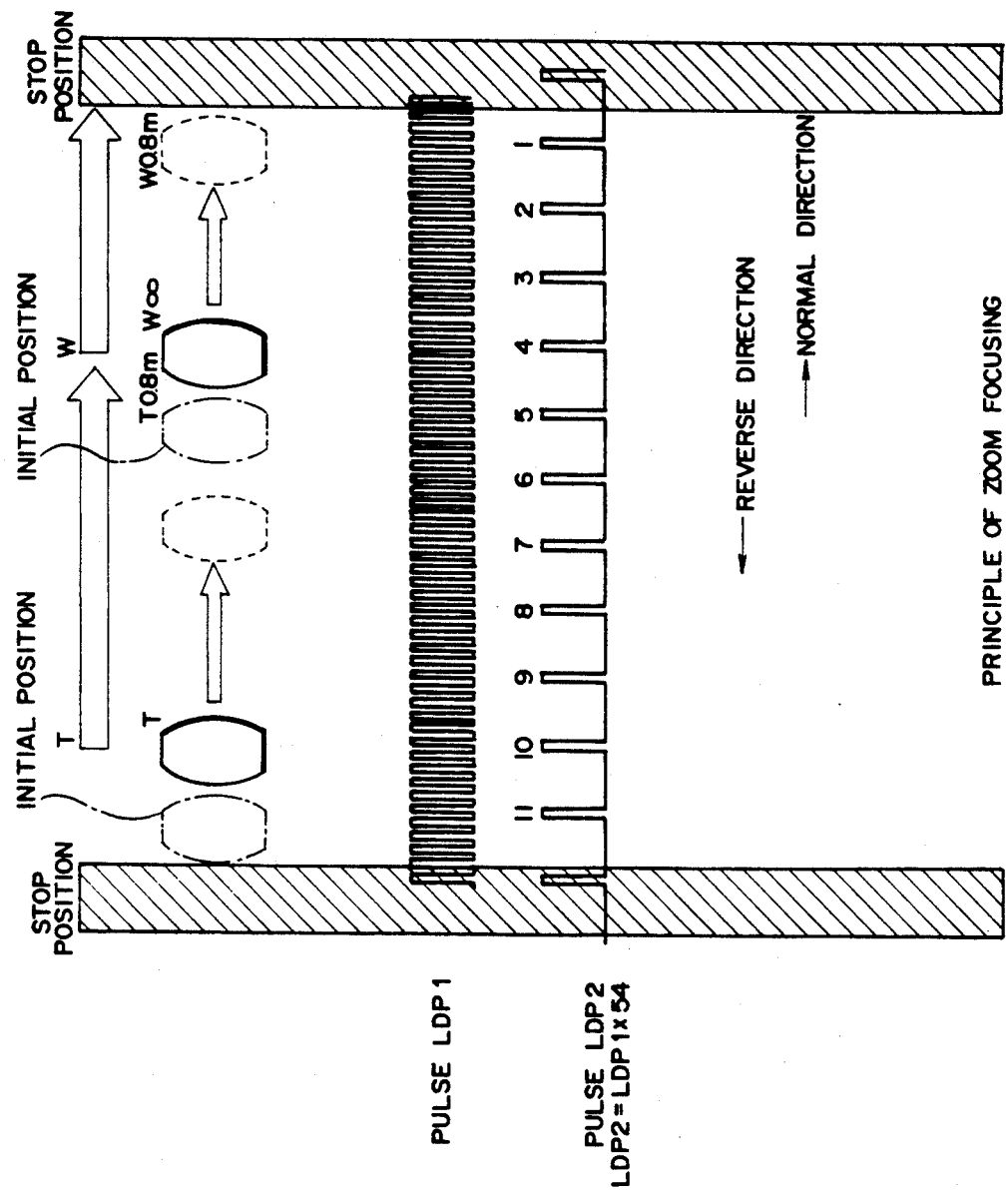
FIG. 13 is an illustration which shows the principle of zoom focusing.

FIG. 13 is an illustration showing the principle of zoom-focusing. This drawing shows the control of the focal lens of the second variable magnification lens group 55.

As described above, pulse LDP 1 can be obtained from the photointerrupter 77 which detects the rotation of the three-blades 76. This pulse LDP 1 is used in order to maintain the accuracy of focusing operation and to determine the final focusing position when the pulse is corrected, for example when correction is conducted at each zoom.

Pulse LDP 2 is obtained from the photointerrupter 83 which detects the rotation of one-blade 82. This pulse LDP 2 is used in order to roughly determine the zoom zone which is moved in zooming, and is used as a trigger pulse by which counting of pulse LDP 1 is started. When 54 pulses of pulse LDP 1 are inputted, one of pulse LDP 2 is inputted.

As illustrated in FIG. 13, the stop positions are set on both sides which mechanically restricts the movement of the focal lens, and the focal lens is moved between the stop positions. When the focal lens is to be stored, it is stopped in the position of the front stopper. The focusing motor 69 is controlled by pulse LDP 1 and pulse LDP 2 so that focusing can be conducted. In the drawing, when the motor is reversely rotated, the focal lens is moved to the left, and when the motor is normally rotated, the focal lens is moved to the right.

When the focal lens is in the position shown by a solid line, it is in the state of wide-angle-photography of infinity and telephotography of infinity. When the focal lens is in the position shown by a broken line, it is in the state of wide-angle-photography of 0.8 m and telephotography of 0.8 m. When the focal lens is in the position shown by a one-dotted-chain-line, it is in the initial position, and while the camera is in the waiting condition, the focal lens is maintained in this position.

Accordingly, when the main switch is turned on, the stored barrel is zoom-driven as far as the wide-angle-photography position; the focusing motor 69 is energized so that it can be rotated reversely; and after five pulses of LDP 2 have been counted, the focusing motor is stopped. At this moment, when the focal lens has reached the stop position, which is the front bump of the focal lens, the camera is in the state for wide-angle-photography. In this way, the focal lens is moved to the initial position for focusing which is shown by a one-dotted-chain line, and when the lens barrel is in the position of wide-angle photography, the focus is controlled forward from this position. When the focal lens is zoom-driven and moved to the position of telephotography, the focus is zoom-adjusted from the initial moving position on the wide-angle-photography side to the initial moving position on the telephotography side. When photographing is conducted in the condition described above, the focus is controlled forward, In this example, an inner focus is used, so that the amount of focal lens movement needed for focusing in the case of telephotography is different from that in the case of wide-angle-photography when focusing is conduced on a finite distance. When the focal lens placed in a predetermined position on the wide-angle-photography side, is moved to the telephotography side, the positions of the focal lens differ.

Figure 14:
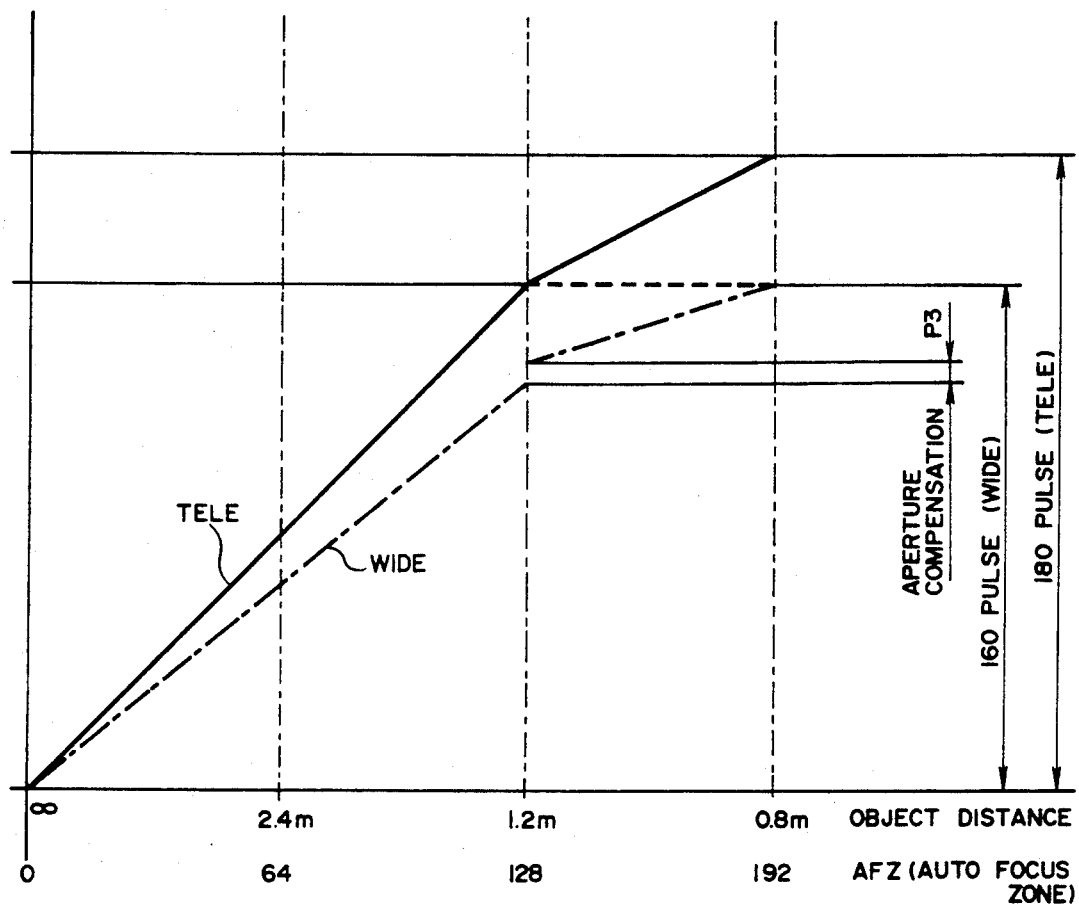
FIG. 14 is a graph which shows the principle of focus correction.

FIG. 14 is an illustration which shows the principle of focusing position correction.

In the case of inner focus, the correction of focusing position illustrated in FIG. 14 is necessary. The distance from the camera to a subject is set on the horizontal axis by 0.8 m to infinity, and the numerals for automatic focusing are set with regard to this distance. The amount of lens movement is shown on the vertical axis, and the number of pulses on the wide-angle-photography side is set to 160 and that on the telephotography side is set to 180.

In this drawing, the movement of the focal lens on the telephotography side is shown by a solid line, and that on the wide-angle-photography side is shown by a one-dotted-chain-line. In the case described above, even if the infinite position is set in both the wide-angle-photography side and the telephotography side, the amount of lens movement on the telephotography side and that on the wide-angle-photography side are different when the focus is adjusted to a subject, the distance of which from the camera is 1.2 m, for example. On the wide-angle-photography side, the control is conducted under the condition that the lens is stopped down, and especially when the subject is closer to the camera, the lens is further stopped down in order to improve the resolution. In other words, the position where the resolution becomes a peak value is varied according to the stop value, so that the amount of focal lens extension is supplemented in the case in which the focus is adjusted to a subject close to the camera.

The focus position correction is conducted as follows: when the camera-to-subject distance is 1.2 m to infinity, the drive pulse is set to the value of P1×AFZ/128; and when the camera-to-subject distance is 0.8 m to 1.2 m, the amount of lens extension is corrected by the value of P1+P2 (AFZ−128) of the drive pulse 1 on the telephotography side, and the amount of lens extension is corrected by the value of P1+P2 (AFZ−128)/64+P3 of the drive pulse on the wide-angle photography side.

The above-described pulse data is stored in EEPROM at 24 stepped zooming stop positions.

The infinity position is corrected by the pulse LDP 2 and shift pulse.

Figure 15:
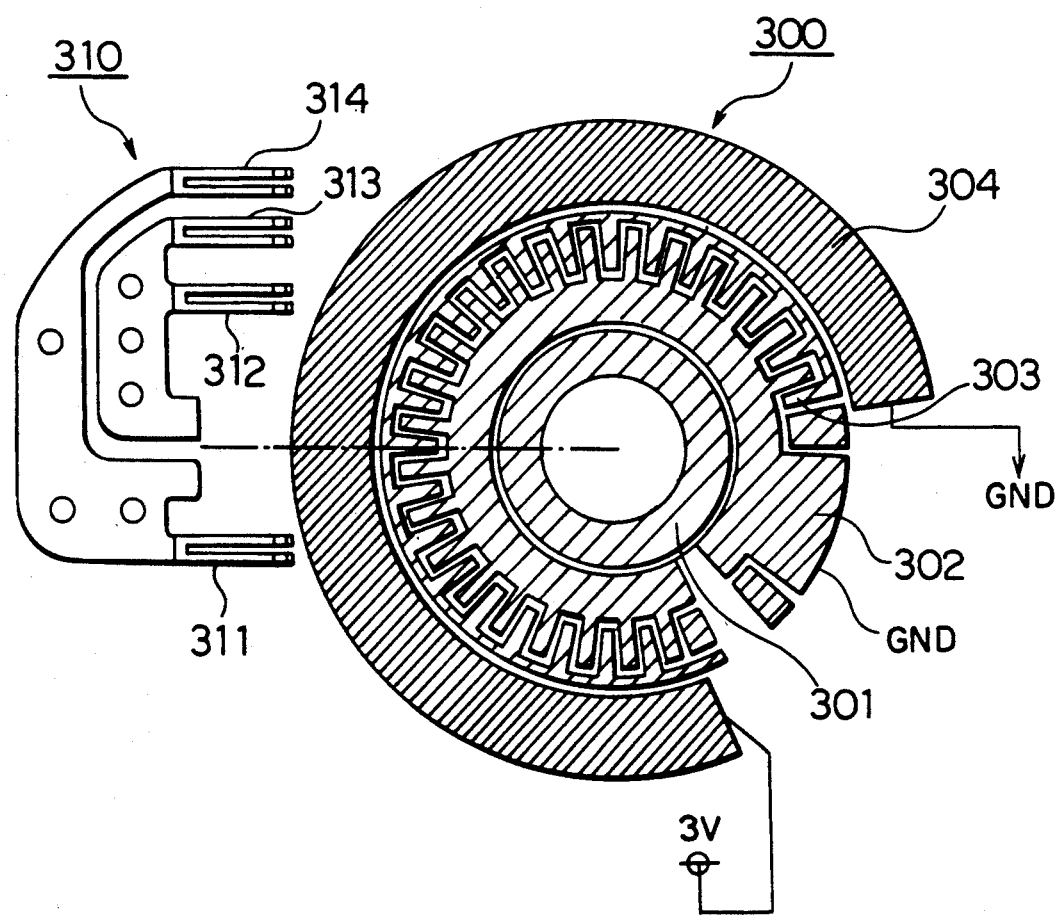
FIG. 15 is a drawing which shows an encoder for controlling a zoom position.
Figure 16:
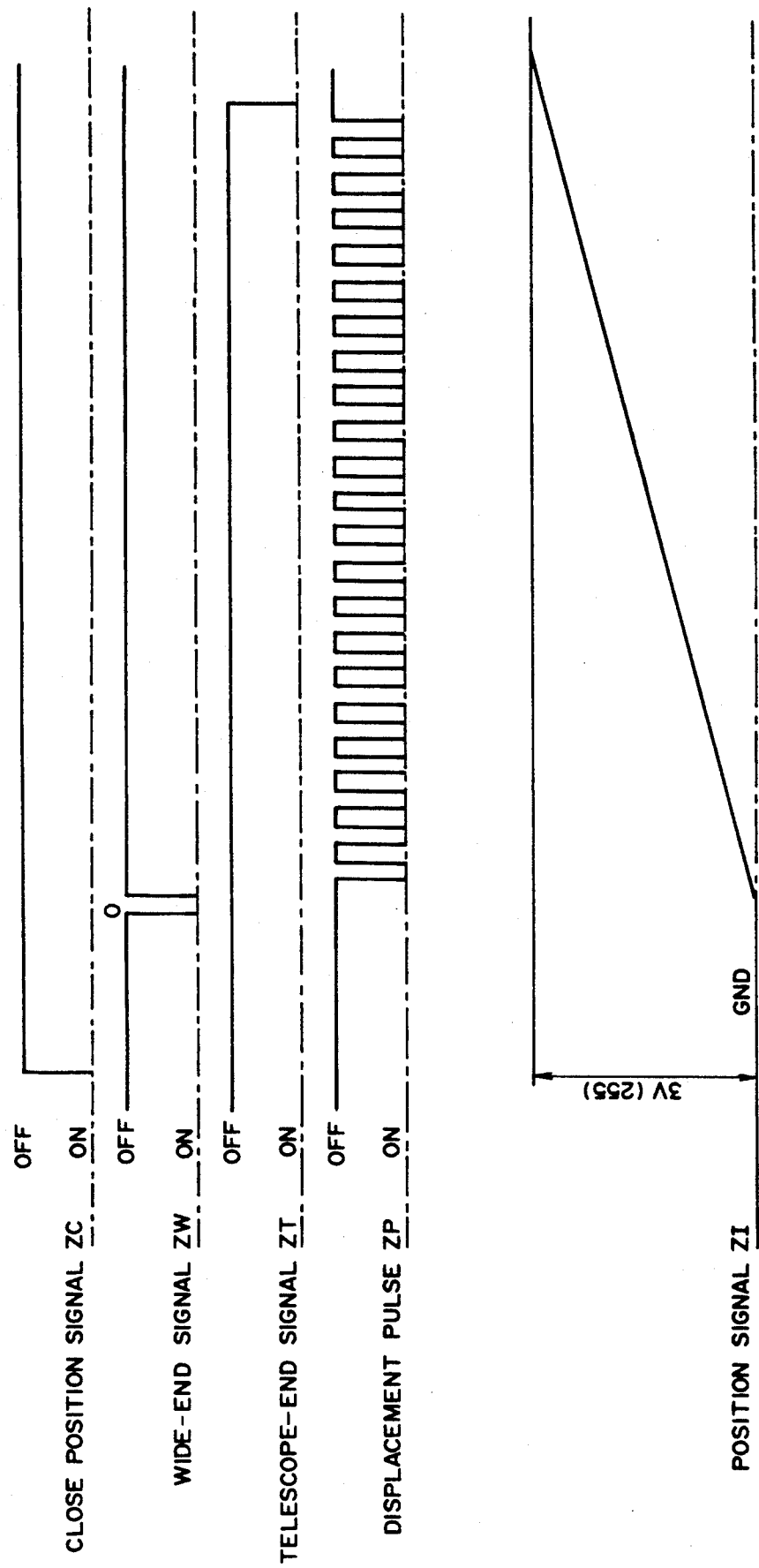
FIG. 16 is a timing chart of a zoom switch.

FIG. 15 is a drawing showing an encoder which is used for position control; and FIG. 16 is a zoom switch timing chart.

FIG. 15 shows an encoder comprised of a sliding pattern and sliding contact piece by which signals for zoom controlling can be obtained, and the zoom position signal is obtained by the sliding resistance pattern 300 and the sliding contact piece 310. The sliding resistance pattern 300 and sliding contact piece 310 are placed in the position where the reduction gear train 101 is located which transmits the dynamic force of the zoom drive motor 99 to the cam cylinder 90. The sliding contact piece 310 is fixed to a gear of the reduction gear train 101 so that it Can be rotated together with the gear, and the sliding resistance pattern 300 is placed in the position opposed to the sliding contact piece 310 on the camera body side. The sliding contact piece 310 is rotated in accordance with the extension of the lens and slid on the sliding resistance pattern 300.

This sliding resistance pattern 300 is composed of the first pattern 301, the second pattern 302, the third pattern 303 and the fourth pattern 304 which are arranged from the inside to the outside. The sliding contact piece 310 is composed of the first contact piece 311, the second contact piece 312, the third contact piece 313 and the fourth contact piece 314.

The fourth pattern 304 is composed of a sliding resistance, the edge portion on the wide-angle-photography side of which is connected with GRND and that on the telephotography side of which is impressed with a voltage of 3 V. Zoom position signal Z1 of analog voltage, which is shown in FIG. 16, is obtained by the first pattern 301, the fourth pattern 304, the first contact piece 311 and the fourth contact piece 314. This zoom position signal Z1 is A/D-converted and used in order to obtain zoom zone ZZ from the table which is stored in EEPROM shown in Table 1. In this table are set zoom correction value FZ corresponding to zoom zone ZZ and photometry correction value AE.

The second pattern 302 and the third pattern 303 form a digital pattern. By the second contact piece 312 and the third contact piece 313 are obtained zoom close position signal ZC, zoom wide-angle photography edge signal ZW, zoom telephotography edge signal ZT and digital zoom moving pulse signal ZP which are shown in FIG. 16.

Consequently, when the zoom operation signal is inputted by the operation of the operation button 13, zoom position signal Z1 is A/D-converted so that zoom zone ZZ shown in Table 1 can be obtained, before the zoom drive motor 99 is rotated for zoom operation. In the way described above, the present position of the focal lens can be obtained. However, when zoom wide-angle-photography edge signal ZW or zoom telephotography edge signal ZT is inputted, zone position [0] or [23] can be obtained without A/D conversion.

Then, the zoom drive motor 99 is driven in accordance with the input of the zoom operation signal. After the operation button is released, the zoom drive motor is stopped at a predetermined position of the zoom extension pulse signal ZP. Zoom zone ZZ is obtained by A/D-converting zoom position signal ZI which is obtained in the above-described process.

The difference between focus zone FZ in zoom zone ZZ which has been obtained before the zoom operation and focus zone FZ in zoom zone ZZ which has been obtained after the zoom operation, is found.

The position of the focal lens is changed in order to adjust the zoom focus according to the obtained difference.

TABLE 1

Z1 INPUT TABLE

| ZZ | Sw | ZI [A/D] | FZ | AE |
|---|---|---|---|---|
| 0 | Zw | — | 0 | 0 |
| 1 | | 0 > 13 | 1 | 0 |
| 2 | | 14 > 24 | 1 | 1 |
| 3 | | 25 > 35 | 1 | 1 |
| 4 | | 36 > 46 | 1 | 2 |
| 5 | | 47 > 57 | 1 | 2 |
| 6 | | 58 > 68 | 2 | 3 |
| 7 | | 69 > 79 | 2 | 3 |
| 8 | | 80 > 90 | 2 | 4 |
| 9 | | 91 > 101 | 3 | 4 |
| 10 | | 102 > 112 | 3 | 5 |
| 11 | | 113 > 123 | 3 | 5 |
| 12 | | 124 > 134 | 3 | 6 |
| 13 | | 135 > 145 | 4 | 6 |
| 14 | | 146 > 156 | 4 | 7 |
| 15 | | 157 > 167 | 5 | 7 |
| 16 | | 168 > 178 | 5 | 8 |
| 17 | | 179 > 189 | 5 | 8 |
| 18 | | 190 > 200 | 6 | 9 |
| 19 | | 201 > 211 | 6 | 9 |
| 20 | | 212 > 222 | 6 | 10 |
| 21 | | 223 > 233 | 6 | 10 |
| 22 | | 243 > 255 | 6 | 11 |
| 23 | ZT | — | 6 | 11 |

FIGS. 17(a), 17(b), 17(c) and 17(d) are timing charts of zooming operations.

FIGS. 17(a) and 17(b) are timing charts zooming-up operations. According to the timing chart of FIG. 17(a), operations are conducted as follows: when zoom moving pulse signal ZP is OFF, zoom-up signal ZU is changed from ON to OFF by releasing press operation portion 13a of the operation button 13; and at the timing in which zoom moving pulse signal ZP is changed from OFF to ON, the electrification of the zoom drive motor is changed from the state of normal operation to reverse operation so that the zoom lens can be stopped in the position of ON between the zoom moving pulse signals 3 and 4.

According to the timing chart of FIG. 17(b), the operations are conducted as follows: when zoom moving pulse signal ZP is ON, zoom-up signal ZU is changed from ON to OFF by releasing press operation portion 13a of the operation button 13; and after zoom moving pulse signal ZP has become OFF, at the timing in which pulse signal ZP is changed from OFF to ON, the electrification of the zoom drive motor is changed from the state of normal operation to reverse operation so that the zoom lens can be stopped in the position of ON between the zoom moving pulse signals 4 and 5.

FIGS. 17(c) and 17(d) are timing charts of zoom-down. According to FIG. 17(c), the operations are conducted as follows: when zoom moving pulse signal ZP is OFF, zoom-down signal ZD is changed from ON to OFF by releasing the press operation portion 13b of the operation button 13; at a timing in which zoom moving pulse signal ZP is changed from OFF to ON, the electrification of the zoom drive motor is changed from the state of reverse rotation to normal rotation; and at a timing in which the subsequent zoom moving pulse signal ZP is changed from OFF to ON, the electrification of the zoom drive motor is changed from the state of normal operation to reverse operation so that the zoom lens is stopped in the position of ON between the zoom moving pulse signals 8 and 9.

According to FIG. 17(d), the operations are conducted as follows; when zoom moving pulse signal ZP is ON, zoom-down signal ZD is changed from ON to OFF by releasing press operation portion 13b of operation button 13; after zoom moving pulse signal ZP has become OFF, at a timing in which zoom moving pulse signal ZP is changed from OFF to ON, the electrification of the zoom drive motor is changed from the state of reverse rotation to normal rotation; and at a timing in which the subsequent zoom moving pulse signal ZP is changed from OFF to ON, the electrification of the zoom drive motor is changed from the state of normal operation to reverse operation so that the zoom lens is stopped in the position of ON between the zoom moving pulse signals 7 and 8.

In the manner described above, zoom stop is conducted as follows: when zoom-up signal ZU or zoom-down signal ZD is inputted during a normal drive of the zoom lens, zoom operation is stopped immediately after zoom moving pulse signal ZP has been changed from OFF to ON. Only when the position in which zoom moving pulse signal ZP is changed from OFF to ON during a normal rotation is utilized, can the accuracy of zoom stop position be improved.

Before the zoom operation is stopped, it is grasped that the switch of zoom moving pulse signal ZP is in the state of OFF, and the zoom motor is controlled at a timing in which the switch becomes ON. Since the motor is controlled in the state of ON, chattering can be eliminated. In the way described above, the overrun of the drive motor 99 in the chattering mask time can be shortened, and the dependence on moving speed and temperature can be absorbed, and further the difference between individual mechanisms can be also absorbed, so that the accuracy of the stop position of the zoom drive motor 99 can be improved.

When the zoom motor is stopped during reverse rotation, the zoom motor is normally driven to a point just before the stop, position so that the backlash of the mechanical structure can be absorbed. In this case, the stroke driven normally is at least the pulse width of zoom moving pulse signal ZP, so that even when a voltage fluctuation occurs, the stroke driven normally is constant. Accordingly, the motor stopping accuracy can be improved.

Furthermore, just before the motor is stopped, it is reversely electrified for braking so that overrun can be shortened when it is stopped. Consequently, the dependence on temperature can be absorbed. Furthermore, the dependence on the battery voltage can be absorbed since the normal and reverse rotations are conducted by the same voltage.

The periods in which this reverse electrification is impressed is controlled according to the atmospheric temperature, the battery voltage and the information about the individuals.

FIGS. 18(a) and 18(b) show the zoom lens movement in the automatic zoom modes illustrated in FIGS. 17(b) and 17(d). In an automatic zoom timing chart in which the focal distance is moved to the telephotography side by two pulses according to the information about the camera-to-subject distance, zoom moving pulse signal ZP is counted from OFF to ON and 1 is added.

FIG. 18(a) shows an example in which the zoom lens is normally moved by 2 pulses, and when the counting operation has been completed, the stop operation is carried out in the same manner as when the zoom-up operation has been completed.

FIG. 18(b) shows an example in which the zoom lens is reversely moved by 2 pulses, and operations are conducted as follows: when counting has been completed in the same manner as when zoom-down has been completed, the mechanism waits for OFF of zoom moving pulse signal ZP; at a timing when signal ZP is changed from OFF to ON, the zoom drive motor is changed from the state of reverse electrification to the normal state; and then, at a timing when the subsequent zoom moving pulse signal ZP is changed from OFF to ON, the zoom drive motor is changed from the state of normal electrification to reverse electrification and stopped.

In the way described above, even when the zoom lens is on the reverse rotation side, stop processing is conducted in the same manner as when it is normally rotated, by rotating the zoom lens normally. Further, as described above, when the pulse count has been completed, the zoom drive motor is immediately stopped without using a special chattering mask, so that the movement of the zoom lens can be quickly stopped by predetermined processing and further, overrun can be reduced.

Accordingly, the above-described control is effective for an automatic zoom system in which the camera-to-subject distance is automatically computed and the amount of zooming is changed according to the results of the computation.

Figure 19:
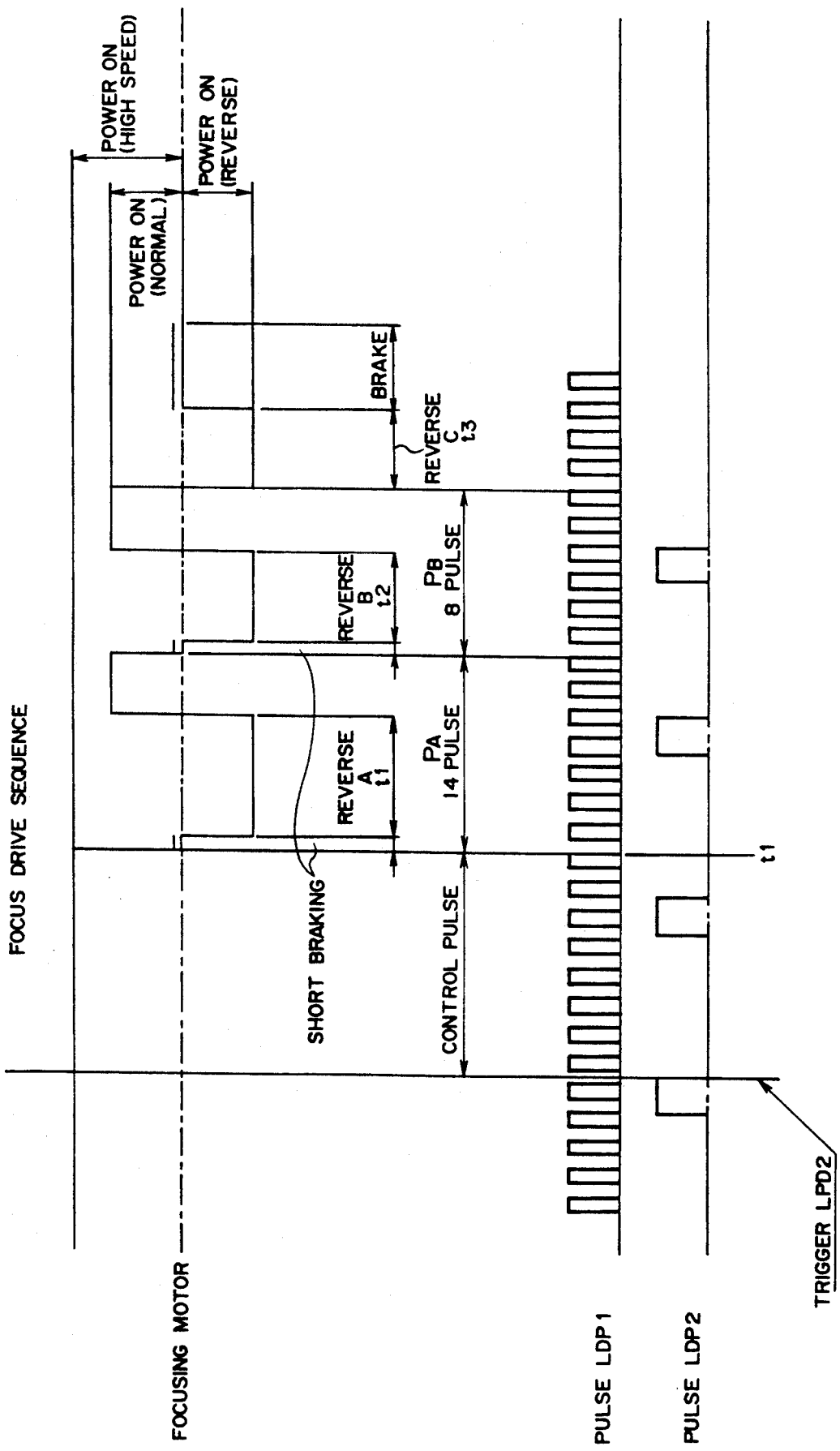
FIG. 19 is an illustration which shows the sequence of focusing drive.

FIG. 19 shows a focusing drive sequence.

When the focusing operation is stopped, the control is always conducted while the focal lens is being extended forward, in other words while the focusing motor is being normally rotated. The stop operation is carried out as follows: the focusing motor 69 is driven so as to focus the lens; the count of pulse LDP 1 is started, wherein the fall point of the first pulse LDP 2 is used as a trigger signal; and when the above-described pulse has been inputted, the stop control of the focusing motor is started. A brake is applied for a short time to the focusing motor 69, and constant voltage reverse electrification is conducted for t1 of reverse A time. Then, constant voltage normal electrification is conducted. A brake is applied for a short time again, and constant voltage reverse electrification is conducted for t2 of reverse B time. Further, constant voltage reverse electrification is conducted for t3 of reverse C time, and finally the zoom motor is stopped in a predetermined period of time.

Time t1 of reverse T time depends on the number of control pulses. As shown in FIG. 14, this control pulse depends on the results of range finding, and pulse LDP 1 which is set as the amount of motor rotation corresponding to the amount of targeted rotation control, depends on a shift pulse so that the infinity position can be determined. The setting of the control pulse on the telephotography side and that on the wide-angle photography side are different and they are set in each zoom zone ZZ.

Time t1 of reverse A time becomes longer in the case of many control pulses and becomes shorter in the case of few control pulses. Time t2 of reverse B time and time t3 of reverse C time function as follows: the brake time is set according to the moving speed of the focal lens; the stop control is conducted according to the moving speed of the focal lens; the zoom lens can be stopped, never exceeding a predetermined overrun; and further the amount of overrun can be reduced.

In the way described above, time t1 of reverse A time depends on the control pulse, and as an example it may be set as described in Table 2.

TABLE 2

| COMPUTATION OF T1 | |
|---|---|
| LDP | (t1) msec |
| 0–15 | 5.5 |
| 16–31 | 6.0 |
| 32–63 | 6.5 |
| 64–127 | 7.0 |
| 128–255 | 7.5 |

Time t2 of reverse B time is set depending on: the brake time; time t1 of reverse A time in which constant voltage reverse electrification is conducted; and the operating time of predetermined pulses ($P_A$), for example 14 pulses, which are inputted during the period of constant voltage normal electrification.

Further, time t3 of reverse C time is set depending on: the brake time; time t2 of reverse B time in which constant voltage reverse electrification is conducted; and the operating time of predetermined pulses ($P_B$), for example 8 pulses, which are inputted during the period of constant voltage normal electrification.

These times t2 of reverse B time and time t3 of reverse C time are shown in Table 3.

TABLE 3

| COMPUTATION OF t2 AND t3 | |
|---|---|
| LDT1 + (t1) + 0.2 msec | (t2) msec |
| LDT2 + (t2) + 3.5 + 0.2 msec | (t3) msec |
| 0–8 smaller than | 3.0 |
| 8–8.5 | 2.8 |
| 8.5–9 | 2.6 |
| 9–9.5 | 2.4 |
| 9.5–10 | 2.2 |
| 10–10.5 | 2.0 |
| 10.5–11 | 1.8 |
| 11–11.5 | 1.6 |
| 11.5–12 | 1.4 |

TABLE 3-continued

| COMPUTATION OF t2 AND t3 | |
|---|---|
| LDT1 + (t1) + 0.2 msec | (t2) msec |
| LDT2 + (t2) + 3.5 + 0.2 msec | (t3) msec |
| 12–12.5 | 1.2 |
| 12.5–13 | 1.0 |
| 13–13.5 | 0.8 |
| 13.5–14 | 0.6 |
| 14–14.5 | 0.4 |
| 14.5–15 | 0.2 |
| 15 not less than | 0 |

In order to avoid affecting the zoom motor, the brake time, before time t1 of reverse A time and time t2 of reverse B time, is limited to a very short period, for example 200 μsec. The brake time after reverse time C is set to 200 msec, for example. Each of them is set to a predetermined value, and the focusing motor 69 is stopped in a short period of time with the brake.

As described above, the MAIN-CPU 200 is provided with : a stop means which stops the focusing motor 69 by repeatedly applying the brake of reverse and normal electrification; and a control means which sets the subsequent electrification time according to the electrification time needed for the brake operation by reverse and normal electrification. The MAIN-CPU 200 can control the brake operation in accordance with the moving speed of the focal lens, make the amount of overrun constant, and further stop the movement of the focal lens in a short period of time very accurately.

Time t1 of reverse A time, t2 of reverse B time and t3 of reverse C time are corrected according to the temperature, the voltage of the power source and the information about the difference between individuals.

Range Finding and Photometry Device

The range finding device of a camera is made in such a manner that: the range finding point is variable; and the range finding direction can be changed stepwise to the right and left by the pressing operation of an operation button. The photometry direction of the photometry device can be also changed integrally with the range finding device.

Figure 20:
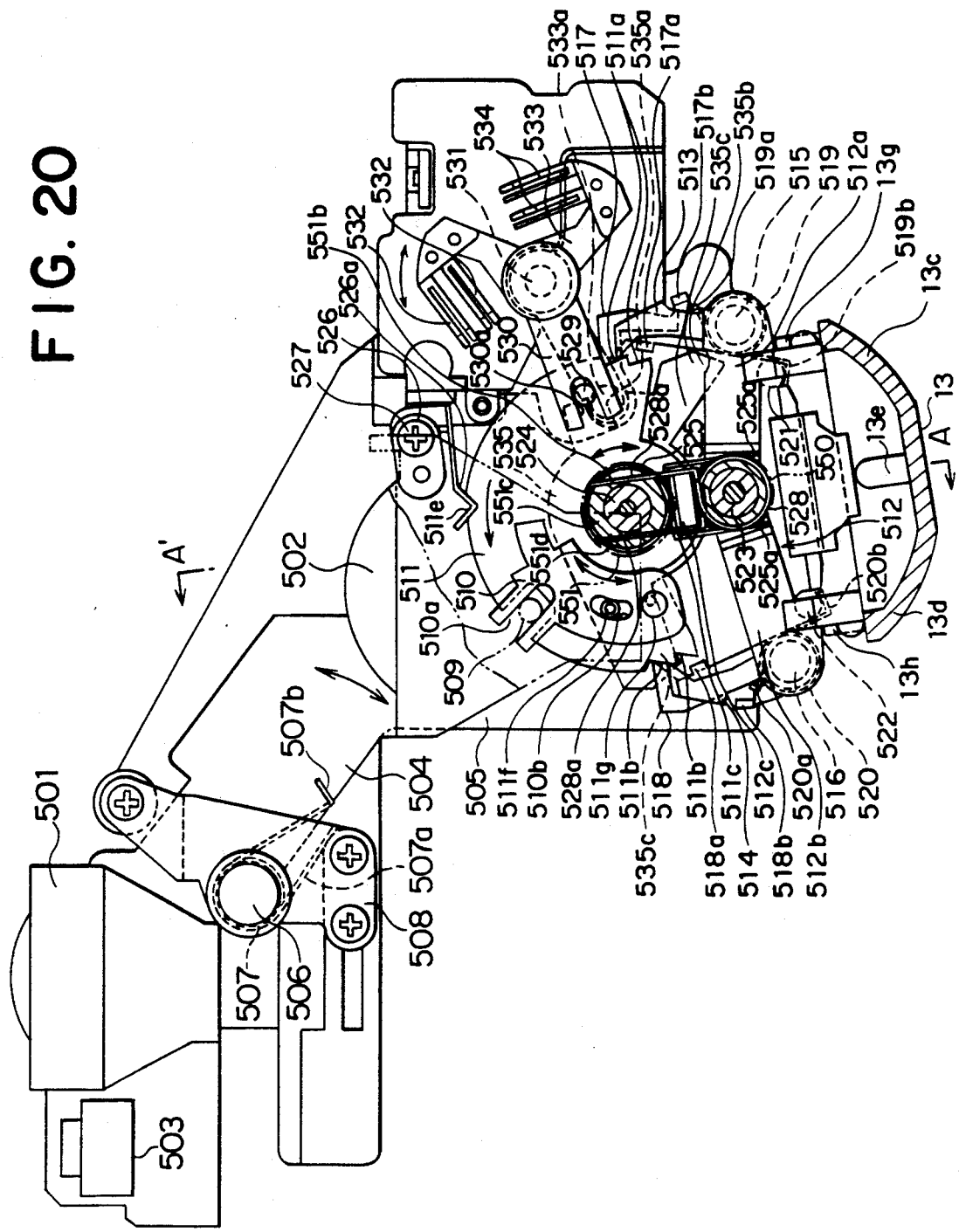
FIG. 20 is a plan view of a range finding and photometry device.
Figure 21:
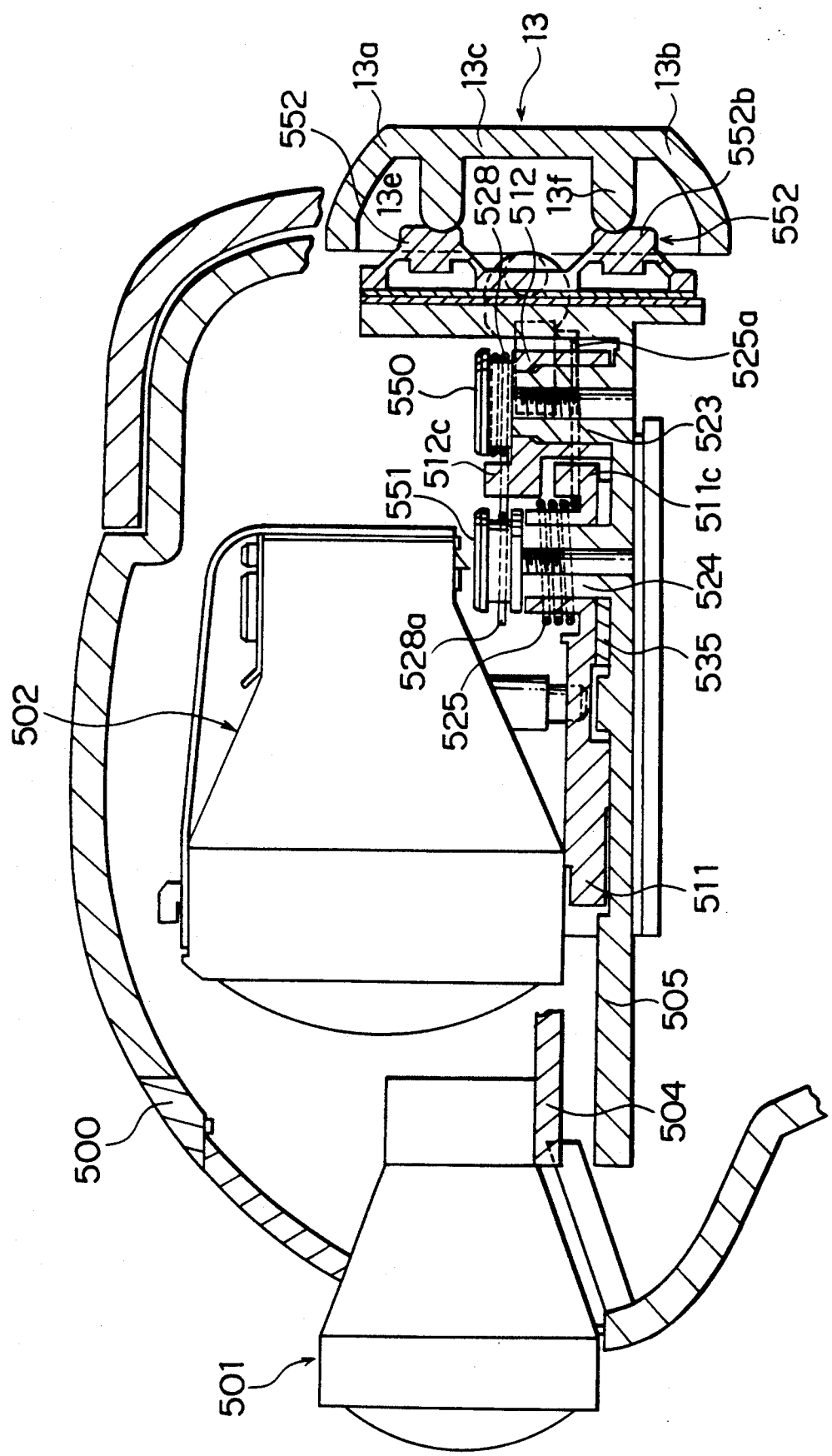
FIG. 21 is a sectional view taken on line A—A' of the range finding and photometry device.

FIG. 20 is a plan view of the range finding and photometry device; and FIG. 21 is a sectional view taken on line A—A' in the drawing of the range finding and photometry device.

The range finding light projecting portion 501, the range finding light receiving portion 502 and the photometry portion 503 are located in the position close to the front cover 500 of the camera, and each of them is mounted on the range finding base 504.

This range finding base 504 is engaged with the supporting shaft 506 mounted on the moving target base 505 which is fixedly held by the main body, wherein the range finding base 504 can be rotated to the right and left around the support shaft 506 so that the directions of the range finding light projecting portion 501, the range finding light receiving portion 502 and the photometry portion 503 can be changed. The support shaft 506 is provided with the position restricting spring 507, one end 507a of which is held by the stopper 508 which is fixed to the moving target base 505, and the other end 507b of which is held by the photometry base 504. This position restricting spring 507 restricts the backlash of the support shaft 506 in the circumferential and axial directions.

The range finding base 504 is provided with the connecting pin 509, which is engaged with the cut-out portion 510a of the adjustment plate 510. The adjustment plate 510 is fixed to the drum 511, and when the drum 511 is rotated to the right and left around the support shaft 524, the range finding base 504 is linked and rotated by a predetermined angle. In the adjustment plate 510, the long hole 510b is formed circumferentially in such a manner that the support shaft 524 of the drum 511 is the center of the long hole 510b. The pin 511f of the drum 511 is inserted into the long hole 510b, and the positional relation can be adjusted by the eccentric pin 511g so that the position of range finding can be adjusted in assembly.

Two steps of operating grooves 511a and 511b are formed in the position opposed to the drum 511. The operating grooves 511a and 511b are engaged with the feed claws 513 and 514 which are rotatably provided around the shafts 512a and 512b mounted on both ends of the moving target lever 512 that is rotatably provided to the support shaft 523 of the moving target base 505, and are engaged with the fixed claws 517 and 518 which are rotatably provided to the support shaft 515 and 516 of the moving target base 505. The moving target lever 512 is operated as follows: when one end of the moving target lever 512 is pushed, the feed claws 513 and 514 of the other end are released from the operating grooves 511a and 511b and withdrawn; and at the same moment, the rising portions 517b and 518b of the fixed claws 517 and 518 are pushed so that the fixed claws are released from the operating grooves and withdrawn.

The downward stopper portions 517a and 518b are formed on the drum side of the fixed claws 517 and 518, and the upward rising portions 517b and 518b are formed on the non-drum side. The support shafts 515 and 516 are provided with the springs 519 and 520, ends 519a and 520a of which are fixed to the fixed claws 517 and 518, and the other ends 519b and 520b of which are fixed to the stoppers 521 and 522 provided on the moving target base 505 so that the fixed claws 517 and 518 can be always pushed and contacted with the operating grooves 511a and 511b of the drum 511.

The moving target lever 512 is rotatably provided to the support shaft 523 of the moving target base 505. The mounting shaft portion 550 which is screwed to the support shaft 523, is provided with the return spring 528; both end portions 528a of the return spring 528 are engaged with the stopper portion 551d formed on the shaft portion 551c of the mounting shaft portion 551 screwed to the support shaft 524; and the moving target lever 512 is always pushed to the initial position through the stopper portion 512c.

The cut-out portion 511e is formed on the outer circumferential surface of the drum 511, and the spring portion 526a of the center click plate 526 is engaged with the cut-out portion 511e. The center click plate 526 is fixed on the moving target base 505 with the screw 527; the drum 511 is held in the initial position by the action of the center click plate 526; and the range finding light emitting portion 501, the range finding light receiving portion 502 and the photometry portion 503 are placed in the center.

The return spring 525 is mounted on the shaft portion of the drum 511; both ends 525a of the return spring 525 are engaged with the shaft portion of the moving target lever 512; and the drum 511 is always pushed toward the initial position by the return spring 528 through the stopper portion 511c.

The feed claws 513 and 514, which are mounted on both ends of the moving target lever 512, and which are rotatably pushed toward the drum 511 by the springs 519 and 520, engage with the operating grooves 511a and 511b of the drum 511, and rotates the drum 511 stepwise to the right and left of the moving target lever 512. The fixed claws 517 and 518 are placed below the feed claws 513 and 514.

The moving target lever 512 is rotated to the right and left around the support shaft 523 when the operation button 13 is pressed. When the moving target lever 512 is rotated, the feed claws 513 and 514 placed in the rotative direction, are engaged with the operating grooves 511a and 511b of the drum 511 and moved. In the way described above, the drum 511 is rotated; the fixed claws 517 and 518 placed in the rotative direction are engaged with the subsequent operating grooves 511a and 511b on the drum 511; and the drum 511 is rotated by an angle corresponding to a step of the operating grooves 511a and 511b, and then the drum 511 is held in position. At this moment, the feed claws 513 and 514 in the non-rotative direction come into contact with the rising portions 517b and 518b of the fixed claws 517 and 518 by the rotation of the moving target lever 512, and rotate the fixed claws 517 and 518 against the force of the springs 519 and 520 so that engagement with the operating claws 511a and 511b in the rotative direction can be released and the drum 511 can be rotated. When the moving target lever 512 is returned to the initial position, the fixed claws 517 and 518 are released from the feed claws 513 and 514, so that the fixed claws 517 and 518 are engaged with the subsequent operating grooves 511a and 511b and the rotation of the drum 511 is restricted.

The protrusions 13e and 13f are provided in the upper and lower portions of the operation button 13, and the mounting portions 13g and 13h are provided in the right and left portions of the operation button 13, so that the operation button 13 can be used for zooming and moving target operations.

Namely, when the operating portion 13a of the operation button 13 is pressed, the protrusion 13e pushes the contact piece portion 552a of the switch 552 which is made from elastic conductive rubber and which is installed on the moving target base 505, so that the pattern of a flexible printed-circuit base, which is connected with the control unit of the main body, becomes continuous, and the focal distance of the zoom lens is moved to the telephotography side.

On the other hand, when the operating portion 13b of the operation button 13 is pressed, the protrusion 13f pushes the contact piece portion 552b, so that the pattern of the flexible printed-circuit base, which is connected with the control unit of the main body, becomes continuous, and the focal distance of the zoom lens is moved to the wide-angle-photography side.

When the operating portion 13d of the operation button 13 is pressed, the left side of the moving target lever 512 is pushed by the mounting portion 13h, and the drum 511 is rotated to the right through the feed claw 514, so that the range finding base 504 is rotated to the left and the direction of range finding and photometry is changed.

When the operating portion 13c of the operation button 13 is pressed, the right side of the moving target 512 is pushed by the mounting portion 13g, and the drum 511 is rotated to the left through the feed claw 513, so that the range finding base 504 is rotated to the right and the direction of range finding and photometry is changed to the right.

The pin 529 installed on the drum 511 is engaged with the cut-out portion 530a of the position detecting lever 530; the position detecting lever 530 is rotatably provided to the support shaft 531; when the position detecting lever 530 is rotated, the contact piece 532 is slid on a pattern not illustrated in the drawing so that the information about drum rotation is outputted; and the information about the position of the range finding base 504 can be obtained in the range finding control.

The release lever 533 is rotatably provided to the support shaft 531; the contact piece 534 is mounted on the release lever 533; and the release lever 533 is operated by the operation of the main switch 8 which can select two positions by a click. The shaft portion 533a provided to the release lever 533 is engaged with the cut-out portion 535a of the release plate 535 which is rotatably provided to the shaft portion 511c of the drum 511, and when the release lever 533 is operated, the release plate 535 is rotated clockwise or counterclockwise.

Consequently, when the main switch 8 is turned off, the release lever 533 is rotated clockwise. When the release plate 535 is rotated counterclockwise in the state described above, its operating portions 535b and 535c contact with and push the stoppers 517a and 518a of the fixed claws 517 and 518. Therefore, the fixed claws 517 and 518 are rotated around the support shaft 515 and 516 against the force of the springs 519 and 520 in a direction so that the fixed claws 517 and 518 can be separated from the operating grooves 511a and 511b. Since the restriction of the drum 511 position is released in the way described above, the drum 511 is returned to the initial position by the return spring 525, and the cut-out portion 511e of the drum 511 is engaged with the click portion 526a of the center click plate 526, so that the drum 511 is kept in this initial position. Consequently, when the main switch 8 is turned off, the moving target is always automatically returned to the central position, so that subsequent photographing is ready without any special operations.

Range Finding Control

Figure 22:
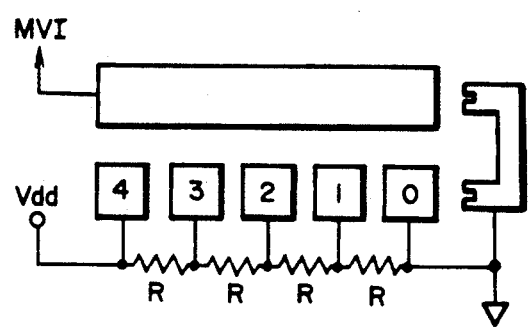
FIG. 22 is an illustration which shows a wiring diagram in which moving target information is obtained from the range finding device illustrated in FIGS. 20 and 21.

Next, the information set of a moving target will be explained as follows. FIG. 22 is a schematic illustration to obtain the moving target information from the range finding device shown in FIGS. 20 and 21.

The direction of the range finding base 504 is changed according to the rotation of the drum 511 shown in FIG. 20; by the operation described above, the contact piece 532 of the position detecting lever 530 is connected with the patterns 0-4 illustrated in FIG. 22; and then analog voltage MVI can be obtained in accordance with the patterns 0-4. This analog voltage MVI is A/D converted and range finding direction position information MVZ is found from this A/D value. In this example, the deviation angle of the range finding device can be detected as follows: when range finding direction position information MVZ is 0, the deviation angle is 6.6° to the left; when MVZ is 1, it is 3.3° to the left; when MVZ is 2, it is central; when MVZ is 3, it is 3.3° to the right; and when MVZ is 4, it is 6.6° to the right.

According to this range finding direction position information MVZ and focal distance information ZZ, moving target position information MV is selected from the moving target table shown in Table 4.

TABLE 4

| f (nm) | ZZ | 0 (Left 6.6°) | 1 (Left 3.3°) | 2 (Center) | 3 (Right 3.3°) | 4 (Right 6.6°) |
|---|---|---|---|---|---|---|
| (35) | | | | | | |
| 36 | 0 | 5 | 6 | 7 | 8 | 9 |
| 38 | 1 | 5 | 6 | 7 | 8 | 9 |
| 40 | 2 | 5 | 6 | 7 | 8 | 9 |
| 43 | 3 | 4 | 6 | 7 | 8 | 10 |
| 45 | 4 | 4 | 6 | 7 | 8 | 10 |
| 47 | 5 | 4 | 6 | 7 | 8 | 10 |
| 50 | 6 | 4 | 6 | 7 | 8 | 10 |
| 53 | 7 | 4 | 5 | 7 | 9 | 10 |
| 55 | 8 | 4 | 5 | 7 | 9 | 10 |
| 58 | 9 | 3 | 5 | 7 | 9 | 11 |
| 61 | 10 | 3 | 5 | 7 | 9 | 11 |
| 64 | 11 | 3 | 5 | 7 | 9 | 11 |
| 67 | 12 | 3 | 5 | 7 | 9 | 11 |
| 70 | 13 | 3 | 5 | 7 | 9 | 11 |
| 73 | 14 | 3 | 5 | 7 | 9 | 11 |
| 77 | 15 | 3 | 5 | 7 | 9 | 11 |
| 80 | 16 | 2 | 5 | 7 | 9 | 12 |
| 84 | 17 | 2 | 4 | 7 | 9 | 12 |
| 88 | 18 | 2 | 4 | 7 | 10 | 12 |
| 71 | 19 | 1 | 4 | 7 | 10 | 12 |
| 74 | 20 | 1 | 4 | 7 | 10 | 13 |
| 97 | 21 | 1 | 4 | 7 | 10 | 13 |
| 100 (105) | 22 | 1 | 4 | 7 | 10 | 13 |
| 103 | 23 | 1 | 4 | 7 | 10 | 13 |
| MVI A/D Value | | 0-31 | 32-95 | 96-159 | 160-223 | 224- |

According to the selected moving target position information MV, one of 1-13 LCDs on the left side is selected and lit in the viewfinder display.

The display in the viewfinder is conducted in the way described above. Consequently, the photographer can easily check the position on which range finding is performed. In this example, the deviation angle of the range finding device can be changed over to the right and left by two steps, wherein the optical path of the picture-taking lens is used as the center. When the optical system is moved in the zooming operation, slippage is caused at a deviation angle other than the center of the above-described optical path, between the target frame display in the viewfinder and the range finding point of the range finding device. The reason why this slippage is caused, is as follows: when a zooming operation is conducted, the focal distance is varied, and as a result the magnification in the viewfinder is also varied, however the deviation angle of the range finding device is not varied. The correction can be conducted as follows: when the display position of the moving target in the viewfinder is varied, the range finding point can correspond to the moving target display, so that the variation of range finding between telephotography and wide-angle-photography can be eliminated.

Further, the information set of parallax correction will be explained as follows. Parallax correction is conducted when the photographing range of a picture-taking lens does not agree with the photographing range of a viewfinder. Parallax correction is conducted by controlling the turning on and off of the automatic parallax correction visual field frame 20 of the liquid crystal display which is provided in the optical path of the viewfinder.

Figure 23:
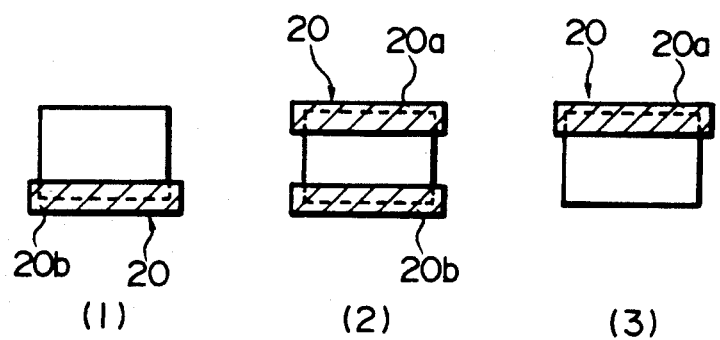
FIG. 23(1) to FIG. 23(3) are illustrations which show inside a viewfinder.

FIGS. 23(1) to 23(3) are illustrations showing the inside of the viewfinder. The display condition of the parallax which controls the visual field by turning on and off the visual field frames 20a and 20b, is selected as follows: range finding zone information AFZ is found according to camera-to-subject distance information X; and the display condition is selected form the parallax correction table shown in Table 5 according to this range finding zone information AFZ and focal distance information ZZ.

TABLE 5

| X (m) | (AFZ) | (ZZ) 0-7 Wide angle | 8-15 Standard | 16-23 Tele-photograph |
|---|---|---|---|---|
| ∞-3 | 0-63 | 1 | 1 | 1 |
| 3-1.2 | 64-127 | 1 | 1 | 2 |
| 1.2-0.8 | 128-192 | 1 | 2 | 3 |

Namely, in the case where range finding information AFZ is 0 to 63, the correction shown in FIG. 23(1) is conducted without any relation to focal distance information ZZ. In the case where range finding zone information AFZ is 64 to 127, correction is conducted as follows: when focal distance information ZZ is on the telephotography side, the correction shown in FIG. 23(2) is conducted. In the case where range finding zone information AFZ is 128 to 192, correction is conducted as follows: when focal distance information ZZ is 8 to 15, the correction shown in FIG. 23(2) is conducted; and when focal distance information ZZ is 16 to 23, the correction shown in FIG. 23(3) is conducted. When the main switch is turned on and only zooming information is obtained, the display is set to the state illustrated in FIG. 23(1). After photographing, the display is returned to the state illustrated in FIG. 23(1).

Figure 24:
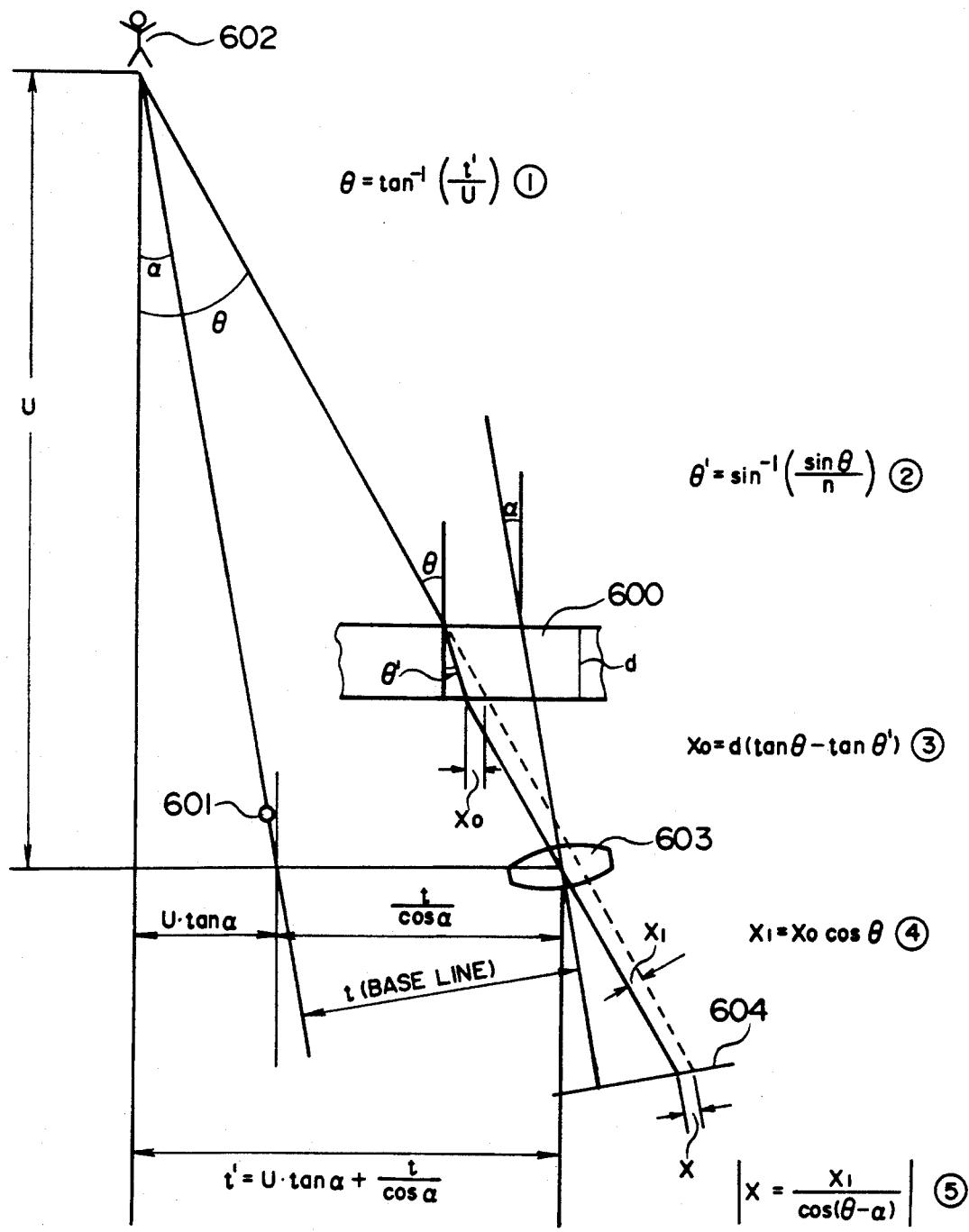
FIG. 24 is a drawing which illustrates the correction of range finding information by changing the range finding direction.

FIG. 24 is an illustration showing the method to correct the range finding error which is caused by the variation of the angle of refraction of range finding light which is transmitted through a dustproof panel surface when the range finding direction is varied.

The dustproof panel 600 protecting the range finding unit is provided in the front position of the range finding device, and the dustproof panel 600 is fixed to the camera case, so that it can not be moved when the range finding point is changed. Therefore, as illustrated in FIG. 24, the range finding light projected from the light emitting element 601 to the subject 602 is refracted according to deviation angle $\alpha$ of the range finding direction when the range finding light is transmitted through the dustproof panel 600. For that reason, error x is caused on the range finding surface PSD of the light receiving element 604 through AF lens 603, so that an accurate range finding result can not be obtained.

Therefore, as illustrated in FIG. 24, the deviation angles $\theta$ and $\alpha$ of the error x are found previously, as follows:

$$\text{Deviation angle } \theta = \tan^{-1}\left(\frac{t'}{U}\right) \quad \text{Equation 1}$$

where t' is the distance between the optical path and AF lens and the distance t' can be found by the following equation.

$$\text{Distance } t' = U \cdot \tan \alpha + \frac{t}{\cos \alpha}$$

Then, the angle of refraction $\theta'$ of the dustproof panel 600 is found by the following equation.

$$\text{Angle of refraction } \theta' = \sin^{-1}\left(\frac{\sin \theta}{n}\right) \quad \text{Equation 2}$$

where n is the index of refraction of the dustproof panel 600. For example, n = 1.5 approximately.

The error x0 due to the refraction of the dustproof panel 600 is found by the following equation.

$$\text{Error } x0 = d \cdot (\tan \theta - \tan \theta') \quad \text{Equation 3}$$

The distance x1 between the range finding light refracted and the range finding light not refracted is found by the following equation.

$$x1 = x0 \cos \theta \quad \text{Equation 4}$$

Accordingly, the error x of the light receiving element 604 on the range finding surface is found by the following equation.

$$\left| x = \frac{x1}{\cos(\theta - \alpha)} \right| \quad \text{Equation 5}$$

These are the means to obtain the positional information of the range finding direction and the means to correct the range finding information according to this positional information of the range finding direction. When the range finding information obtained from a previously stored table is corrected according to the range finding direction positional information, the range finding error, which is caused when the refraction of range finding light transmitted through the dustproof panel is changed by the deviation angle of the range finding direction can be eliminated, so that an accurate range finding result can be obtained. The light flux of the projected light of the range finding device is also refracted by the dustproof panel 600. In this case, the correction may be conducted as follows: the moving target mark 21 in the viewfinder is previously adjusted by the amount of light flux slippage which is caused by the above-described refraction.

Control Circuit

Figure 25A:
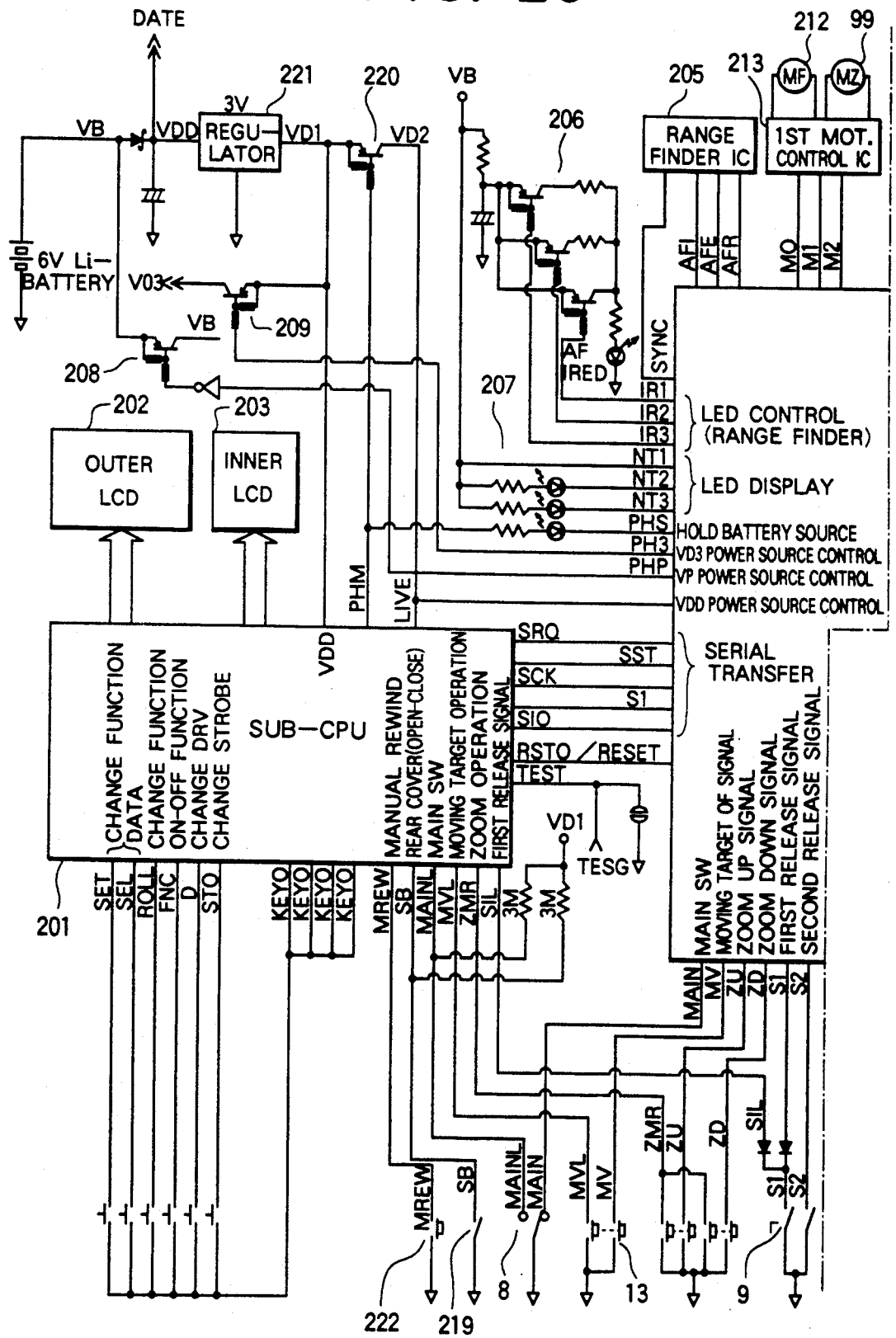
FIG. 25 is a block diagram which shows the electrical circuit of a camera to which the present invention is applied.
Figure 25B:
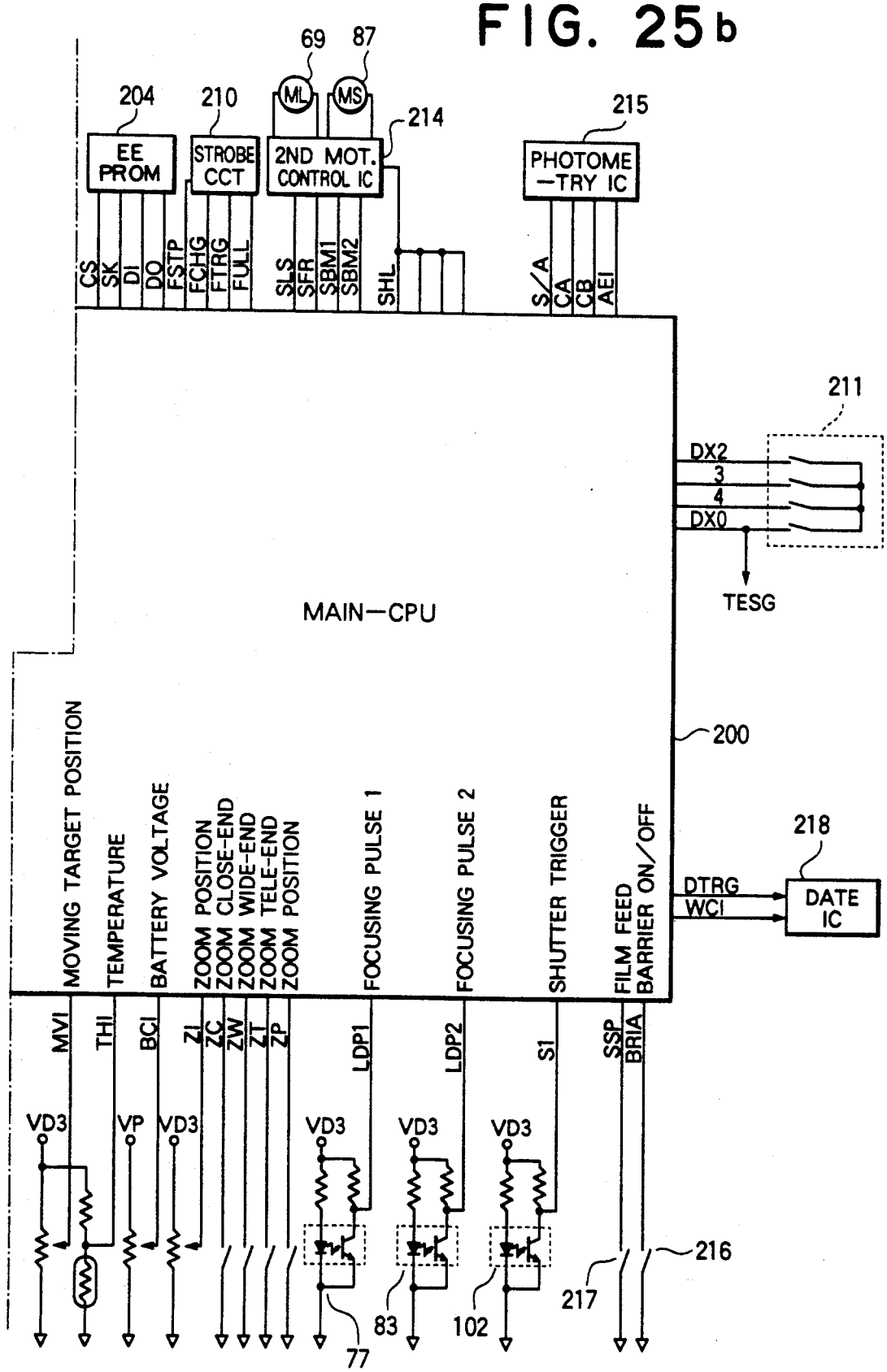

FIG. 25 is a block diagram showing the outline of the circuit of the camera to which the present invention is applied.

MAIN-CPU 200 and SUB-CPU 201 are utilized in this camera, and information is reciprocally exchanged by a serial interface.

MAIN-CPU 200 mainly carries out the control of the drive system which needs a large amount of current and the control sequence of photographing operation of the camera. SUB-CPU 201 controls MAIN-CPU, and drives the outer LCD 202 displaying photographing information and the LCD 203 in the viewfinder.

As illustrated in FIG. 25, MAIN-CPU 200 has input and output terminals.

Input terminal DO and output terminals DI, SK, and CS are used to control volatile memory (which will be called EEPROM hereinafter) which can be changed. The initial state of terminal DO is an L level, and the initial state of terminals DI, SK and CS is also an L level.

Output terminals SST, SCK, SIO and input terminals SRQ, SI are used for serial transmission with SUB-CPU 201; the initial state of terminal SST is an H level; the initial state of terminal SRQ is an H level; the initial state of terminal SCK is an H level; the initial state of terminal SIO is an L level; and the initial state of terminal SI is an L level.

Input terminal AFE, output terminal AFR, A/D conversion input terminal AFI and output terminal SYNC are utilized to control the range finding IC 205. The initial state of terminal AFE is an H level, and the initial state of terminal AFR is an H level. At terminal AFI, the range finding information obtained by computing the output from the distance detecting element (PSD), is outputted from terminal AFI. Output terminals IR1 to IR3 are utilized to control the light emitting element 20 for use in range finding, and the resistance connected to each of them is varied so that the amount of light emission can be varied, the level of which is the initial state H.

Output terminals NT1 to NT3 are utilized to drive the LED display 207, and its initial state is an H level.

Output terminal PHS is used to maintain the self-power-source. When terminal PHS becomes an L level, the transistor 220 is turned on, and the voltage from the regulator 221 is supplied to MAIN-CPU 200. The initial state of this terminal PHS is an L level.

The initial state of output terminals PHP and PH3 is an L level. Terminal PHP is used for controlling the VB power source 208 which supplies the voltage from the regulator 221 to a predetermined circuit, and terminal PH3 is used for controlling the VD3 power source 209 which directly supplies the voltage from a power source battery to a predetermined circuit.

Input terminal FFUL, output terminals FSTP, FTRG and FCHG are used to control the strobe circuit 210. Terminal FFUL is used to detect the completion of strobe-charging. When the charging of a strobe-condenser has not been completed, the state of terminal FFUL is an H level, and when the charging has been completed, it becomes an L level. The initial state of terminal FSTP is an H level. Terminal FSTP is used to control the stop operation of strobe-charging, and when the stop operation is conducted, the state of terminal FSTP is changed over to an L level. The initial state of terminal FTRG and FCHG is an H level, and terminal FTRG controls strobe light emission. When strobe light is emitted, the state of terminal FTRG is changed over to an L level. Terminal FCHG is used to control the start of strobe-charging. When charging of a strobe condenser is started, the state of terminal FCHG is changed over to an L level.

Input terminals DX2, DX3 and DX4 are used to input DX codes sent from a DX film 211 so as to detect the sensitivity of a film. Output terminals MO, M1 and M2 are used to control the feed motor 212 and the first motor control IC213 of the zoom drive motor 99. The state of terminal MO is set as follows: when terminal MO drives the film feed motor 212, the state is set to ah L level; when it drives the zoom drive motor 99, its state is set to an H level; and the initial state of terminal MO, in which the rotation of each motor is controlled by electrification of terminals M1 and M2, is an L level. Output terminals SLS, SFR, SBMI and SBM2 are used for the focusing motor 69 and the second motor control ICI 214 of the shutter drive motor 87, and the initial state of the terminals is an L level. When the focusing motor 69 is driven, the state of terminal SLS is set to an L level, and when the shutter drive motor 87 is driven, the state of terminal SLS is set to an H level. When the focusing motor 69 and the shutter drive motor 87 are driven at a high speed, the state of terminal SFR is set to an L level, and when they are driven at a low speed, the state of terminal SFR is set to an H level. Terminals SBM1 and SBM2 are used for rotation control, which is shown in Table 6. The initial state of terminal SHL is an H level, and terminal SHL is used for a constant voltage level control, which is shown in Table 7. Switches S1 and S2 are used for the first release signal and the second signal, and the initial state of the switches is an H level. When the state becomes an L level, the switches are turned on.

TABLE 6

| SB1 | SB2 | Rotation of motor |
|-----|-----|-------------------|
| H | H | Brake |
| H | L | Normal rotation |
| L | H | Reverse rotation |
| L | L | OFF |

TABLE 7

| SB1 | SB2 | Rotation speed |
|-----|-----|----------------|
| H | H | High speed |
| L | H | Low speed 1 |
| L | L | Low speed 2 |

Low speed 1 < Low speed 2

Input terminal AEI and output terminals S/A, CB and CA are used to control the photometry IC 215, and terminal AEI obtains the luminance information by computing the output from photometry element (PD) with the photometry IC 215. The initial state of terminal S/A, CB and CA is an L level. Terminal S/A conducts the control of selecting between the light receiving element for use in central photometry and the light receiving element for use in peripheral photometry. When the state of terminal S/A is an L level, the light receiving element for use in central photometry is selected, and when the state of terminal S/A is an H level, the light receiving element for use in peripheral photometry is selected.

Input terminal MV is used for detection in a moving target operation. When the moving target is not operated, an H level is inputted into input terminal MV; and when the moving target is operated, an L level is inputted into input terminal MV, and the moving target position signal is inputted from A/D conversion input terminal MVI.

Input terminal BRIA is used to detect the opening operation of a barrier conducted by the switch 216. When the barrier is opened, an H level is inputted, and when the barrier is closed, an L level is inputted.

Input terminal MAIN is used for operation and detection of the main switch 8. When the main switch 8 is turned on, the state of terminal MAIN becomes an H level so that the camera circuit can be operated, and when the main switch 8 is turned off, terminal MAIN becomes inactive.

Input terminal ZU is used for zooming-up operation by the operation button 13. When a zooming-up operation is not performed, an H level is inputted, and when a zooming-up operation is performed, an L level is inputted so that zoom-drive can be conducted. Terminal ZD is used for a zooming-down operation, and when the operation is not conducted, an H level is inputted and zoom-drive is not conducted. When the operation is conducted, an L level is inputted and zoom-drive is conducted.

A/D conversion input terminal BCI is used for the detection of battery voltage; A/D conversion input terminal ZI is used for the detection of the zooming position; A/D conversion input terminal MVI is used for detection of the moving target position; A/D conversion input terminal THI obtains the signal of temperature compensation from reference voltage VDD; and A/D conversion input terminal AFI obtains range finding information from reference voltage AVDD.

Input terminals ZP, ZT, ZW and ZC are used for zoom control, and terminal ZP detects one bit of digital information which is outputted in accordance with the drive of the zoom lens. Terminal ZT is used to detect the telephotography end of the zoom lens, and when the zoom lens is set to the most telephotography end, an L level is inputted. Terminal ZW is used to detect the wide-angle photography end of zoom lens, and when the zoom lens is set to the most wide-angle photography end, an H level is inputted. Terminal ZC is used to detect the close end of zoom lens when the main switch is turned off and the picture-taking lens is placed in a storing position. When the picture-taking lens is placed in the storing position, an L level is inputted.

Terminal ST is used to input shutter blade opening information sent from the photointerrupter 102 and conducts the detection of opening and closing of the shutter blade 51.

Input terminals LDP1 and LDP2 are used to input the focusing pulses 1, 2 sent from the photointerrupters 77, 83 in accordance with the focusing lens drive of the picture-taking lens.

Input terminal SSP is used to detect film feed information sent from the switch 217, and a digital signal outputted in accordance with film feeding is inputted into input terminal SSP.

Output terminal DTRG and input terminal WCI are used for the date control IC 218. When data is copied, the level is set to an L level and light is emitted from a data copying lamp. The initial state of terminal DTRG is an H level.

SUBCPU 201 is provided with the following input and output terminals.

Input terminal MAINL is used to detect the operation of the main switch 8. When the main switch 8 is turned on, an H level is inputted and when the main switch is turned off, an L level is inputted.

Input terminal SB is used to detect the signal sent from the rear lid switch 219 which is turned on and off when the rear lid is opened and closed, wherein when the rear lid is opened, an H level is inputted, and when rear lid is closed an L level is inputted.

Input terminal S1L is used to detect the signal sent from switch S1 of the released button 9. When the release button 9 is pressed in the first step, an L level is inputted. When the release button is not operated, an H level is inputted.

Input terminal ZMR is used to detect the signal of a zoom operation sent from the operation button 13. When the zoom button is operated, an H level is inputted. When the zoom button is not operated, an L level is inputted.

Input terminal MVL is used to detect the operation of the moving target. When the moving target is operated, an H level is inputted. When the moving target is not operated, an L level is inputted.

Input terminal MREW is used to detect the rewinding operation of the manual rewinding switch 222. When the manual rewinding switch 222 is operated, an L level is inputted in order to start the rewinding operation. When the manual rewinding switch 222 is not operated, an H level is inputted.

Input terminal TEST is used to detect the test mode of the camera.

Input terminal KEYO is used as Common.

Input terminal STO is used to input the change of the strobe mode. When it is pressed, an L level is inputted. According to the pressing operation of the strobe setting switch, one of "AUTO" mode in which the strobe light is emitted automatically, "ON" mode in which the strobe light is always emitted, and "OFF" mode in which the strobe light is not emitted regardless of the luminance, is cyclically selected in regular sequence.

Input terminal D is used to input the change of the drive mode. Usually, an H level is inputted, and when a pressing operation is performed, an L level is inputted. According to the pressing operation of the drive mode setting switch, the drive mode is changed over into one of the single shot mode, the consecutive shot mode, and the self-timer mode, cyclically in regular sequence.

Input terminal FNC is used for ON-OFF operation of the input of function change. Usually, an H level is inputted, and when a pressing operation is performed, an L level is inputted.

Input terminal ROLL is used to input the change of function. Usually, an H level is inputted, and when a pressing operation is performed, an L level is inputted.

Input terminals SEL and SET are used to change the function data, and output terminal PHM is used to control the power source of MAIN-CPU. When the apparatus is operated, an H level is set, and when not operated, an L level is set.

Output terminal SRQ and input terminal SST are used for serial transmission. Input terminal LIVE is used to monitor the power source of MAIN-CPU200. Output terminal RSTO is used to output the reset signal of MAIN-CPU. Further, output terminals to output signals into outside LCD202 and LCD203 in the viewfinder are provided.

EXECUTION MODE, MODE FLAG, AND DATA TRANSMISSION

Execution Mode, Mode Flag, and Data Transmission shown in the flow chart of MAIN-CPU200 are as follows.

| Actual mode | MAIN-CPU (SUB-CPU → MAIN-CPU) | |
|---|---|---|
| | Mode flag | Transmission |
| 1. Mode | | |
| AUTO | (⌡) - 0 | |
| ON | - 1 | (Mode) - 1 |
| OFF | - 2 | |
| 2. Drive mode | | |
| S (Single shot) | (DRV) - 0 | |
| C (Burst shot) | - 1 | |

-continued

| | MAIN-CPU (SUB-CPU → MAIN-CPU) | |
|---|---|---|
| Actual mode | Mode flag | Transmission |
| Self 1 (10 sec) | - 2 | (MODE) - 1 |
| Self 2 (2 sec) | - 3 | |
| 3. WORK Mode | | |
| S1 | (S1) - 1 | S1 Transmission |
| Initial | (INITIAL) - 1 | Initial transmission |
| Auto load | (AL) - 1 | Auto load transmission |
| WAKE | (WAKE) - 1 | WAKE Transmission |
| SLEEP | (SLEEP) - 1 | SLEEP Transmission |
| Zoom | (ZMR) - 1 | Zoom transmission |
| Rewind | (REW) - 1 | Rewind transmission |
| BC Demand | (BCR) - 1 | BCR Transmission |
| Follow | (FOLLOW) - 1 | Follow transmission |
| MV | (MV) - 1 | MV Transmission |
| 4. Function mode | | |
| Normal | (NORM) - 1 | Normal transmission |
| INF | (INF) - 1 | INF Transmission |
| NIGHT | (NIGHT) - 1 | NIGHT Transmission |
| SNOW | (SNOW) - 1 | SNOW Transmission |
| Swing | (SWING) - 1 | Swing transmission |
| AZ | (AZ) - 1 | AZ Transmission |
| AZ2 | (AZ2) - 1 | AZ2 Transmission |
| SPOT | (SPOT) - 1 | SPOT Transmission |
| +1.5EV | (+1.5EV) - 1 | +1.5EV Transmission |
| −1.5EV | (−1.5EV) - 1 | −1.5EV Transmission |
| ME | (ME) - 1 | ME Transmission |
| TE | (TE) - 1 | TE Transmission |
| INT | (INT) - 1 | INT Transmission |
| ME Continuation | (MECNT) - 1 | ME Continuous transmission |
| ME End | (MEEND) - 1 | ME End transmission |
| TE End | (TEEND) - 1 | TE End transmission |
| INT Continuation | (INTCNT) - 1 | INT Continuous transmission |
| TV | (TV) - 1 | TV Transmission |
| TEST | (TEST) - 1 | TEST Transmission (Work transmission) |
| 5. Counter data | | |
| 0 | (C) or (K) - 0 | Counter (Number) Transmission |
| 1 | - 1 | Counter (Number) Transmission |
| . | . | |
| . | . | |
| . | . | |
| 38 | 38 | Counter (Number) Transmission |
| 39 | 39 | Counter (Number) Transmission |
| 6. LDP Data | | |
| 0 | (LDP) - 0 | LDP Transmission 2 |
| 1 | 1 | LDP Transmission 2 |
| 2 | 2 | LDP Transmission 2 |
| . | . | |
| . | . | |
| . | . | |
| 244 | 244 | LDP Transmission 2 |
| 255 | 255 | LDP Transmission 2 |

Next, the data transmission from MAIN-CPU to SUB-CPU will be explained as follows.

Figure 26:
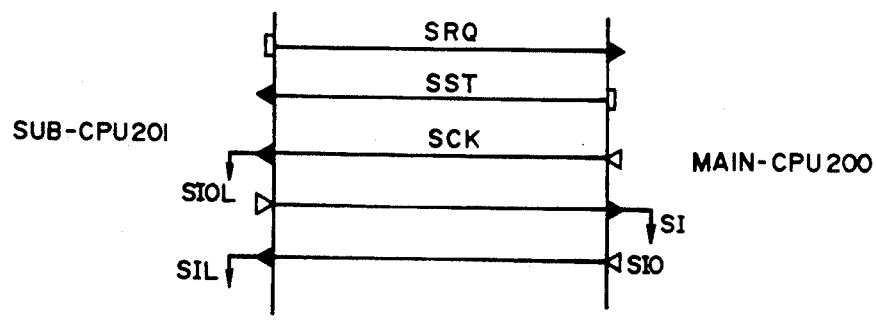
FIG. 26 is a drawing which shows the interface between MAIN-CPU and SUB-CPU.
Figure 27:
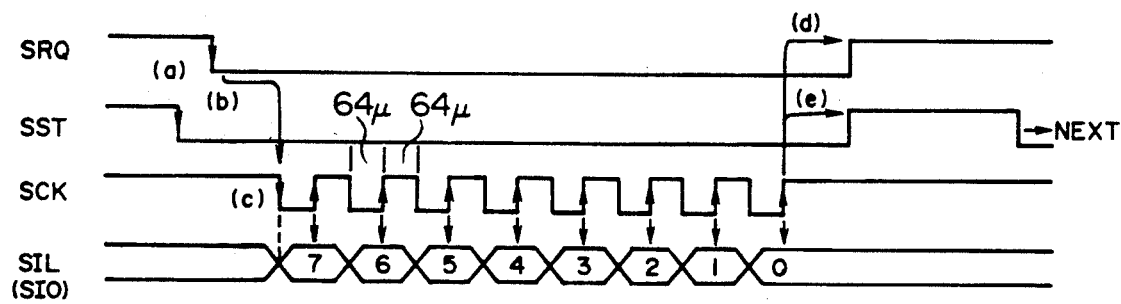
FIG. 27 is a timing chart which shows the transfer from MAIN-CPU to SUB-CPU.

FIG. 26 is a transmission interface between MAIN-CPU and SUB-CPU; and FIG. 27 is a transmission timing chart from MAIN-CPU to SUB-CPU.

The transmission from MAIN-CPU200 to SUB-CPU201 is conducted by serial transmission as shown in the transmission timing chart in FIG. 27.

When terminal SST is in the state of last transition (a), the start of transmission is commanded by MAIN-CPU200; and when terminal SRQ is in the state of last transition (b), the preparation of transmission is completed in SUB-CPU201. Data is discharged from terminal SIO by MAIN-CPU200, and data is read in from terminal SIL by SUB-CPU201 synchronously with the H level and L level of terminal SCK (c). When terminal SRQ rises (d), the transmission by SUB-CPU201 is completed, and when terminal SST rises (e), the transmission by MAIN-CPU200 is completed.

After the serial transmission has been completed, terminal SCK is set to the outside lock input mode, and terminals SIO and SIOL are set to the input mode.

The execution mode, mode flag and transmission shown in the flow chart of SUB-CPU201 are as follows.

| | SUB-CPU (SUB-CPU → MAIN-CPU) | | |
|---|---|---|---|
| Actual mode | | Mode flag | Transmission |
| 1. B.C. Data | | | |
| Battery FULL | (BC) - 0 | | BC transmission |
| ↓ | - 1 | (BCF) - 1 | BC transmission |
| Check | - 2 | | BC transmission |
| Lock | - 3 | | BC transmission |

-continued

| Actual mode | SUB-CPU (SUB-CPU → MAIN-CPU) | | Transmission |
|---|---|---|---|
| | Mode flag | | |
| 2. Photographing trigger | | | |
| Print | (PRINT) - 1 | | PRINT transmission |
| 3. DX Data | | | |
| ISO    50 | (DX)  - 0 | | DX transmission |
|        100 |       - 1 | | DX transmission |
|        200 |       - 2 | | DX transmission |
|        400 |       - 3 | (DXF) - 1 | DX transmission |
|        800 |       - 4 | | DX transmission |
|       1600 |       - 5 | | DX transmission |
|       3200 |       - 6 | | DX transmission |
| NONDX |       - 7 | | DX transmission |
| 4. AELCD Data | | | |
| ↯Unuse Put out all lights | (↯AE) - 0 | | AE transmission |
| ↯Unuse Ae Interlock | - 1 | | AE transmission |
| ↯Unuse Camera-shake | - 2 | (LDCF) - 1 | AE transmission |
| ↯Use OK Charging | - 3 | | AE transmission |
| ↯Use Camera-shake | - 4 | | AE transmission |
| 5. Parallel data | | | |
| Parallel 0 Put out lights | (PARA) - 0 | | Parallel transmission |
| Parallel 1 | - 1 | | Parallel transmission |
| Parallel 2 | - 2 | (LDCF) - 1 | Parallel transmission |
| Parallel 3 | - 3 | | Parallel transmission |
| 6. AFLCD Data | | | |
| AF0 Put out lights | (AFL) - 0 | (LDCF) - 1 | AF transmission |
| 1 | - 1 | | AF transmission |
| AF2 | (AFL) - 2 | | AF transmission |
| 3 | - 3 | | AF transmission |
| 4 | - 4 | | AF transmission |
| 5 | - 5 | (LDCF) - 1 | AF transmission |
| 6 | - 6 | | AF transmission |
| 7 | - 7 | | AF transmission |
| 8 | - 8 | | AF transmission |
| 9 | - 9 | | AF transmission |
| 7. MV Data | | | |
| MV0 Put out lights | (MV) - 0 | | MV transmission |
| 1 (Left end) | - 1 | | MV transmission |
| 2 | - 2 | | MV transmission |
| . | . | | . |
| 7 (Center) | - 7 | (MVF) - 1 | MV transmission |
| . | . | | . |
| 12 | - 12 | | MV transmission |
| 13 (Right end) | - 13 | | MV transmission |
| 8. Counter data | | | |
| Film count - 0 | (C) - 0 | | Counter transmission |
|           - 1 |     - 1 | | Counter transmission |
| . | . | (CF) - 1 | . |
| 38 | 38 | | Counter transmission |
| 39 | 39 | | Counter transmission |
| 9. Processed data | | | |
| Charge processing | (CHG) - 1 | | Charge transmission |
| Auto load end | (ALEND) - 1 | | AL End transmission |
| NON Auto load | (NONAL) - 1 | | NONAL transmission |
| Auto load error | (ALERR) - 1 | | AL Error transmission |
| Rewind start | (REWST) - 1 | | REW Start transmission |
| Rewind end | (REWEND) - 1 | | REW End transmission |
| Rewind error | (REWERR) - 1 | | REW Error transmission |

-continued

| Actual mode | SUB-CPU (SUB-CPU → MAIN-CPU) | |
|---|---|---|
| | Mode flag | Transmission |
| ME Processing out of photographing | (MEWORK) - 1 | MEWORK transmission |
| SW Normal end | (SWEND) - 1 | SW End transmission |
| SW Abnormal | (SWERR) - 1 | SW Error transmission |
| Error | (ERR) - 1 | Error transmission |
| Transmission start of test data | (TESTD) - 1 | TESTD transmission |
| 10. LDP Data | | |
| 0 | (LDP) - 0 | LDP transmission I |
| 1 | - 1 | LDP transmission I |
| 2 | - 2 | LDP transmission I |
| . | . | . |
| . | . | . |
| . | . | . |
| 254 | 254 | LDP transmission I |
| 255 | 255 | LDP transmission I |

Next, data transmission from SUB-CPU to MAIN-CPU will be explained.

Figure 28:
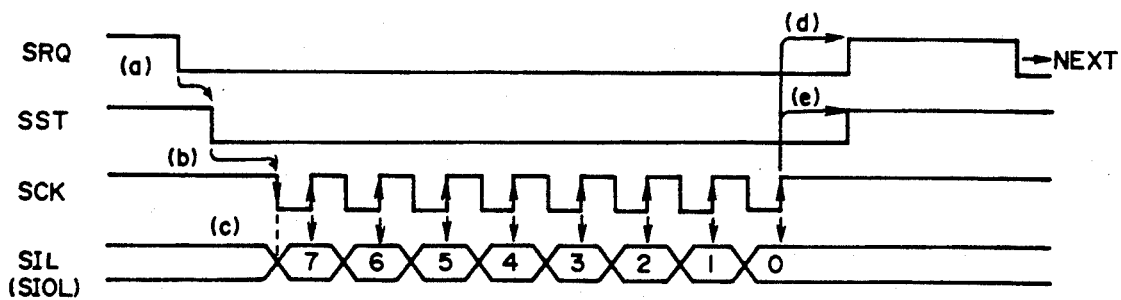
FIG. 28 is a timing chart which shows the transfer from SUB-CPU to MAIN-CPU.

FIG. 28 is a transmission timing chart from SUB-CPU to MAIN-CPU.

The transmission from SUB-CPU to MAIN-CPU is conducted by the serial transmission shown by a transmission timing chart in FIG. 28.

When terminal SRQ falls (a), the start of transmission is commanded by SUB-CPU201; and when terminal SST falls (b), the preparation of transmission receiving is completed. SUB-CPU201 outputs data into terminal SIOL synchronously with terminal SCK (c), and data is read in from terminal SI by MAIN-CPU200. When terminal SRQ rises (d), the transmission by SUB-CPU201 is completed, and when terminal SST rises (e), the transmission by MAIN-CPU200 is completed.

After this serial transmission has been completed, terminal SCK is set to the outside lock input mode, and terminals SIO and SIOL are set to the input mode.

Flow Chart of Control Circuit

[MAIN-CPU Main Routine]

Figure 29:
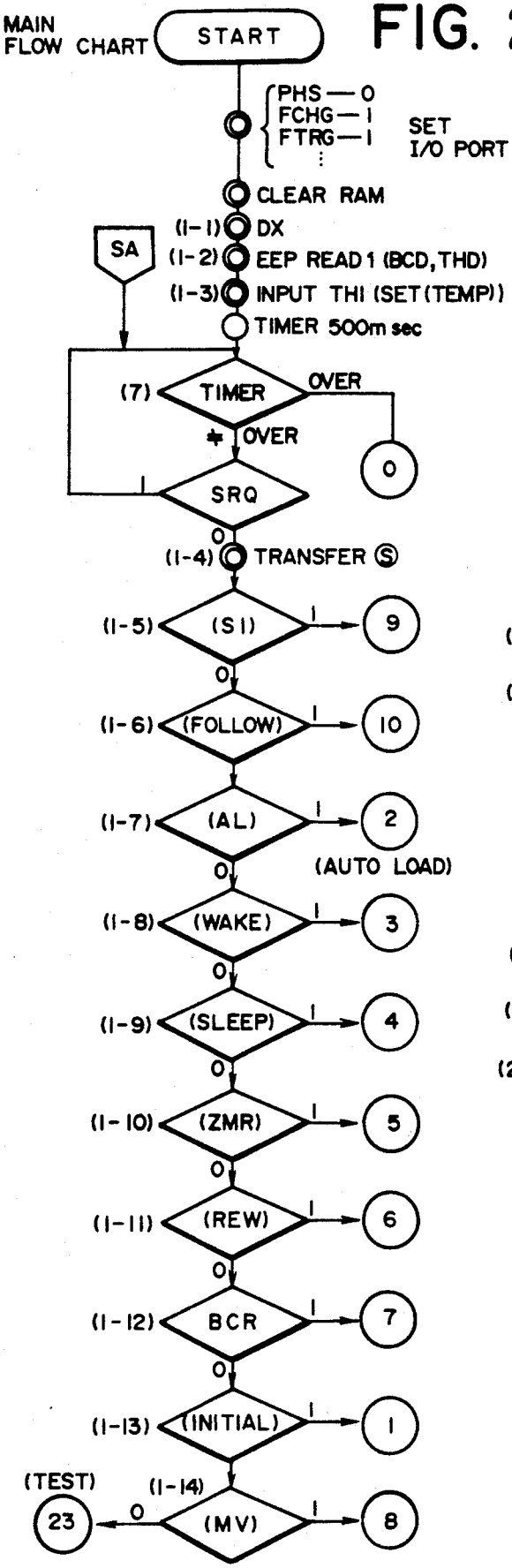
Figure 30:
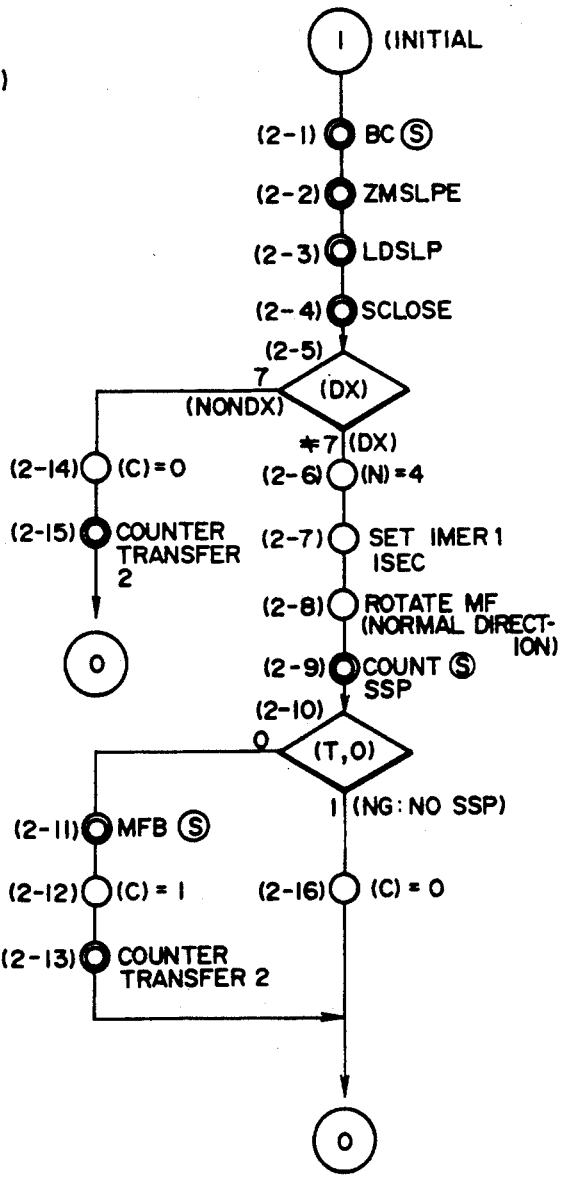

FIG. 29 shows operations of MAIN-CPU 200 whose operations are controlled by SUB-CPU 201. First, SUB-CPU 201 gives terminal RSTO, by causing it to be on level L, to terminal RESET of MAIN-CPU 200 thereby causing MAIN-CPU 200 to be on a state of reset, and then turns transistor 220 on with terminal PHM being on level L, thus supplies power from regulator 221 to terminal LIVE of SUB-CPU 201 and to terminal VDD of MAIN-CPU 200. Terminal LIVE detects aforesaid power and judges that terminal VDD is also supplied with power when aforesaid power is supplied. When MAIN-CPU 200 is caused to be in its workable state with aforesaid terminal RSTO being on level H, MAIN CPU 200 first inputs DX information on a film cartridge loaded in a camera with RAM cleared. An input of DX information is carried out according to DX information SUB-ROUTINE (step 1 - 1).

Figure 70:
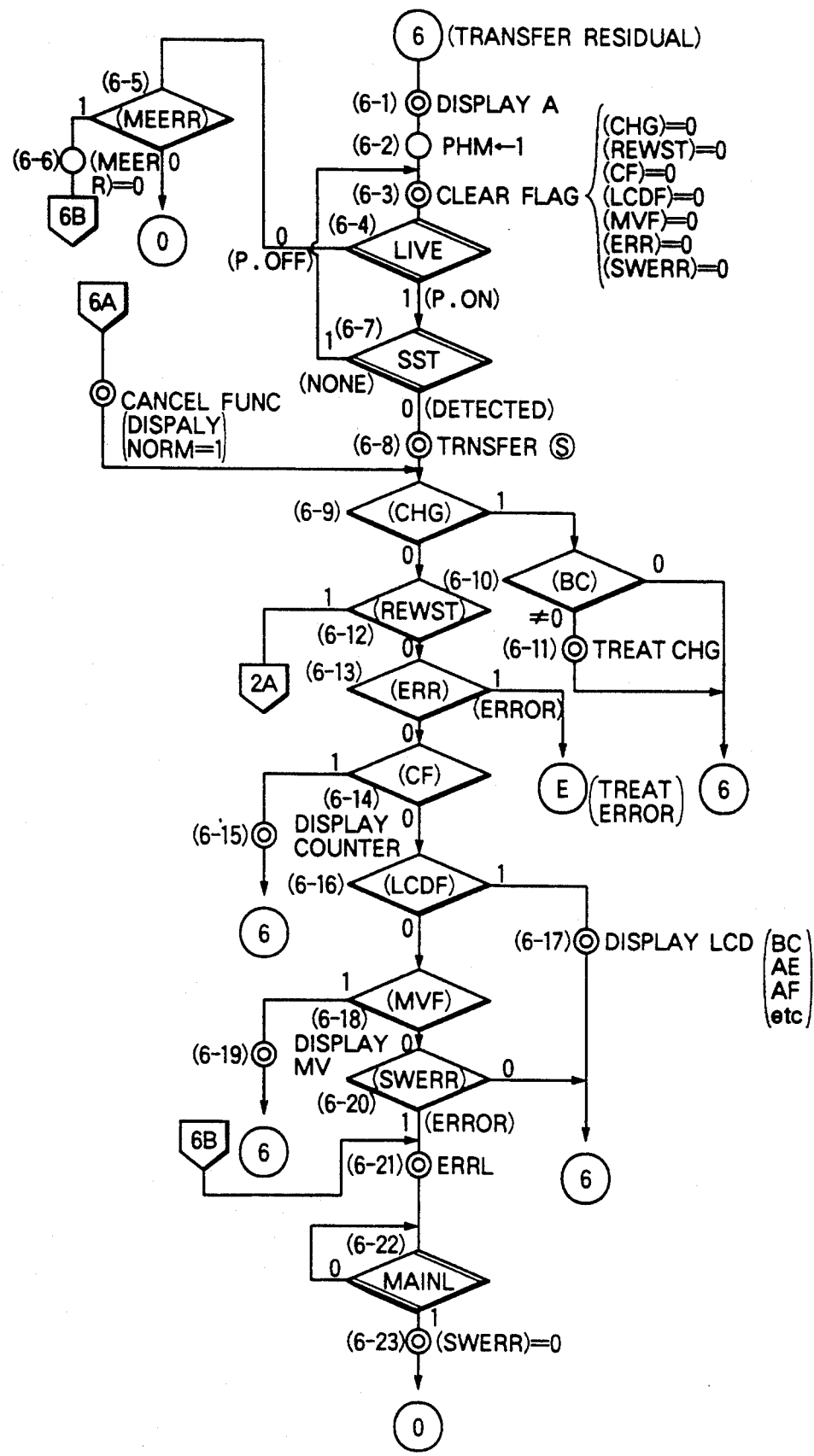

Next, out of EEPROM data, battery check voltage compensation data BCD and temperature compensation data THD are inputted (step 1 - 2). Temperature information is inputted from terminal THI as analog voltage information, and after A/D conversion of this analog voltage information, TEMP corresponding to the table in FIG. 70 is stored in RAM of MAIN-CPU 200 (step 1 - 3).

A timer of 500 m sec is operated and during timer counting, a state of terminal SRQ is detected and when it arrives at level L, work mode is transferred from SUB-CPU 201 to MAIN-CPU 200 in a serial way (step 1 - 4). In this case, when the work mode is set to S1, namely when terminal SIL of SUB-CPU 201 detects level L through operation of release button 9, the step advances to S1 in the flow chart (step 1 - 5). When the work mode is set to WAKE, namely when terminal MAINL of SUB-CPU 201 detects level L through operation of main switch 8, the step advances to WAKE operation in the flow chart (step 1 - 8). When the work mode is set to SLEEP, namely when terminal MAINL of SUB-CPU 201 detects level H through operation of main switch 8, the step advances to SLEEP operation in the flow chart (step 1 - 9). When the work mode is set to ZOOM, namely when terminal ZMR of SUB-CPU 201 detects level L through operation button 13, the step advances to ZOOM-UP or ZOOM-DOWN operation in the flow chart (step 1 - 10). When a mode is set to REWIND, namely when terminal MREW of SUB-CPU 201 detects level L, the step advances to rewinding operation in the flow chart (step 1 - 11). When the work mode is set to light load BATTERY CHECK, battery check for light load is conducted and voltage information divided from terminal BCI is inputted and then it is converted to digital information through an A/D converter in MAIN-CPU 200, thus the step advances to light load BATTERY CHECK operation (step 1 - 12). When the work mode is set to MOVING, namely when terminal MVL of SUB-CPU 201 detects level L through operation of moving target by means of operation button 13, the step advances to the operation of moving target in the flow chart (step 1 - 14). Further explanation will be omitted for simplification.

Initial Main Routine

Figure 45:
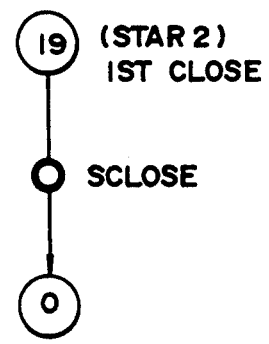
Figure 46:
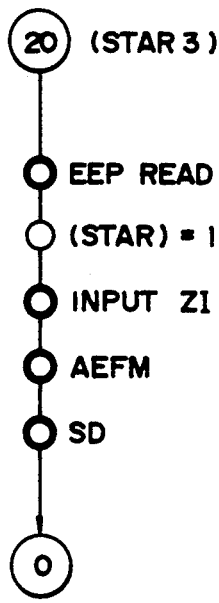
Figure 47A:
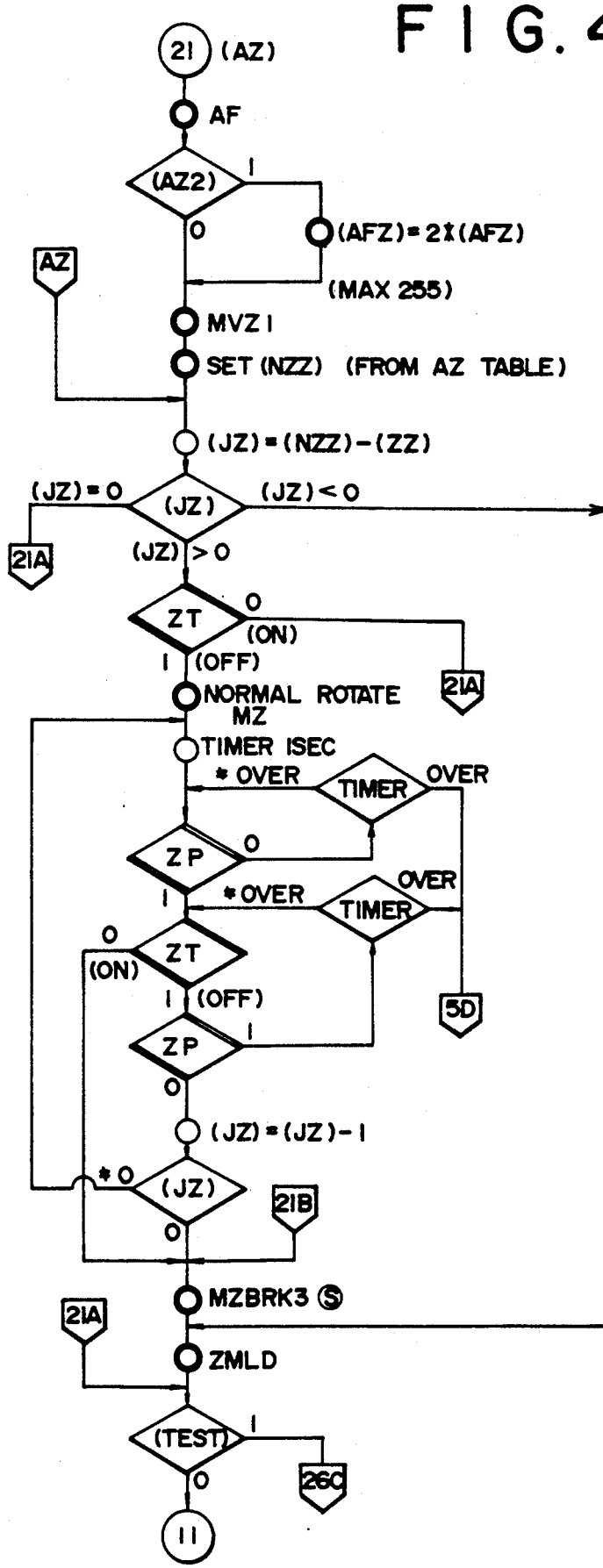
Figures 47, 47B:
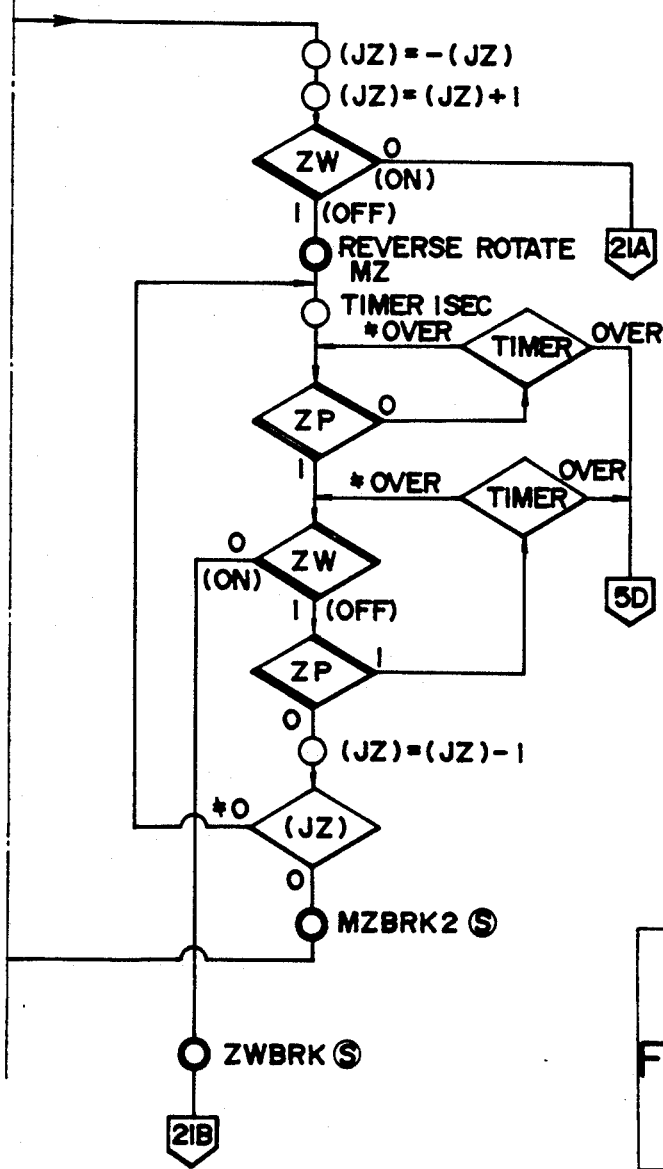

In FIG. 29, when flag INITIAL is set to '1' in a flow chart (step 1 - 13), the step advances to INITIAL shown in FIG. 45. First, battery check is conducted (step 2 - 1), the zoom lens-barrel is returned to its collapsed position (step 2 - 2), and the focusing lens is also returned to its housed position (step 2 - 3). A shutter blade is driven toward its closing direction to be in its initial state (step 2 - 4). Next, information of DX data is judged whether it is '7' (NON DX) or not (step 2 - 5), and when DX data are not '7', 4 is set to N (step 2 - 6), and 1 sec is set to timer 1 (step 2 - 7). Film-feeding motor MF is operated in a normal direction (step 2 - 8) for film-winding. SSP generated through linkage with film winding is detected (step 2 - 9), a state of flag TO is detected (step 2 - 10), and when it is '0', a brake is applied on film-feeding motor MF (step 2 - 11), '1' is set on a counter (step 2 - 12), and information of the counter is transferred to SUB-CPU 201 (step 2 - 13). In step 2 - 15, when DX data information is '7', the counter is set to '0' (step 2 - 14) and information of the counter is transferred to SUB-CPU 201 (step 2 - 15). In step 2 - 9, when flag TO is '1', the counter is set to '0' (step 2 - 16).

Wake Main Routine

Figure 31:
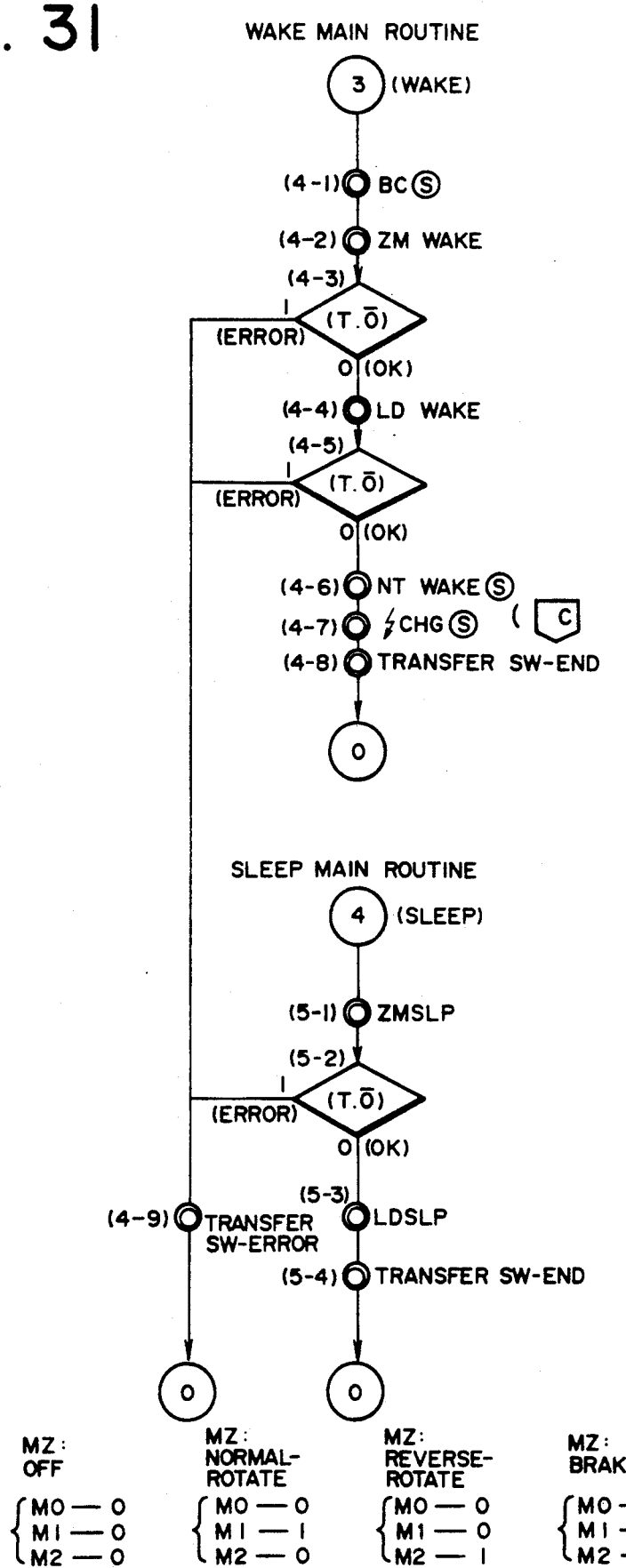

In FIG. 29, when flag WAKE is set to '1' (step 1 - 8) in the flow chart, the step advances to WAKE shown in FIG. 31. Battery check is conducted (step 4 - 1). Zoom lens-barrel initial position set sub-routine is executed (step 4 - 2), a state of flag TO is detected (step 4 - 3) and when it is '0', focusing lens initial position set sub-routine is executed (step 4 - 4). A state of flag TO is detected again (step 4 - 5) and when it is '0', NTLED is controlled to flicker in arbitrary timing and NTWAKE is executed (step 4 - 6), a strobe capacitor is controlled to be charged (step 4 - 7), and information of wake operation ending is transferred to SUB-CPU 201 (step 4 - 8). In step 4 - 3 and step 4 - 5, when a state of flag TO is '1', this is judged to be operation trouble and error information is transferred to SUB-CPU 201 (step 4 - 9).

Sleep Main Routine

In FIG. 29, when flag SLEEP is set to '1' step 1 - 9) in the flow chart, the step advances to SLEEP shown in FIG. 31. The sub-routine for collapsing a zoom lens-barrel is executed (step 5 - 1) and a state of flag TO is detected (step 5 - 2), and when it is '0', the sub-routine for collapsing position for focusing is executed (step 5 - 3) and information of completion of SLEEP operation is transferred to SUB-CPU 201 (step 5 - 4). When a state of flag TO is '1' in step 5 - 2, information of error is transferred to SUB-CPU 201 as operation trouble (step 4 - 9).

Zoom Main Routine

Figure 32A:
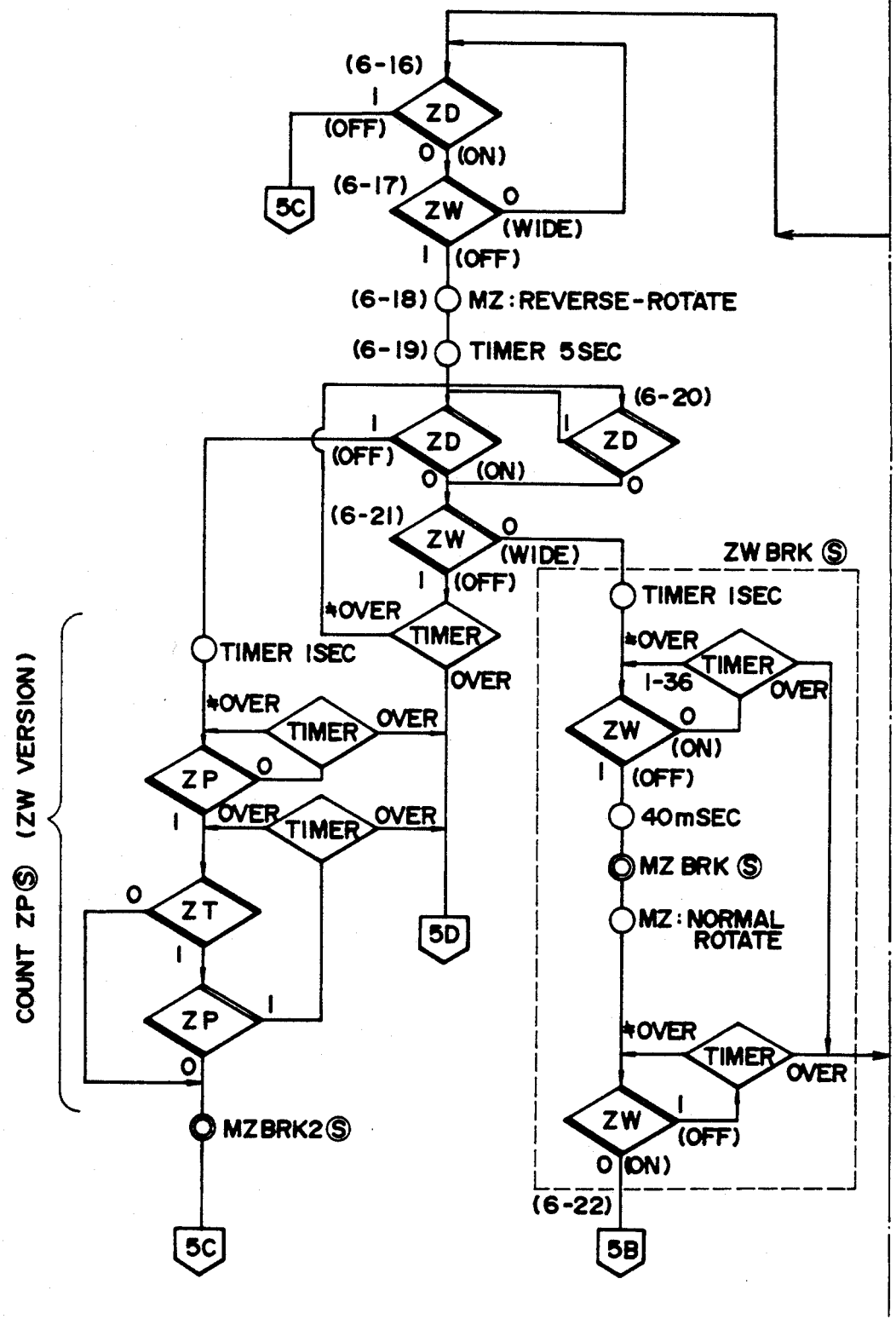
Figure 33:
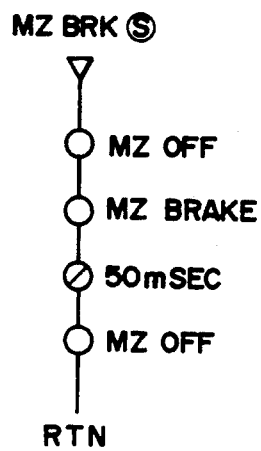

In FIG. 29, when flag ZMR is set to '1' on a flow chart (step 1 - 10), the step advances to ZOOM shown in FIG. 32. First, battery check is conducted (step 6 - 1), and ZI is inputted and FZ is inputted in ZID 1 (step 6 - 2). A state of zoom operation is detected and then, a state of ZU that is a terminal zoom up of MAIN-CPU 200 is detected (step 6 - 3) is detected. When it is '0', terminal ZT information for detecting TELE end of zoom in MAIN-CPU 200 is detected (step 6 - 4), while when it is '1', zoom driving motor is operated in a normal direction (step 6 - 5). Then, a timer is set to 5 sec (step 6 - 6) and a state of ZU that is a terminal zoom up is detected again (step 6 - 7). When it is '0', information of terminal zoom TELE of MAIN-CPU 200 is detected (step 6 - 8) and when the result of the detection shows '0', zoom driving motor is stopped (step 6 - 9) and the step advances to MVZ that is a sub-routine for a moving target (step 6 - 10). This sub-routine for stopping a zoom driving motor is shown in FIG. 33.

A state of terminal zoom up ZU is detected (step 6 - 11), and when it is '1', a state of terminal ZD is detected (step 6 - 12) and when the result of the detection shows '1', ZMLD is executed (step 6 - 13). A state of terminal ZU is detected (step 6 - 14) and when it is '1', a state of terminal ZD is detected (step 6 - 15) and when the result of the detection shows '1', a camera is caused to be in a non-operation state.

In step 6 - 3, a state of terminal ZD is detected (step 6 - 16) and when it is '0', terminal ZW for detecting WIDE end for zoom in MAIN-CPU 200 is detected (6 - 17). When it is '1', a zoom driving motor is operated in a reverse direction (6 - 18). Then a timer is set to 5 sec (step 6 - 19) and a state of terminal ZD is detected again (step 6 - 20). When it is '0', information of terminal ZW in MAIN-CPU 200 is detected (step 6 - 21) and if the result of the detection shows '0', the zoom driving motor is stopped (step 6 - 22).

Figure 34:
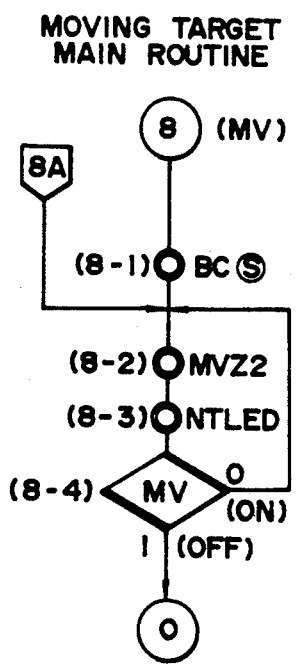

In FIG. 29, when flag MV is set to '1' in a flow chart (step 1 - 14), the step advances to MV shown in FIG. 34. Battery check is conducted (step 8 - 1), and MVZ 2 that is a moving target sub-routine is executed (step 8 - 2). Next, light-emitting LED arranged on the front side of the camera corresponding to the direction of moving target is lit (step 8 - 3). Moving target operation signals generated by moving target operation on an operation button are detected (step 8 - 4), and when the result of the detection shows '1', the camera is caused to be in a non-operation state. When the result of the shows '0' in step 8 - 4, the step returns to step 8 detection

Sion Main Routine

In FIG. 29, when flag S1 is set to '1' in a flow chart (step 1 - 5), the step advances to S1 shown in FIG. 35. FIG. 35 shows flow chart S1. First, battery check is conducted. This battery check advances to BC 1 (step 2 - 1). Serial transfer of setting of predetermined strobe mode and drive mode is conducted (step 9 - 2) as stated above. In the same manner, the transfer of counter information (step 9 - 3), the transfer of information of the number of photographing such as interval photographing and continuous photographing (9 - 4) and transfer of determined function mode information (step 9 - 5) are conducted. Then, photographing is judged as to whether it is normal photographing or not (step 9 - 6), and when it is normal photographing, analog information on terminal ZI in MAIN-CPU 200 is detected. The results of detection are converted by an AD converter to digital information, and ZZ shown on the focal distance input table in FIG. 89 and corresponding to aforesaid digital information is stored. This ZZ represents focal distance information obtained by dividing a focal distance range from the shortest focal distance to the longest one into 24 divisions.

Figure 36A:
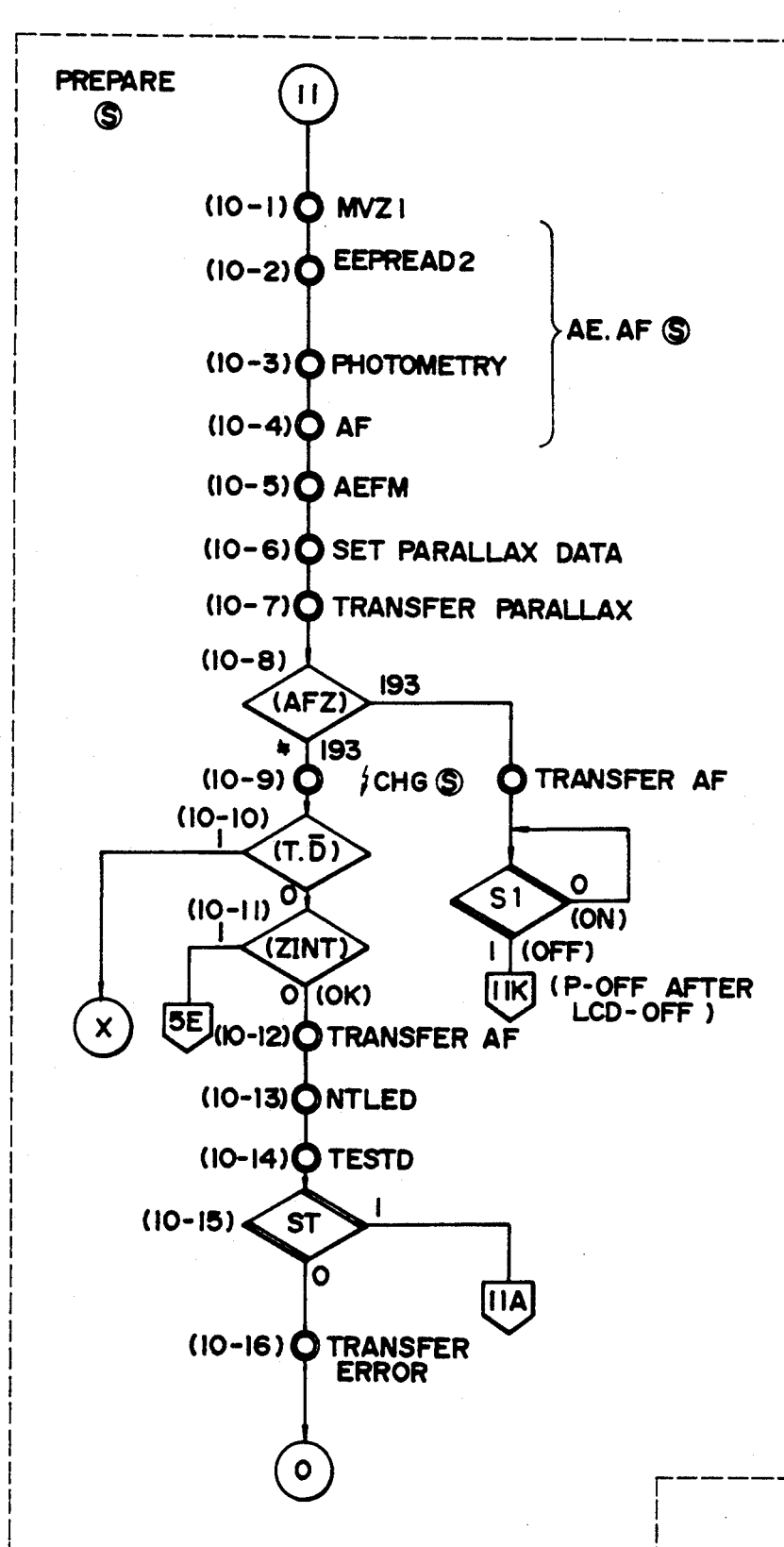
Figures 36, 36B:
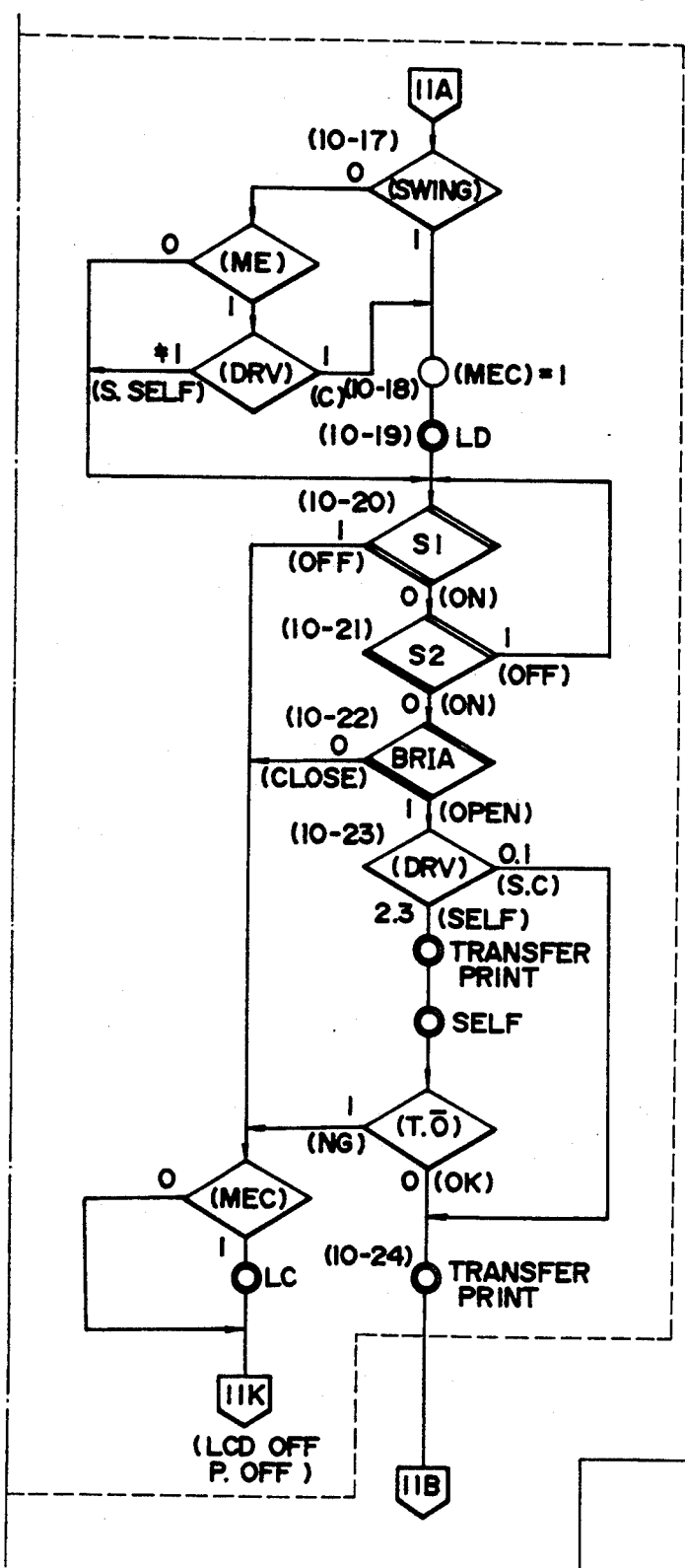
Figure 37:
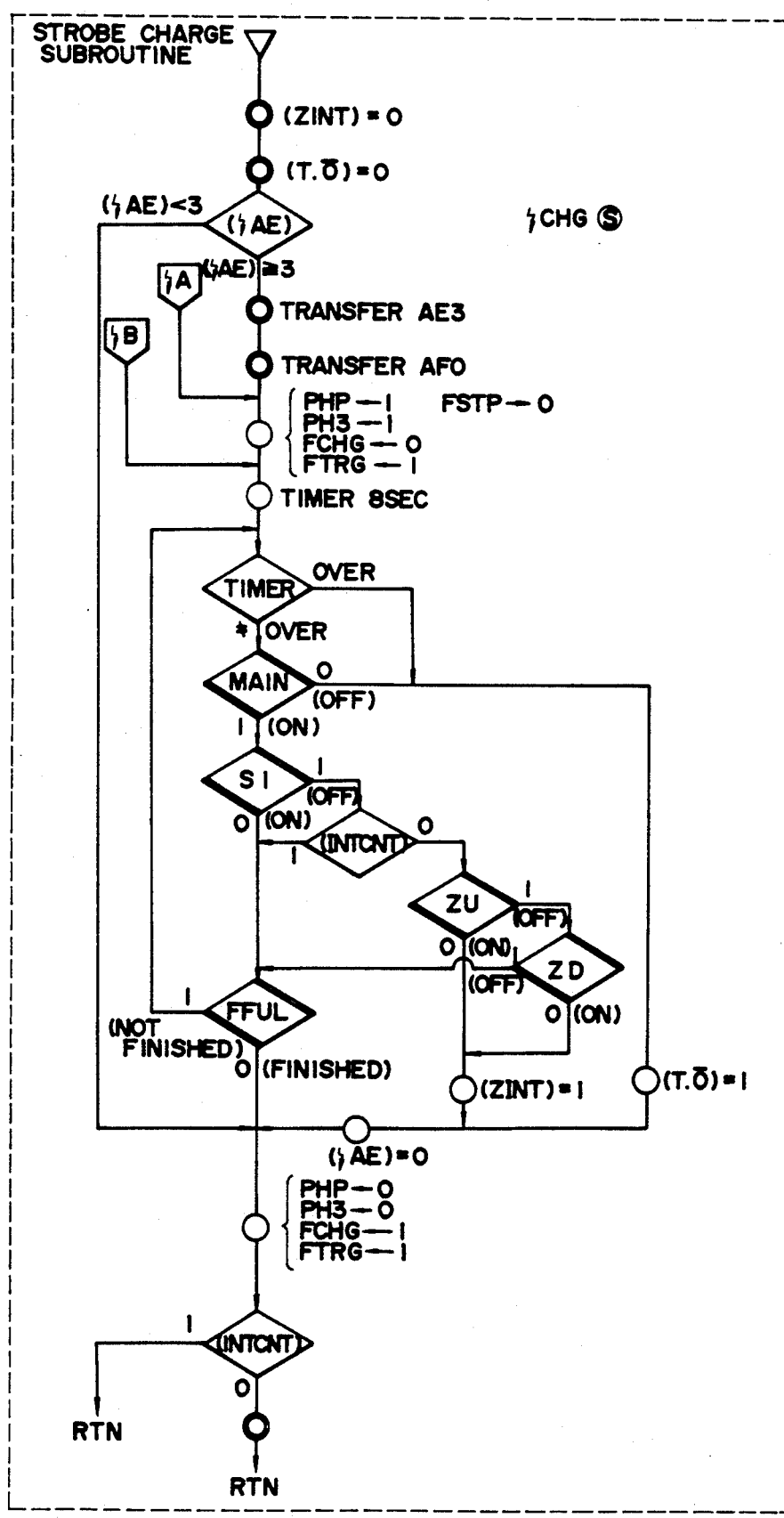
Figure 50:
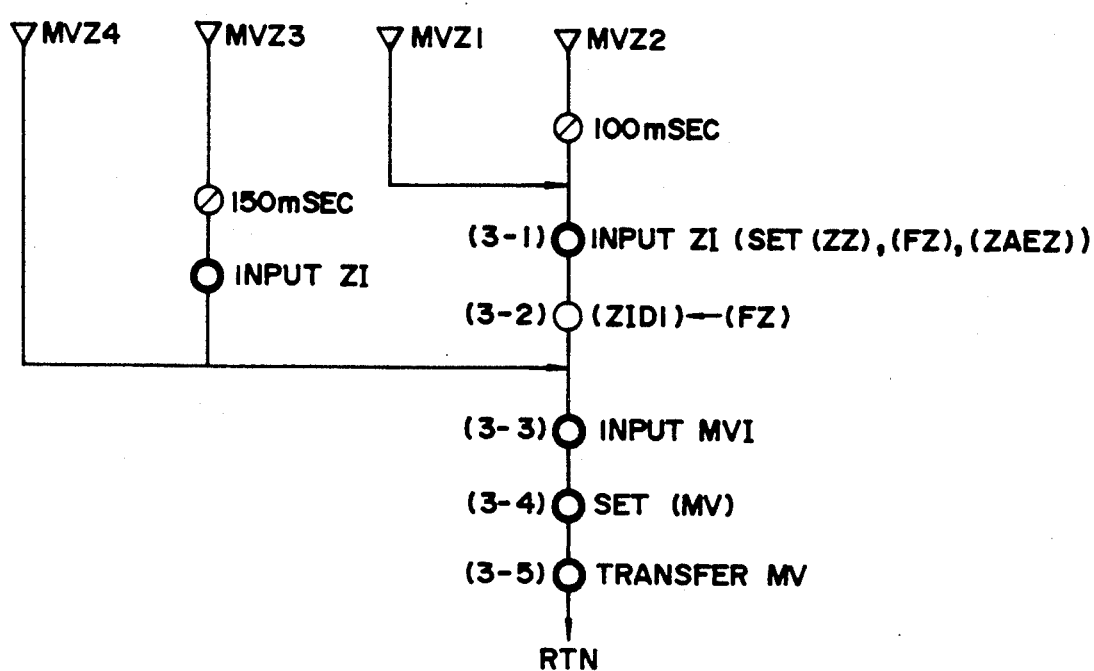
Figure 51A:
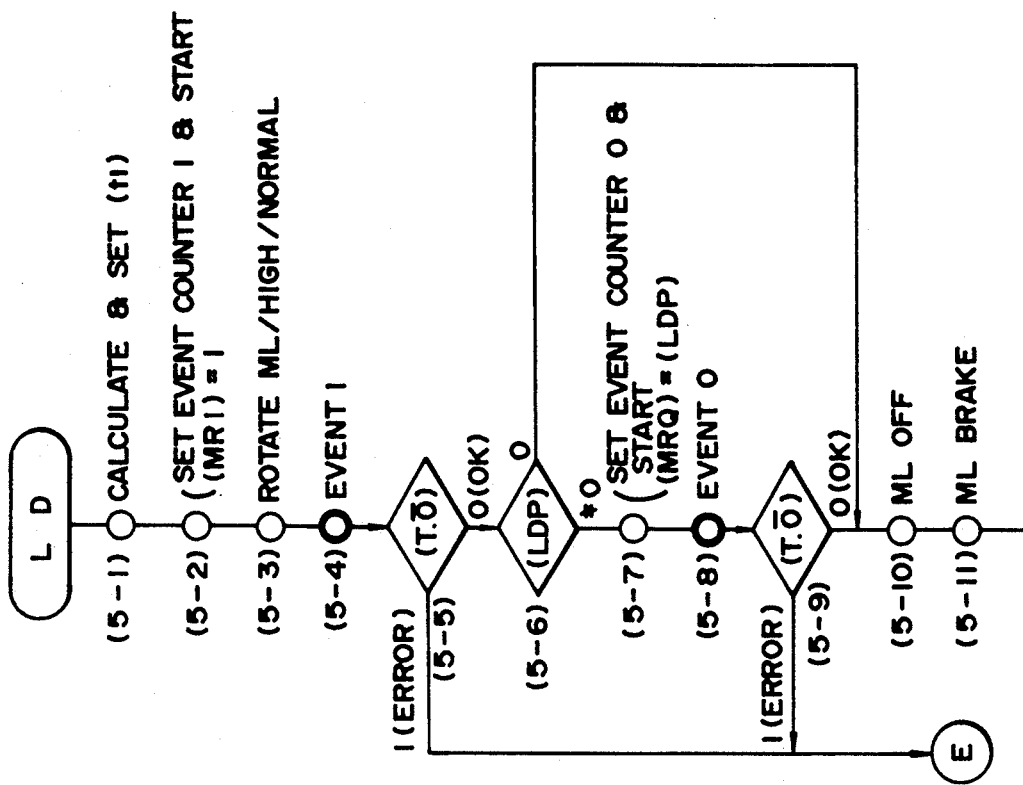
Figure 51:
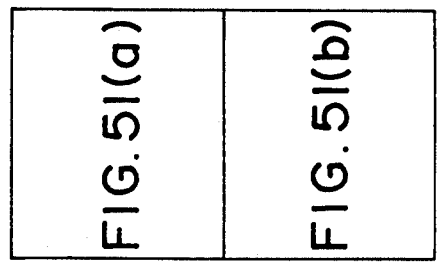
Figure 51B:
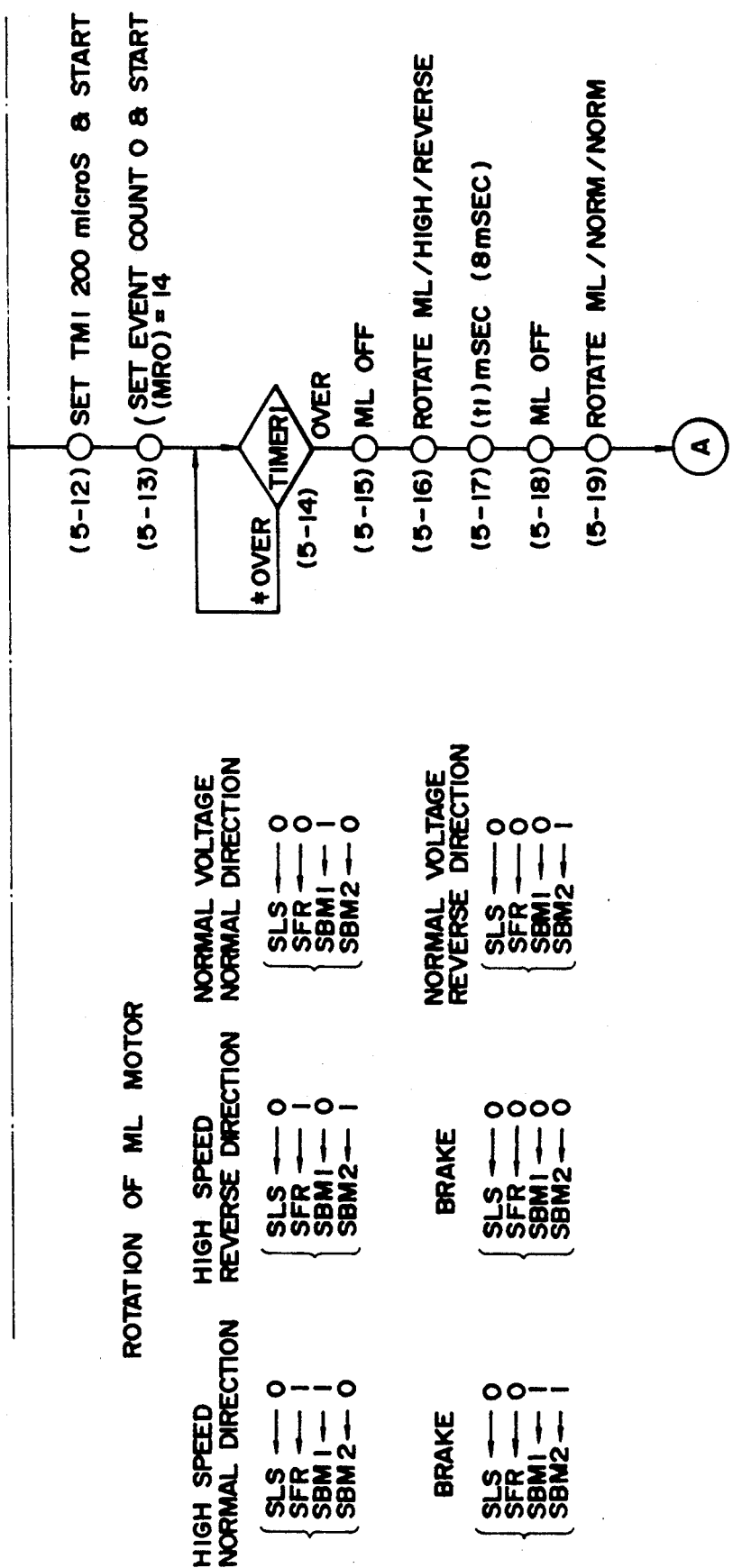
Figure 52:
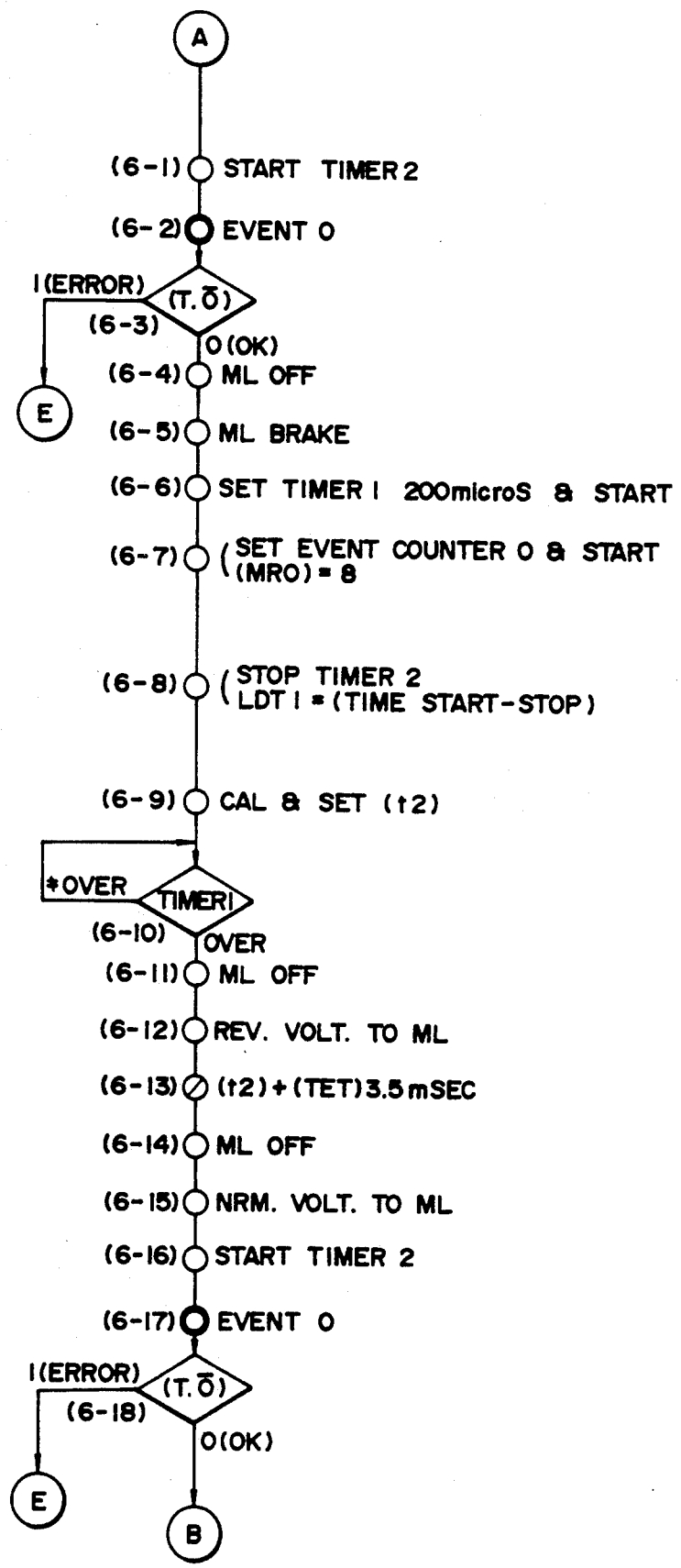

By using aforesaid focal distance information, moving target information shown in FIG. 36 is inputted as shown in FIG. 50 (step 10 - 1). From EEPROM, photometry compensation data, range-finding compensation data, focusing compensation data and shutter driving compensation data are inputted (step 10 - 2). First, photometry is conducted (step 10 - 3) and then range-finding is conducted. Range-finding is conducted as shown in FIGS. 51 and 52 (step 10 - 4). From the results of the photometry and range-finding, operations for shutter control and focusing control are conducted (step 10 - 5). Based on information of distance and focal distance both stored in RAM of MAIN-CPU 200, parallax compensation information is calculated (step 10 - 6) through a parallax data table, and it is transferred to SUB-CPU 201 (step 10 - 7). Distance information AFZ is judged whether it is on a level of short distance warning or not (step 10 - 8), and when it is not short distance warning level, a strobe mode is first detected (step 10 - 9) as charging of strobe capacitor is shown in FIG. 37, and it is judged (step 10 - 10) whether or not the operation button 13 has been operated for zooming during charging for a strobe. When flag ZINT is '1', operation button 13 is judged to have been operated and the step advances to 5E, while when it is '0', the button is judged to have not been operated and the step advances to the next one (step 10 - 11). Serial transfer of range-finding data from MAIN-CPU 200 to SUB-CPU 201 is made (step 10 - 12). Next, NTLEDD that indicates the direction of the moving target to the outside is lit, thereby enabling the direction for range-finding for the subject to be observed (step 10 - 13). Next, a test mode is executed (step 10 - 14), and when a shutter blade is in its initial position in the detection of flag ST, '1' is set and the step advances to 11A (step 10 - 15), while when it is not in the initial position, the shutter blade is judged not to be set in its initial position, thus error information, meaning erroneous initial position of a shutter blade, is transferred to SUB-CPU 201 (step 10 - 16).

Flag SWING is detected to detect whether a swing mode to be set in a function mode has been set or not (step 10 - 17), and when the result of the detection shows '1', flag MEC is set to '1' (step 10 - 18). Next, focusing driving is conducted (step 10 - 19) and a state of switch S1, whether it is turned on or turned off, is detected, and when it is turned on, the step advances to the next one (step 10 - 20). When switch S2 is turned on after switch S1 is turned on (step 10 - 21), the existence of signals for opening barrier 103 for a camera lens is detected (step 10 - 22), and when the signals for opening are inputted, drive mode is detected (step 10 - 23). When a drive mode is set to '1' for setting to single photographing S or to continuous photographing C, PRINT transfer is conducted (step 10 - 24) for the purpose of synchronizing the start of photographing operation of SUB-CPU 201 with that of MAIN-CPU 200.

Figure 38A:
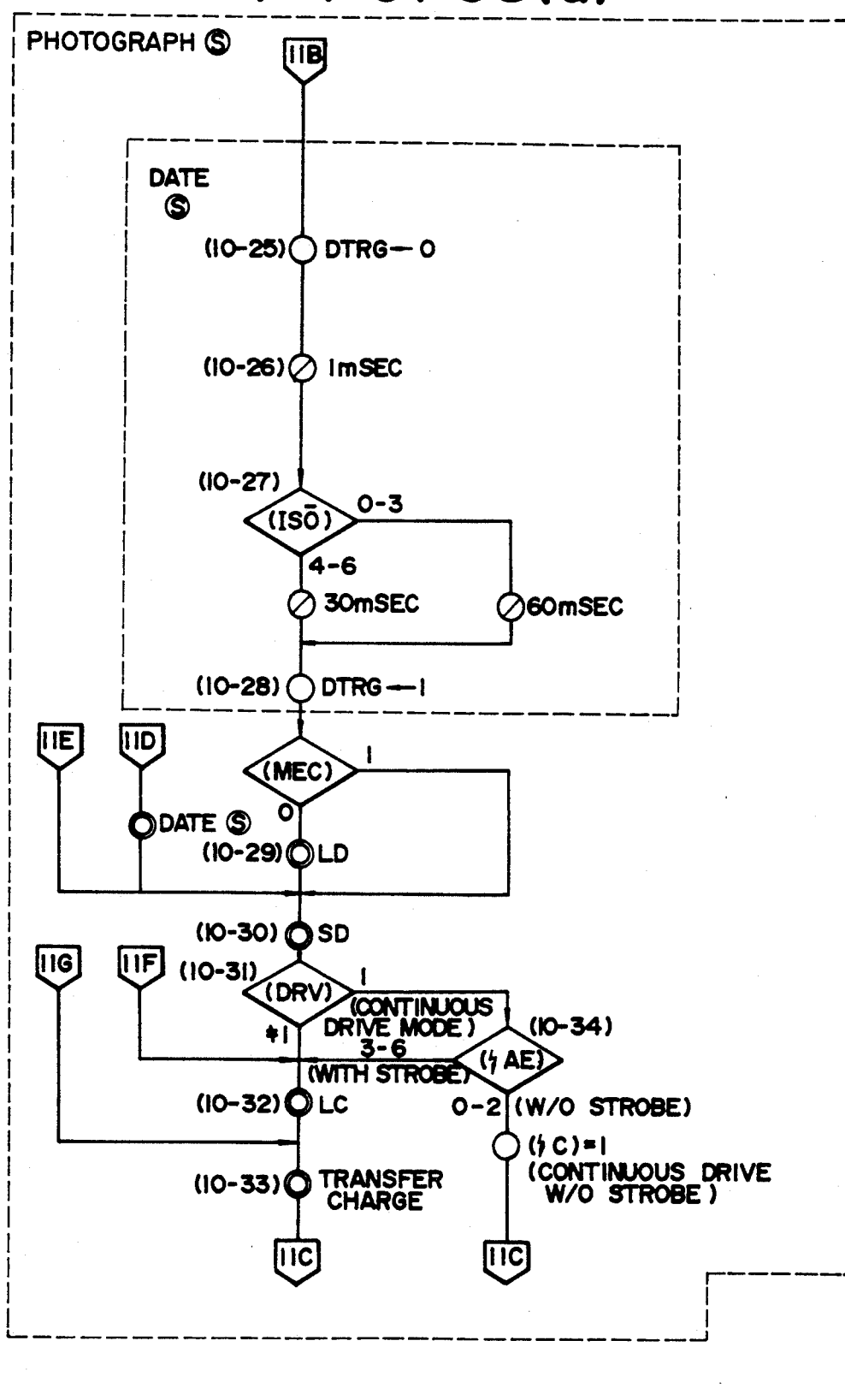
Figures 38, 38B:
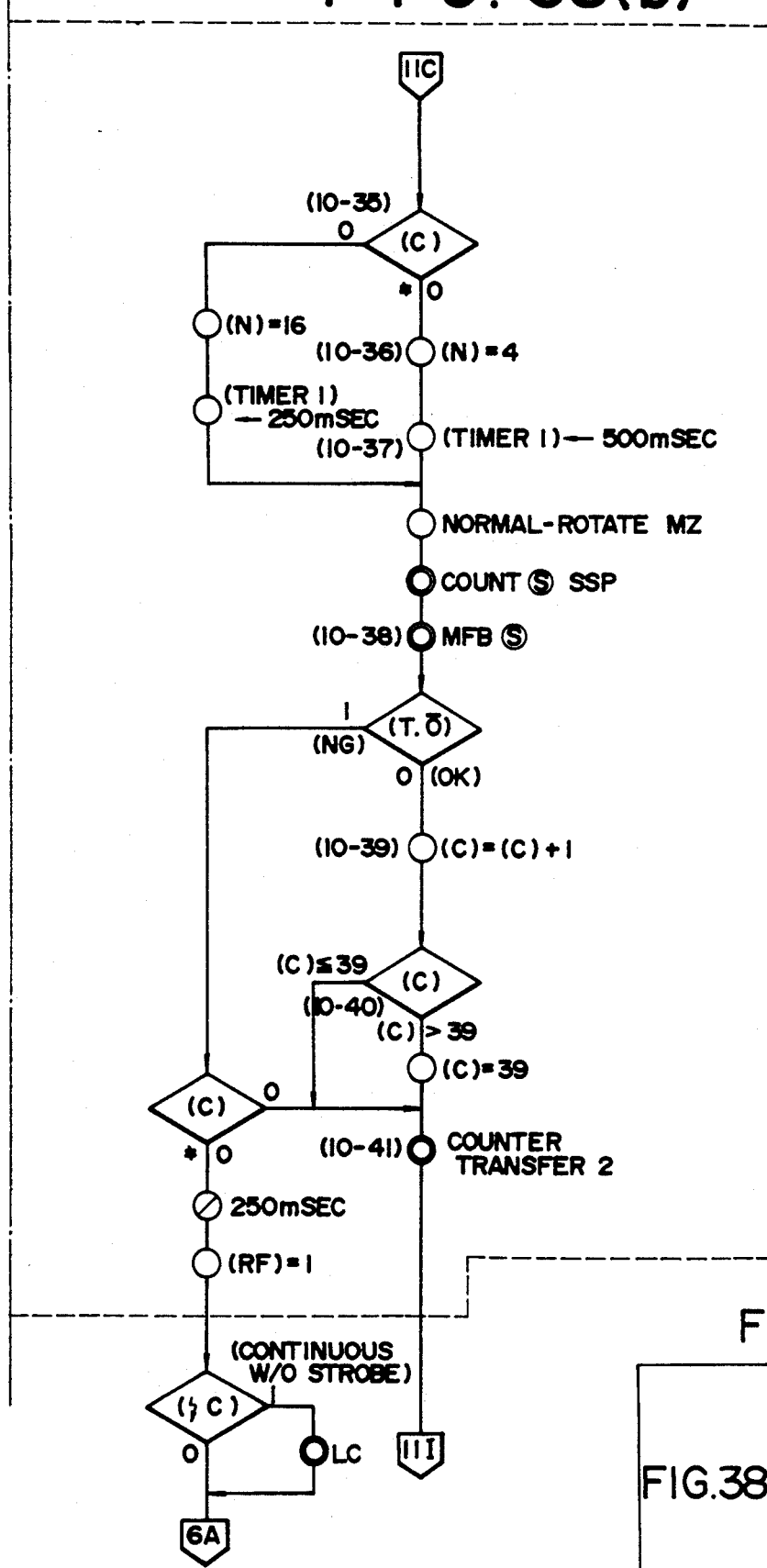

Next, as shown in FIG. 38, terminal DTRG is set to 'L' (step 10 - 25), 1 m sec counting is conducted (step 10 - 26), and ISO data are detected. When the result of the detection is 4 - 6, 30 m sec counting is conducted and when it is 0 - 3, 60 m sec counting is conducted to go to the next step (step 10 - 27). After terminal DTRG is set to 'H' (step 10 - 28) and flag MEC is detected, if the result of the detection shows '0', focusing driving is conducted (step 10 - 29), shutter driving is conducted (step 10 - 30) and judgment is made whether driving mode is set to continuous photographing or not (step 10 - 31). When it is not set to continuous photographing, a focusing motor is charged to its initial position (step 10 - 32). Charge transfer is made to SUB-CPU 201, and when SUB-CPU 201 receives the charge transfer, an indication of 'in process of film-winding' appears on a liquid crystal display (step 10 - 33).

Next, flag C is detected and when it is not '0' (step 10 - 35), N is set to 4 (step 10 - 36) and timer is set to 500 m sec (step 10 - 37), and after film-winding for one frame is detected, a brake is applied on film-feeding motor MF to stop it (step 10 - 38).

When the result of detection of flag TO shows '0', '1' is added to counter C (step 10 - 39). When counter C is greater than 39, the number 39 is set, while it is smaller than 39, the number (step 10 - 40) is transferred (step 10 - 41).

Figure 39:
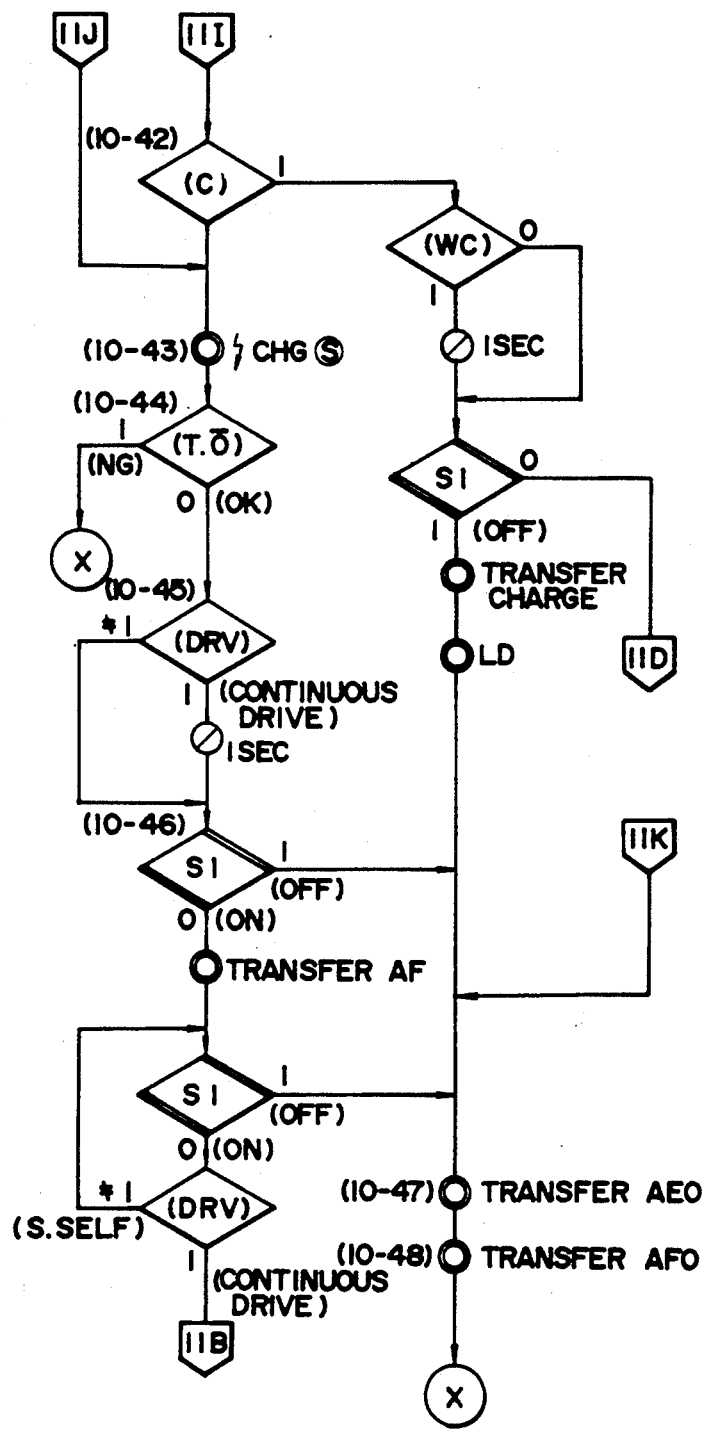
Figure 40A:
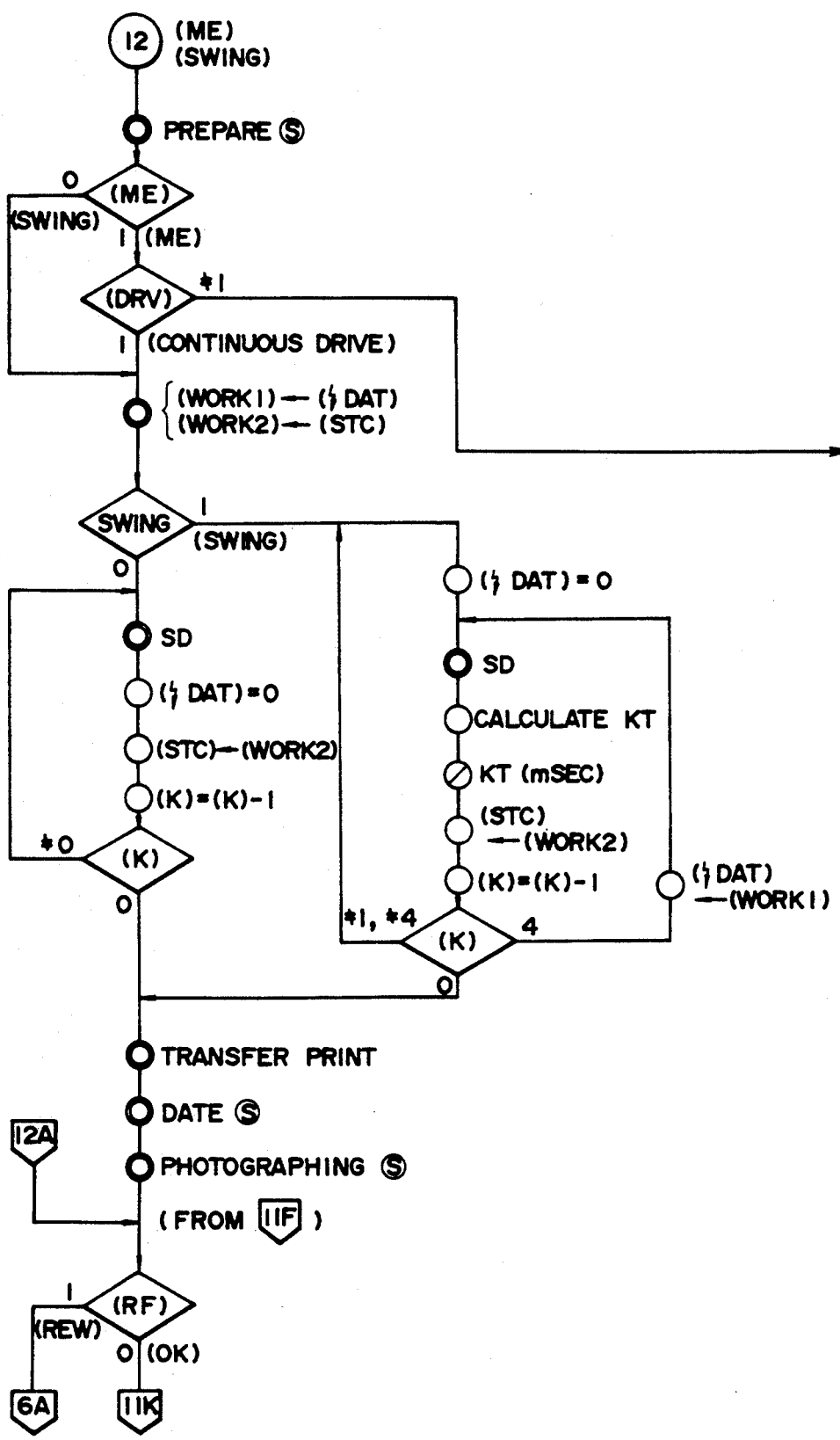
Figure 40B:
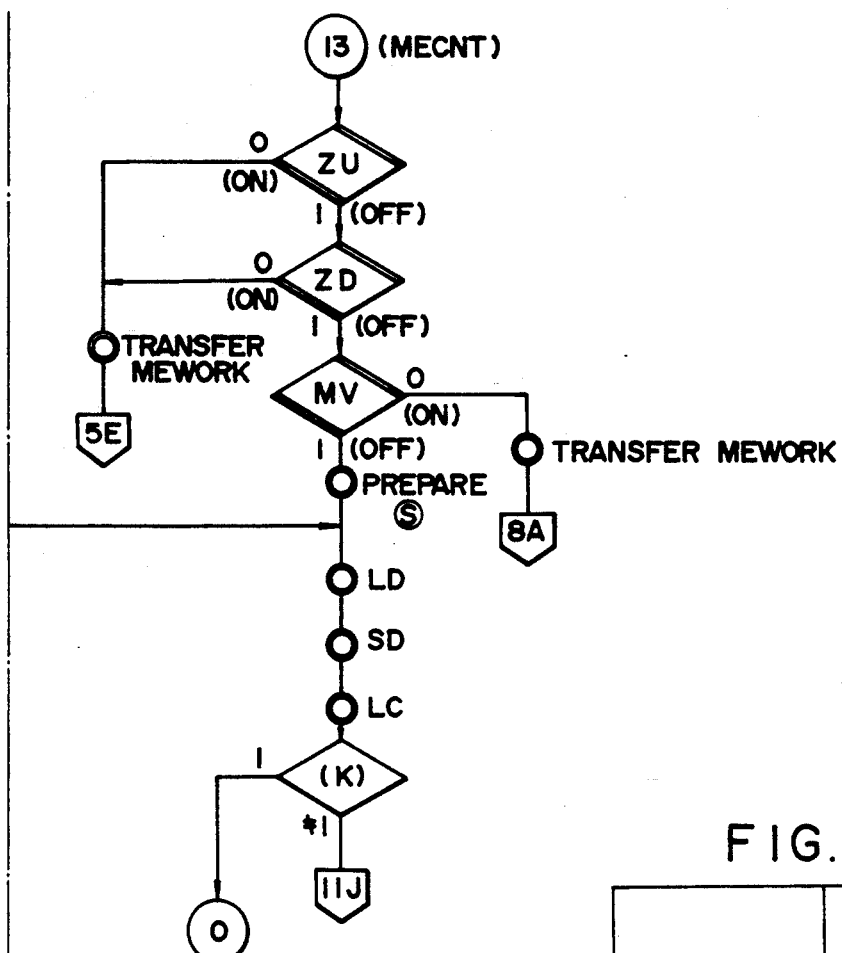
Figure 40:
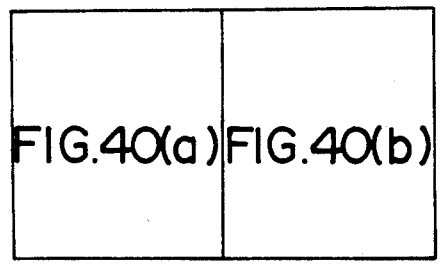
Figure 41:
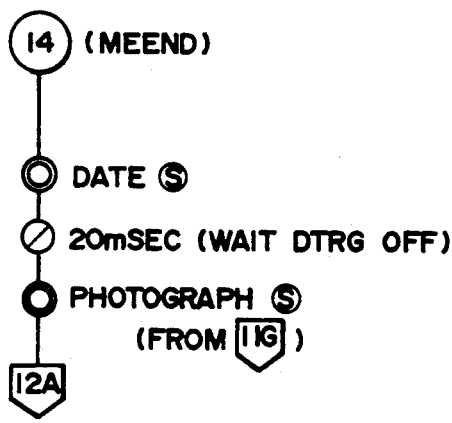
Figure 43:
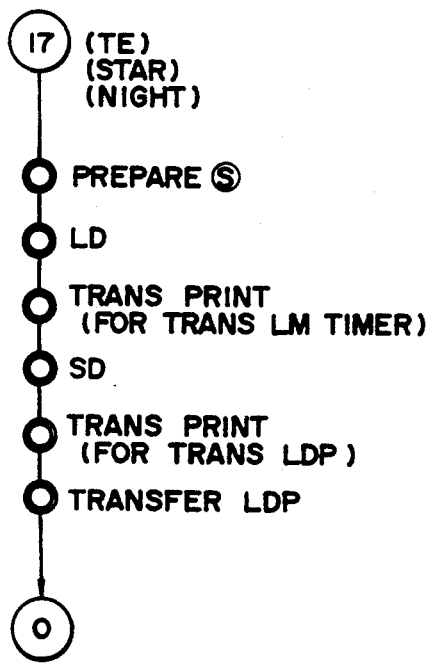
Figure 42:
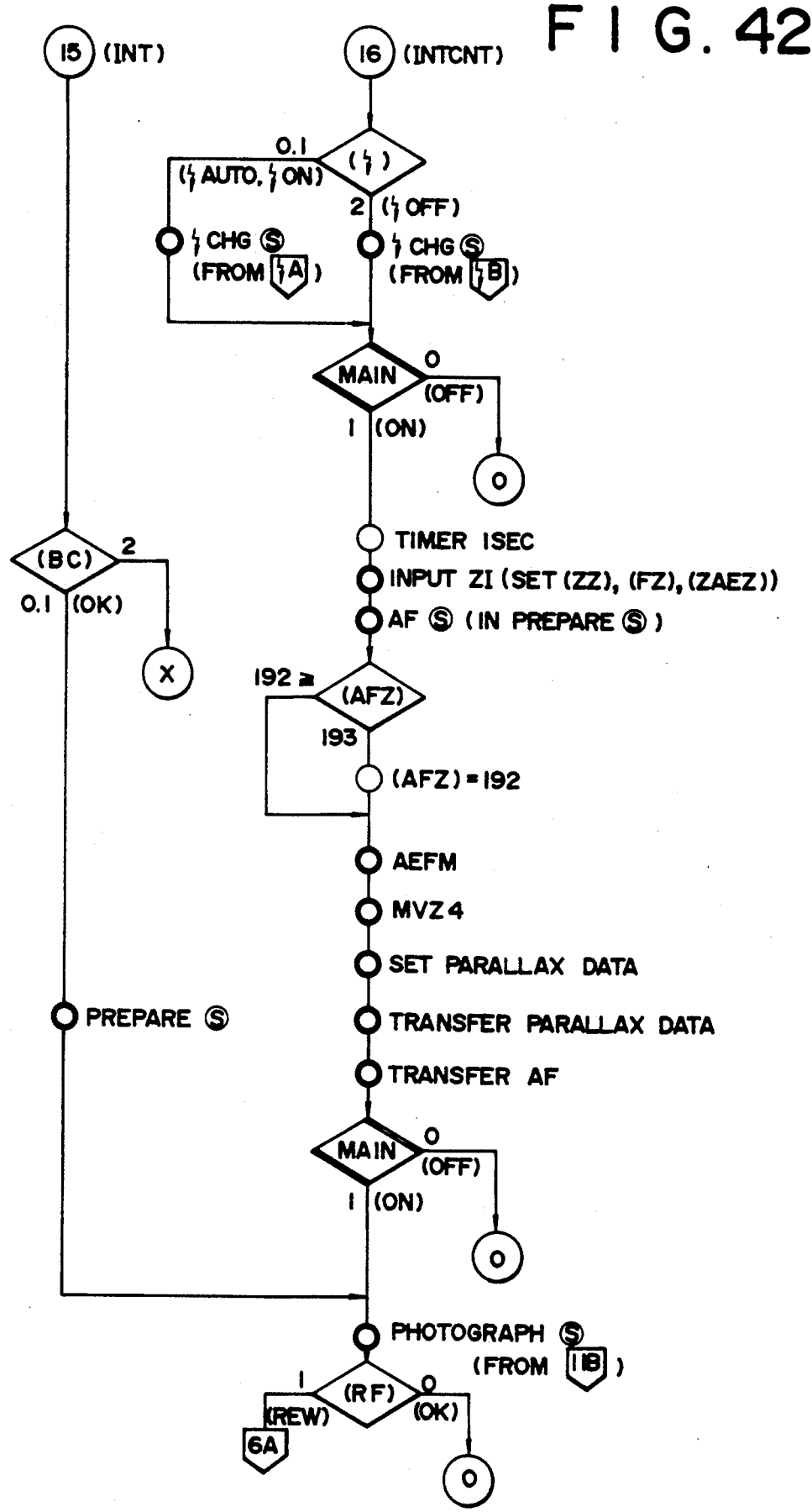
Figure 44:
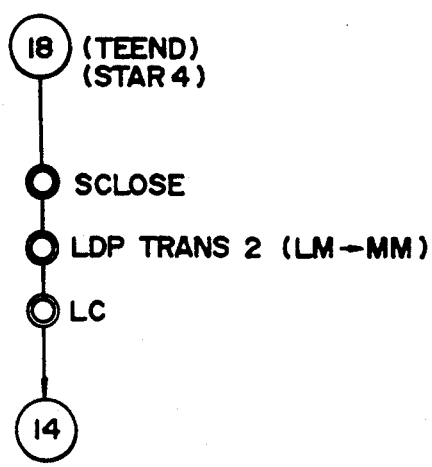

Next, as shown in FIG. 39, when the detection (step 10 - 42) of flag C shows '0', a strobo capacitor is charged (step 10 - 43). When the detection of flag TO shows '0' (step 10 - 44), flag DRV is detected. When the result of the detection is the one other than '1' (step 10 - 45), switch S1 is detected. When it is in the state of OFF (step 10 - 46), pieces of information for erasing (step 10 - 47) range-finding information and erasing photometry information both on a liquid crystal indicator are transferred (step 10 - 48) to SUB-CPU 201.

Figure 48:
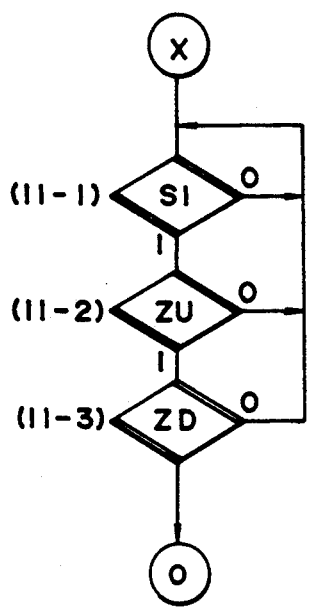
Figure 49:
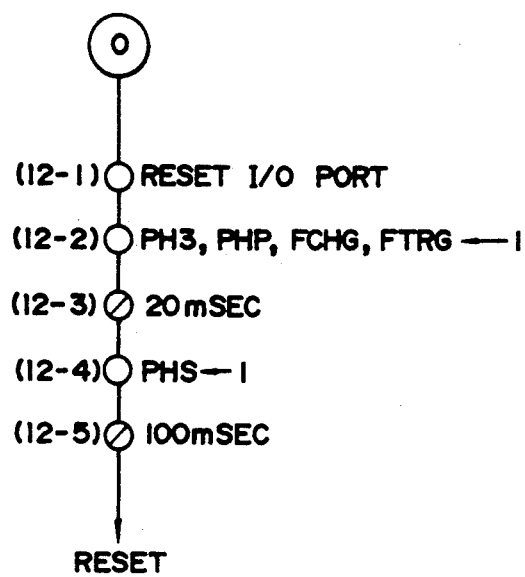

In FIG. 48, when the detection of the states of switch S1 (step 11 - 1), zoom switch ZU (step 11 - 2), and zoom switch ZD (step 11 - 3) show that all of them are In the state of OFF, I/O port is reset (step 12 - 1), terminals PH 3, PHP, FCFG and FTRG are set to level H (step 12 - 2) as shown in FIG. 48, terminal PSH is set to level H (step 12 - 4) after counting of 20 m sec (step 12 - 3), and MAIN-CPU 200 completes its operation (step 12 - 5) after 100 m sec.

When any one of flag INT, SPOT, +1.5 EV, and −1.5 EV is set to '1' (from step 9 - 7 to step 9 - 10) on a flow chart in FIG. 35, the step advances to FIG. 36 and each photographing mode is executed.

When any one of flag ME, TE, INT, NIGHT, STAR, SWING, AZ, MECNT, MEEMD, TEEND, INTCNT, TV and AV is set to '1' (from step 9 - 11 to step 9 - 25) on a flow chart in FIG. 35, the step advances to any of FIGS. 40 - 47 depending on each circumstance, and each photographing mode is executed.

Moving Target Position-Detection Sub-Routine

Input of moving target information is conducted as shown in FIG. 50. In the case of MVZ1, terminal ZI is detected, and based upon the data obtained from the detection, focal distance information ZZ in Table-1 (ZI input table), focusing lens position information FZ, and exposure compensation information ZAEZ are set (step 3 - 1), and then focusing lens position information FZ is set on ZIDI to be used in automatic zooming (step 3 - 2). Terminal MVI is detected (step 3 - 3), and based on the data obtained from the detection, moving target position information MV is selected from the moving target table shown in Table-4 (step 3 - 4) and is transferred to SUB-CPU 201 (step 3 - 5). Other items of MVZ 2, MVZ 3 and MVZ 4 are executed as shown on a flow chart.

Focusing Sub-Routine

Figure 53:
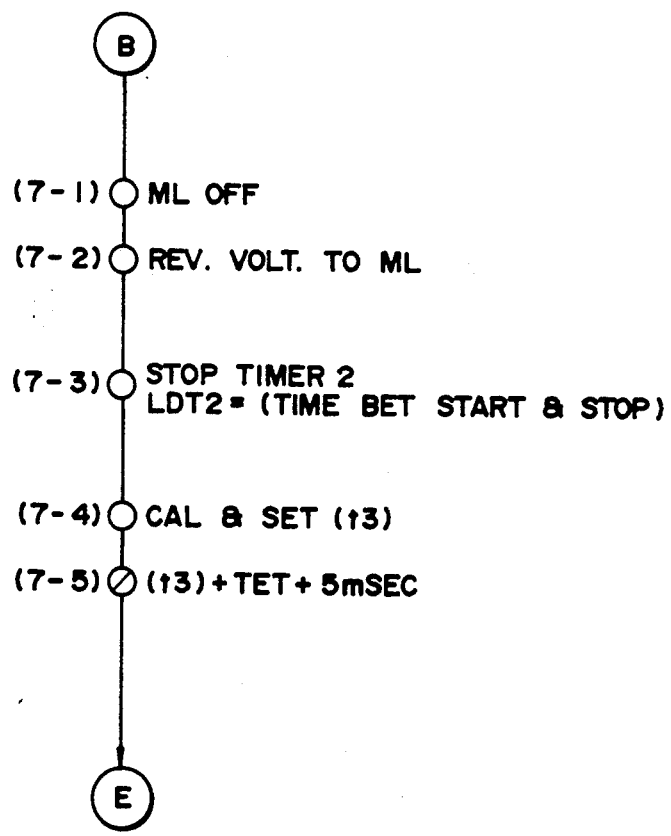

Focusing drive shown in FIG. 51 will be explained as follows. First, t1 is calculated from lens LDP (step 5 - 1) as shown on Table-2 and event counter 1 is set and MRI is set to '1' (step 5 - 2). Focusing drive motor ML runs at high speed in the normal direction (step 5 - 3) to execute EVENT 1 that counts LDP 2 which will be stated later. Flag TO is detected to judge whether there is an erroneous operation in EVENT 1 or not. When the detection shows '1', this means an erroneous operation and the camera is caused to be in a non-operation state, while when the detection shows '0', the step advances to the next one (step 5 - 5). The rotation of a focusing drive motor is detected by a photointerrupter (step 5 - 6), and event counter 0 is set (step 5 - 7) by detecting pulse rise, and EVENT0 counts LDPI (step 5 - 8). Flag TO is detected and when the detection shows '1', a camera is caused to be in a non-operation state, while when the detection shows '0', the step advances to the next (step 5 - 9). Then, focusing drive motor ML is turned off (step 5 - 10) and BRAKE is applied on focusing drive motor ML (5 - 11). Timer 1 is set to 200 micro sec to start counting time (step 5 - 12). Event counter 0 is set to start and MRO=14 is set (step 5 - 13) and the state of timer 1 is detected. When timer 1 shows time-over (step 5 - 14), focusing drive motor ML is turned off (step 5 - 15) and is caused to rum at high speed in the reverse direction (step 5 - 16). This is continued for a period of 8 m sec (step 5 - 17) and then focusing drive motor ML is turned off (step 5 - 18). Next, focusing drive motor ML is operated to run in the normal direction under the prescribed voltage (step 5 - 19) to advance to FIG. 52 and timer 2 is counted (step 6 - 1), EVENT0 is executed (step 6 - 2) and flag T0 is detected (step 6 - 3). When the detection shows '0', focusing drive motor ML is turned off (step 6 - 4) and then BRAKE is applied on focusing drive motor ML (step 6 - 5) and timer 1 is set to 200 micro sec to start counting (step 6 - 6). Event counter 0 is set to start and at the same time, MR0=8 is set (step 6 - 7) and then timer 2 is stopped and a period of time from the start to the stop is set on LD 1 (step 6 - 8). Then, t2 is selected from Table-2 (step 6 - 9) and the state of timer 1 is detected. When the detection shows time-over (step 6 - 10), focusing drive motor ML is turned off (step 6 - 11) and then is operated to run in the reverse direction under the prescribed voltage (step 6 - 12). This running is continued for a period of time including aforesaid t2 and a value added by temperature data compensation TET (step 6 - 13), and then focusing drive motor ML is turned off (step 6 - 14) and is operated to run in the normal direction under the prescribed voltage (step 6 - 15). Timer 2 starts counting time (step 6 - 16) to execute EVENT0 (step 6 - 17). Flag T0 is detected (step 6 - 18) and when the detection shows '0', the step advances to FIG. 53, focusing drive motor ML is turned off (step 7 - 1), then focusing drive motor ML is operated to run in the reverse direction under the prescribed voltage (step 7 - 2), counting on timer 2 is stopped and a period of time from the start to the stop is set on LDT 2 (step 7 - 3), t3 is selected from Table-3 (step 7 - 4), and the motor running is continued for a period including t3, temperature data compensation TET and 5 m sec (step 7 - 5), and the step advances to FIG. 54 'E'.

Figure 54A:
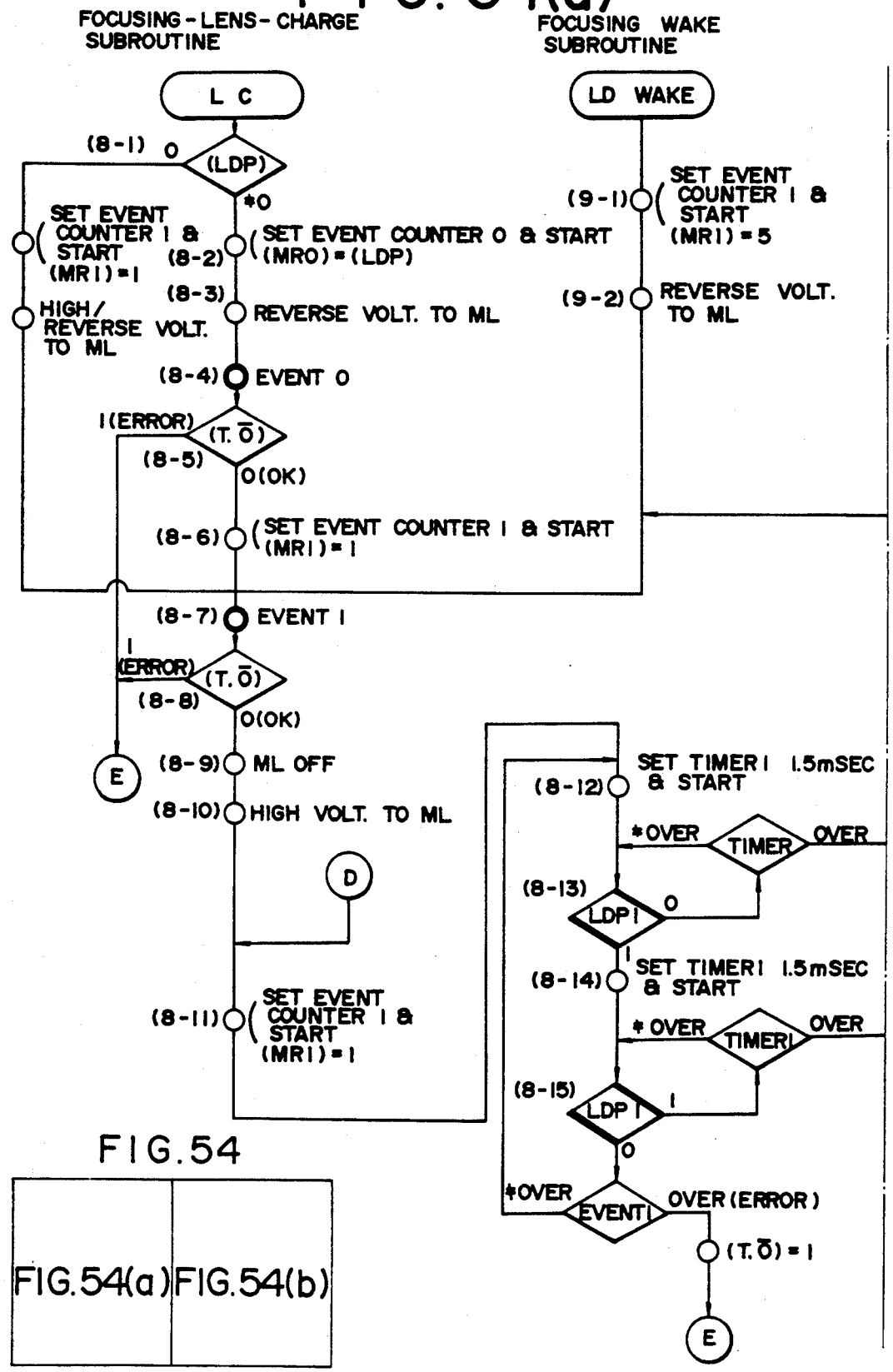
Figure 54:
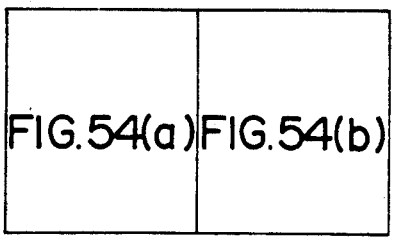
Figure 54B:
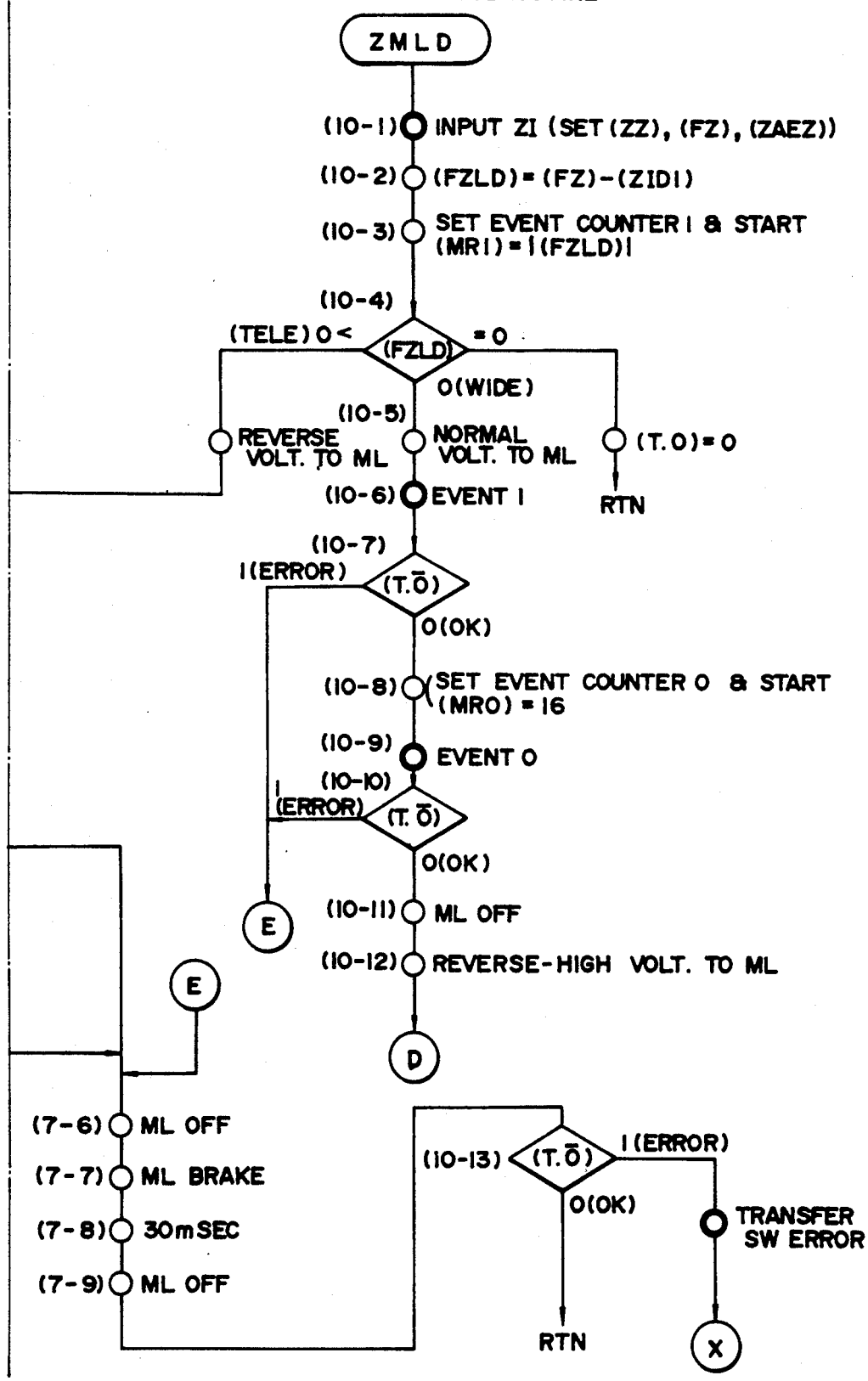

In FIG. 54, focusing drive motor ML is turned off (step 7 - 6), then BRAKE is applied on focusing drive motor ML (step 7 - 7), and it continues for 30 m sec (step 7 - 8), then focusing drive motor ML is turned off (step 7 - 9) and flag T0 is detected (step 7 - 10). When the detection shows '0', the step returns to the main routine.

Focusing Charge Sub-Routine

Drive of focusing shown in FIG. 54 will be explained. LDP is judged (step 8 - 1) and when the result of the detection is not '0', event counter 0 is set and setting is made to (MR0)=(LDP) to start (step 8 - 2). Focusing drive motor is operated to run in the reverse direction (step 8 - 3), EVENT0 is executed (step 8 - 4) and flag T0 is detected (step 8 - 5). When the result of the detection is not '0', event counter 1 is set for starting and for setting to MR1=1 (step 8 - 6), EVENT 1 is executed (step 8 - 7), flag T0 is detected (step 8 - 8), focusing drive motor ML is turned off (step 8 - 9), focusing drive motor ML is operated to run at high speed in the normal direction (step 8 - 10), event counter 1 is set for starting and for setting to MR1=1 (step 8 - 11), a timer is set to 1.5 m sec for starting (step 8 - 12), and the state of LDPI is detected (step 8 - 13). When the detection shows '1', the state of a timer is judged (step 8 - 16). Focusing drive motor ML is turned off (step 7 - 6) and then BRAKE is applied on focusing drive motor ML (step 7 - 7), and it continues for 30 m sec (step 7 - 8), focusing drive motor ML is turned off (step 7 - 9) and flag T0 is detected (step 7 - 10). When the detection show '0', the step returns to main routine.

Focusing Wake Sub-Routine

Drive for initial setting of focusing lens shown in FIG. 54 will be explained. Event counter 1 is set for starting and is set to (MR1)=5 (step 9 - 1). Focusing drive motor ML is operated to run in the reverse direction under the prescribed voltage (step 9 - 2). After that the step advances to step 8 - 7.

Focusing Sub-Routine by Zoom

Drive for initial setting of focusing lens shown in FIG. 54 will be explained. Focal distance information ZZ, focusing lens position information FZ and compensation information ZAEZ for open F-value are inputted (step 10 - 1), and then ZIDI is subtracted from focusing lens position information FZ for FZLD (step 10 - 2), event counter 1 is set for starting and for setting to MR1=FZLD (step 10 - 3). Then, the state of FZLD is detected (step 10 - 4), and when the result of the detection is smaller than '0', focusing drive motor ML is operated to run in the normal direction under the prescribed voltage (step 10 - 5) and EVENT 1 is executed (step 10 - 6). Flag T.O is detected (step 10 - 7), and when the detection shows '0', event counter 0 is set for starting and for setting MR0=16 (step 10 - 8) and EVENT0 is executed (step 10 - 9). Flag T.O is detected (step 10 2 - 10), and when the detection shows '0', focusing drive motor ML is turned off (step 10 - 11) and then is operated to run in the reverse direction at high speed (step 10 - 12). Then, the step advances to D.

Focusing Sleeve Sub-Routine

Figure 55:
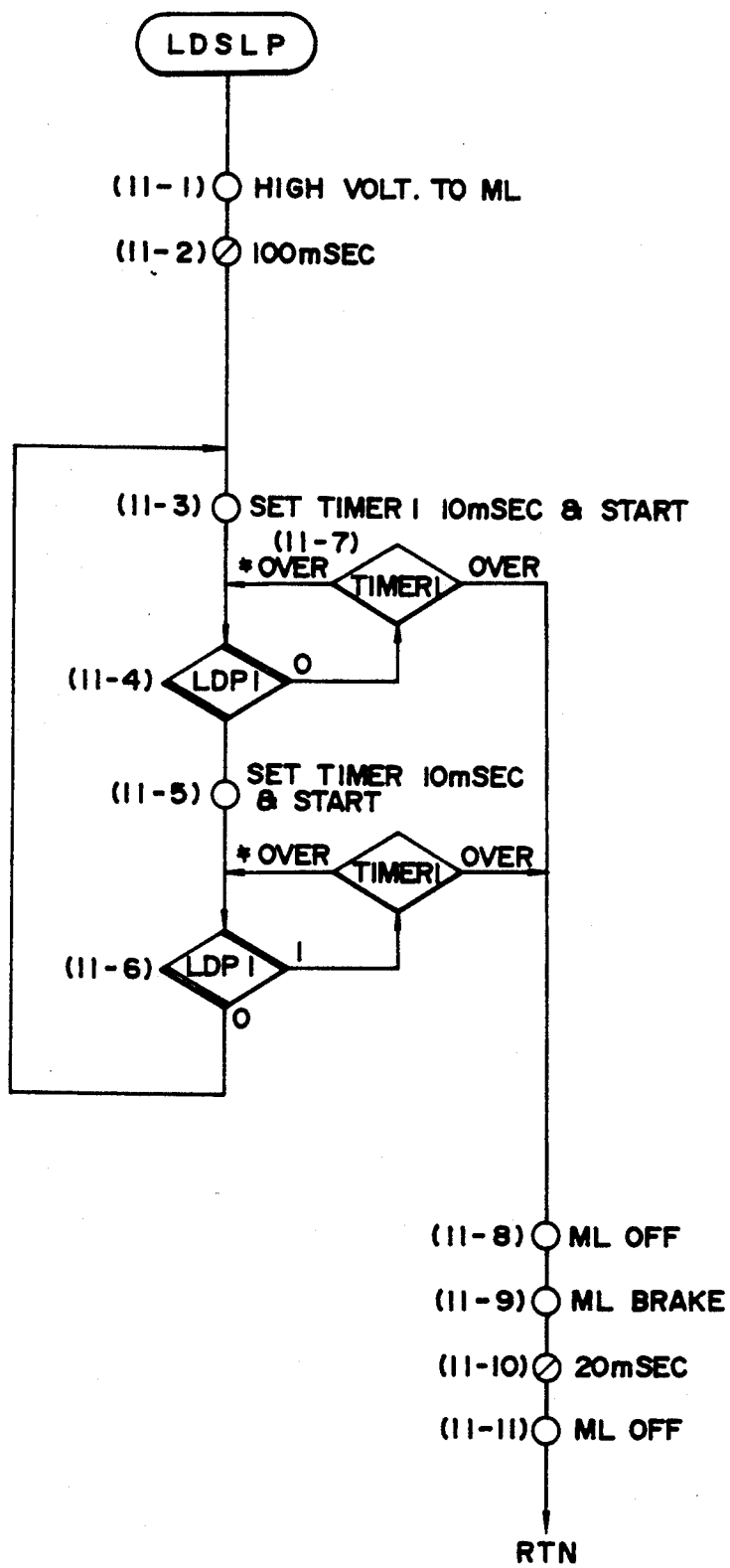

Focusing sleeve sub-routine shown in FIG. 55 is performed as follows. First, focusing drive motor is operated in the normal direction at high speed (step 11 - 1). Then, 100 m sec is counted (step 11 - 2) and timer 1 is set to 10 m sec for starting (step 11 - 3). Voltage rise of LDP 1 is detected (step 11 - 4), and when the detection shows '1', timer 1 is set to 10 m sec for starting (step 11 - 5). Voltage rise of LDP 1 is detected (step 11 - 6) and returns to step 11 - 3. The timer is detected at step 11 - 3 (step 11 - 7) and when the detection shows time-over, focusing drive motor ML is suspended (step 11 - 8 to step 11 - 11).

LDP 1 Event Counter Sub-Routine

Figure 56:
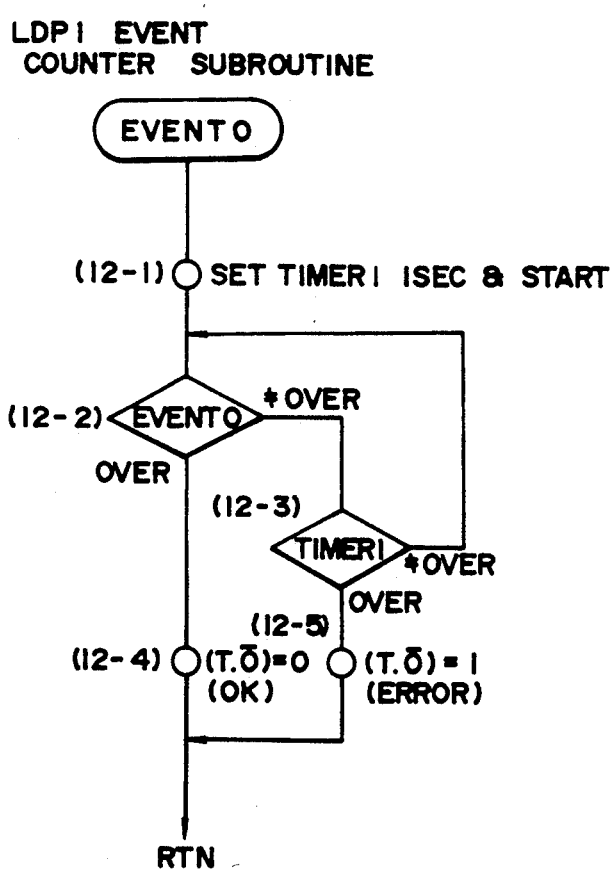

LDP 1 event counter sub-routine shown in FIG. 56 is a routine for counting a falling edge of LDP 1 which is a pulse-shaped signal generated when the focusing lens moves. First, a timer is set to 1 sec and counting for this is started (step 12 - 1). Whether the rising edge of predetermined LDP 1 has been counted or not is judged (step 12 - 2), and when the judgment shows that no counting has been made, whether counting of timer 1 has been completed or not is judged (step 12 - 3). When the judgment shows that counting has not been completed, the step returns to 12 - 2. When counting is completed in step 12 - 3, flag T.O is set to '0' (step 12 - 4). In step 12 - 3, flag T0 is set to '1' (step 12 - 5)

LDP 2 Event Counter Sub-Routine

Figure 57:
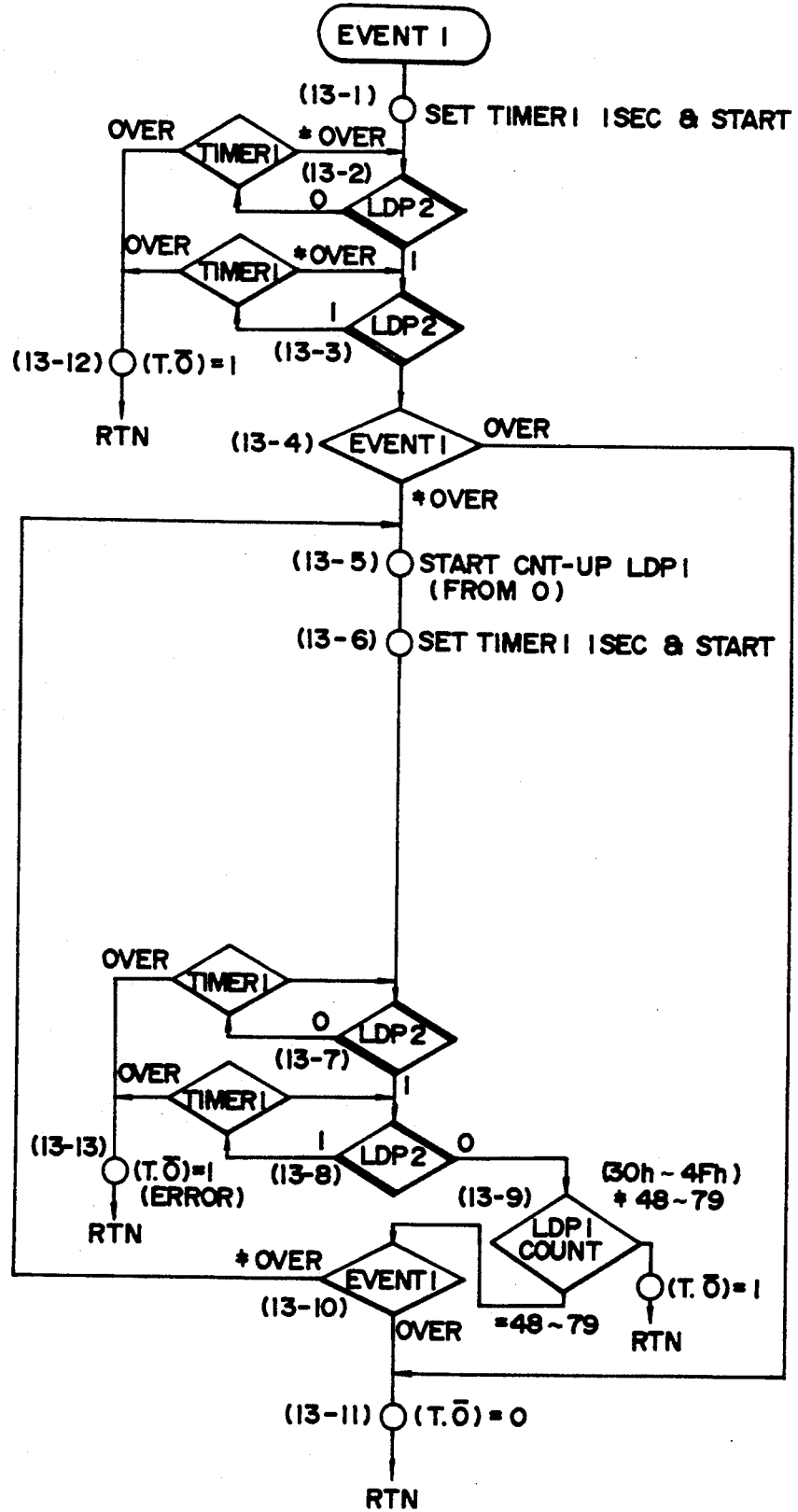

LDP 2 event counter sub-routine shown in FIG. 57 is a routine for counting pulses of pulse-shaped signals LDP 2 generated when focusing lens moves. First, timer 1 is set to 1 sec and counting for this is started (step 13 - 1) and the rise of LDP 2 is detected (step 13 - 2), and when the detection shows '1', falling of LDP 2 is detected (step 13 - 3) and whether event counter 1 has been completed or not is judged (step 13 - 4). When event counter 1 has not been completed, count-up for LDP 1 is conducted (step 13 - 5) and timer 1 is set to 1 sec to start counting (step 13 - 6). Rise of LDP 2 is detected (step 13 - 7), and when the detection shows '1', falling of LDP 2 is detected (step 13 - 8). When counting of LDP 1 (step 13 - 9) shows the predetermined number, whether event counter 1 has been completed or not is judged (step 13 - 10) and when event counter 1 is judged to have been completed, flag T.0 is set to '0' (step 13 - 11). Now, in steps 13 - 2, 13 - 3, 13 - 7, and 13 - 8, when counting for time 1 has been completed, flag T.0 is set to '1', while when counting has not been completed, the step advances to the next.

Range-Finding Sub-Routine

Figure 58:
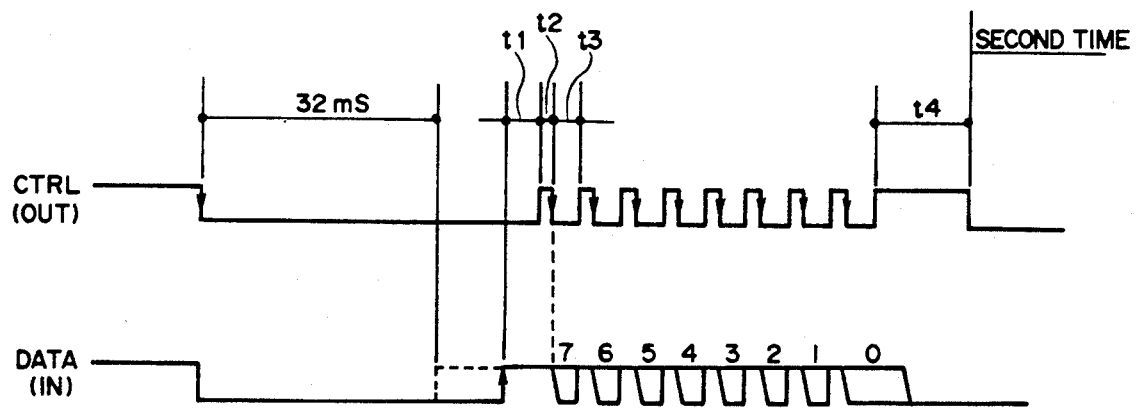

FIG. 58 shows how range-finding is conducted. On a range-finding device of an infrared active type in the present example, an infrared-light-emitting element in a projector is caused to make a plurality of pulse-shaped emission, and reflected light from a subject is received by a photoreceptor element (PSD) in a photoreceptor device, thus a photoelectric current is accumulated, and when such photoelectric current arrives at a prescribed level of voltage, emission of infrared light is suspended and range-finding information from the range-finding device are inputted.

Terminal CTRL of MAIN-CPU 200 is changed from level H to level L, and after counting 32 m sec, terminal DATA of range-level finding IC is changed from level L to level H. This is detected by MAIN-CPU 200 and after counting t1, terminal CTRL is changed from level L to level H by which range-finding information is set. Then, above-mentioned range-finding information is read after being stabilized. After that, terminal CTRL is returned to level H, and aforesaid sequence is repeated. Second range-finding and thereafter are started after waiting for a period of t4.

Figure 59:
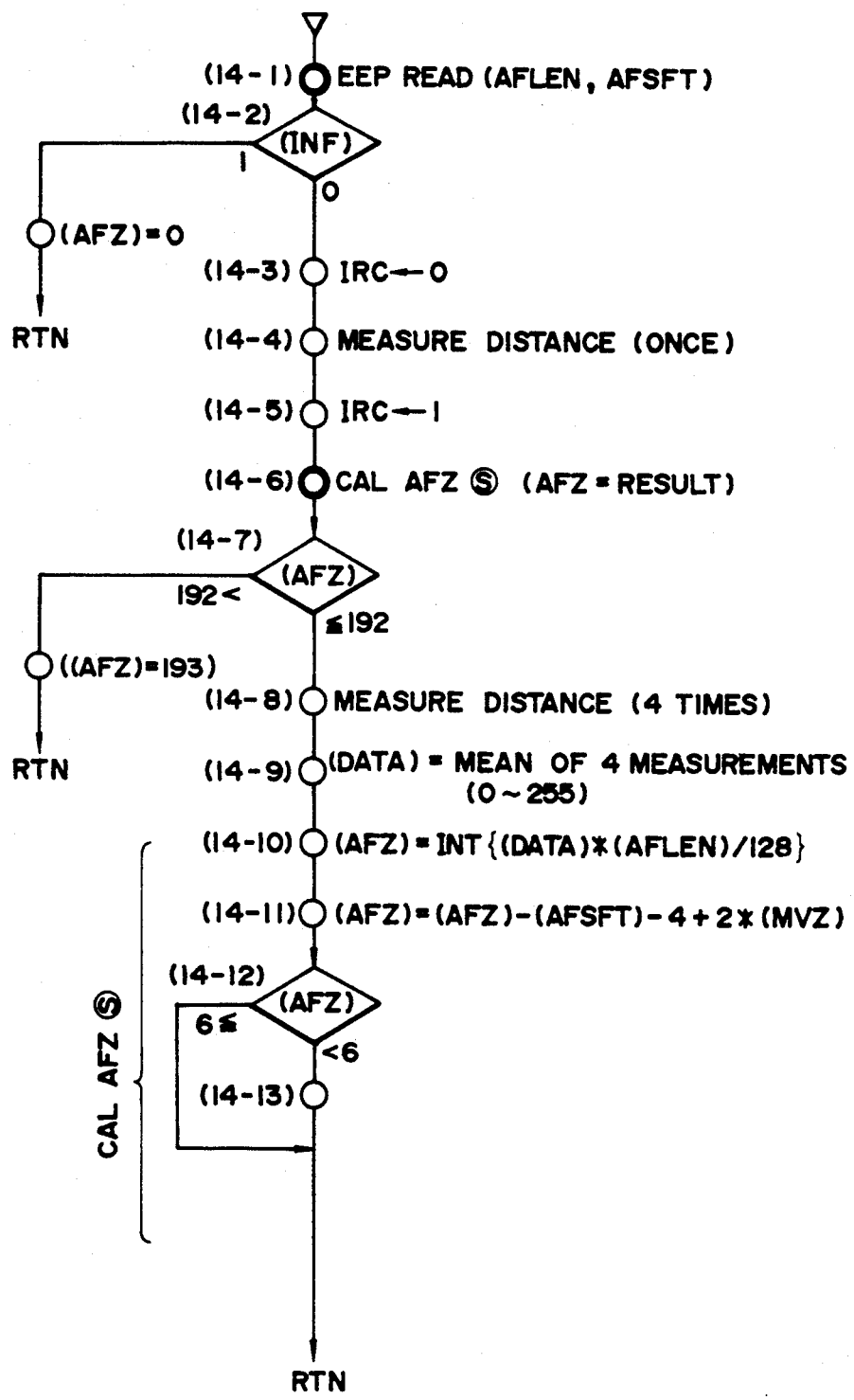

Next, range-finding sub-routine shown in FIG. 59 will be explained. First, range-finding compensation information AFLEN and AFSFT are inputted from EEPROM (step 14 - 1), then, flag INF is detected (step 14 - 2) and when the detection shows '0' terminal IRC is set to level L (step 14 - 3). Thus, range-finding is conducted based on aforesaid timing chart, and DATA is inputted (step 14 - 4). Terminal IRC is set to level H (step 14 - 5) and AEZ operation, which will be explained later, is conducted (step 14 - 6). Next, a judgment is formed whether aforesaid AFZ is the shortest photographing limit or not (step 14 - 7), and when it is within a photographable range, range-finding is conducted four times (step 14 - 8) and the mean value of aforesaid four results of range-finding is calculated (step 14 - 9). The mean value thus obtained is calculated together with range-finding compensation information AFLEN read from EEPROM (step 14 - 10), and the result of aforesaid calculation is calculated together with range-finding compensation information AFSET read from EEPROM (step 14 - 11). Judgment is formed whether range-finding information AFZ thus calculated is an infinite focusing position or not (step 14 - 12), and when AFZ is less than '6', range-finding information is set to '6' (step 14 - 13).

Figure 60:
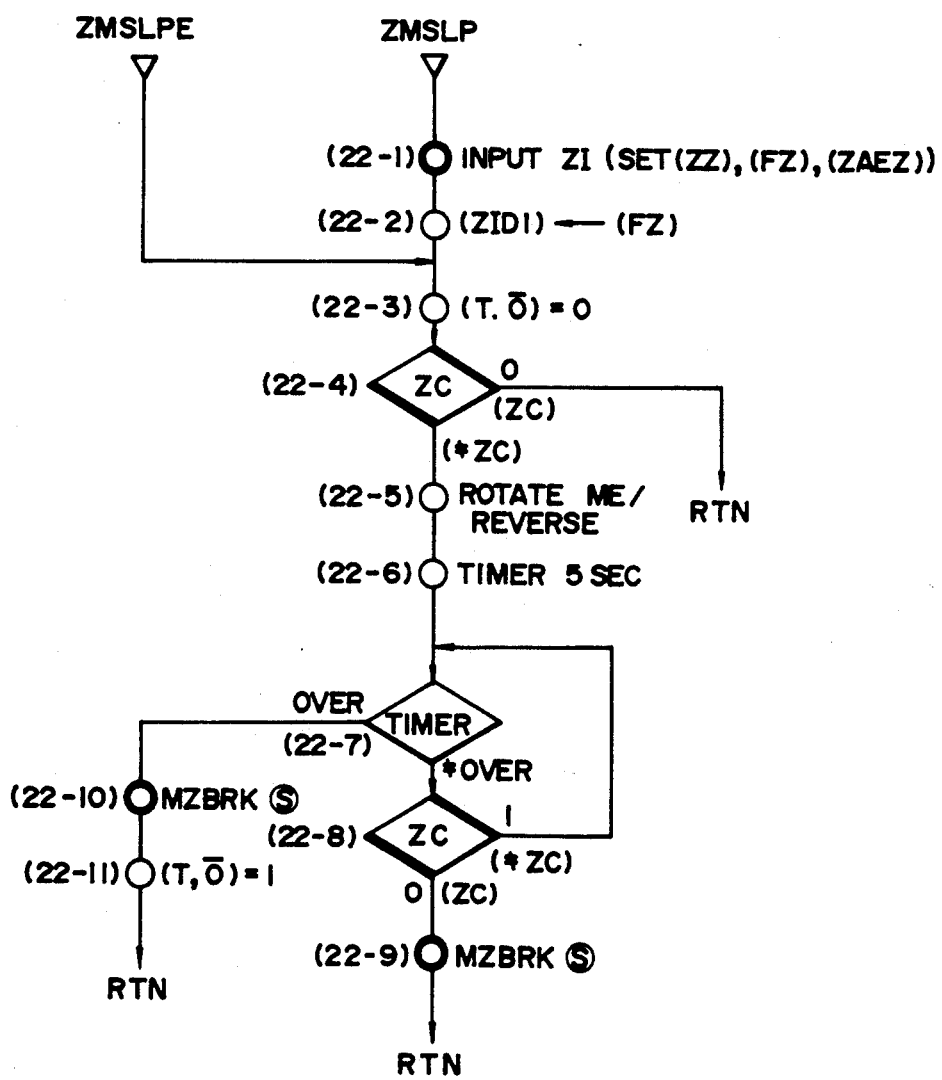

FIG. 60 shows a zoom sleep sub-routine wherein focus position information ZZ, focusing lens position information FZ and exposure compensation information ZAEZ are inputted from ZI Table (step 22 - 1), and then aforesaid FZ is replaced with ZID1 (step 22 - 2)

and flag T.O is set to '0' (step 22 - 3). The state of collapsed zoom lens barrel is conducted by detecting the state of terminal ZC that detects zoom close edge (step 22 - 4), and when the detection shows '1', it is judged to be an uncollapsed state and zoom driving motor MZ is rotated reversely (step 22 - 5), a timer is set to 5 sec and counting is started (step 22 - 6). Judgment is formed whether it is time-over or not (step 22 - 7), and when it is not time-over, the state of terminal ZC is detected (step 22 - 8). When the detection shows '0', zoom driving motor MZ is stopped (step 22 - 9). When a period of time set in step 22 - 7 is exceeded, zoom driving motor MZ is stopped (step 22 - 10) and flag T.0 is set to '1' (step 22 - 11).

Zoom Wake Sub-Routine

Figure 61:
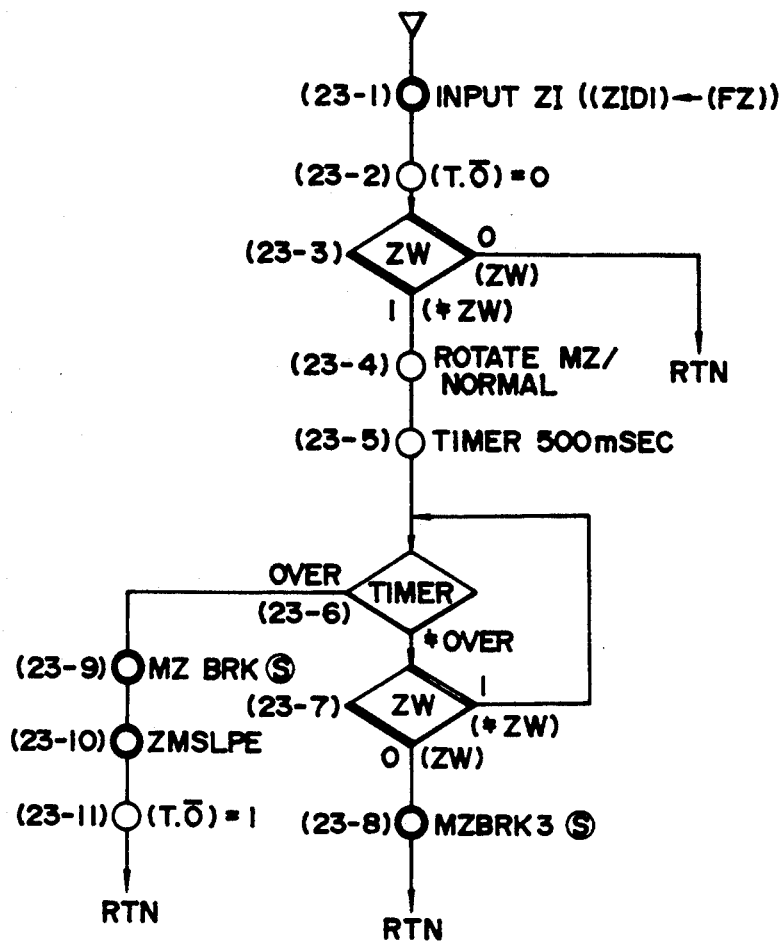

FIG. 61 shows a zoom wake sub-routine wherein focusing lens position information FZ is first inputted in ZID 1 from ZI Table (step 23 - 1). Then, flag T.O is set to '0' step 23 - 2) and thereby the state of wide angle edge position of a zoom barrel is checked by detecting the state of terminal ZW that detects zoom wide angle edge (step 23 - 3). When the detection shows '1', it is judged not to be set at a wide angle edge position, thus zoom driving motor MZ is rotated in the normal direction (step 23 - 4), a timer is set to 500 m sec and counting is started (step 23 - 5). Judgment is formed whether it is time-over or not (step 23 - 6), and when it is not time-over, the state of terminal ZW is detected (step 23 - 7). When the detection shows '0', zoom driving motor MZ is stopped (step 23 - 8). When the period of time set in step 23 - 6 is exceeded, zoom driving motor MZ is stopped (step 23 - 9), zoom sleep sub-routine is conducted (step 23 - 10) and flag T.O is set to '1' (step 23 - 11).

Figure 62:
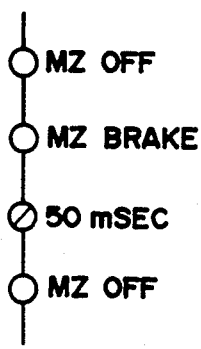
Figure 63:
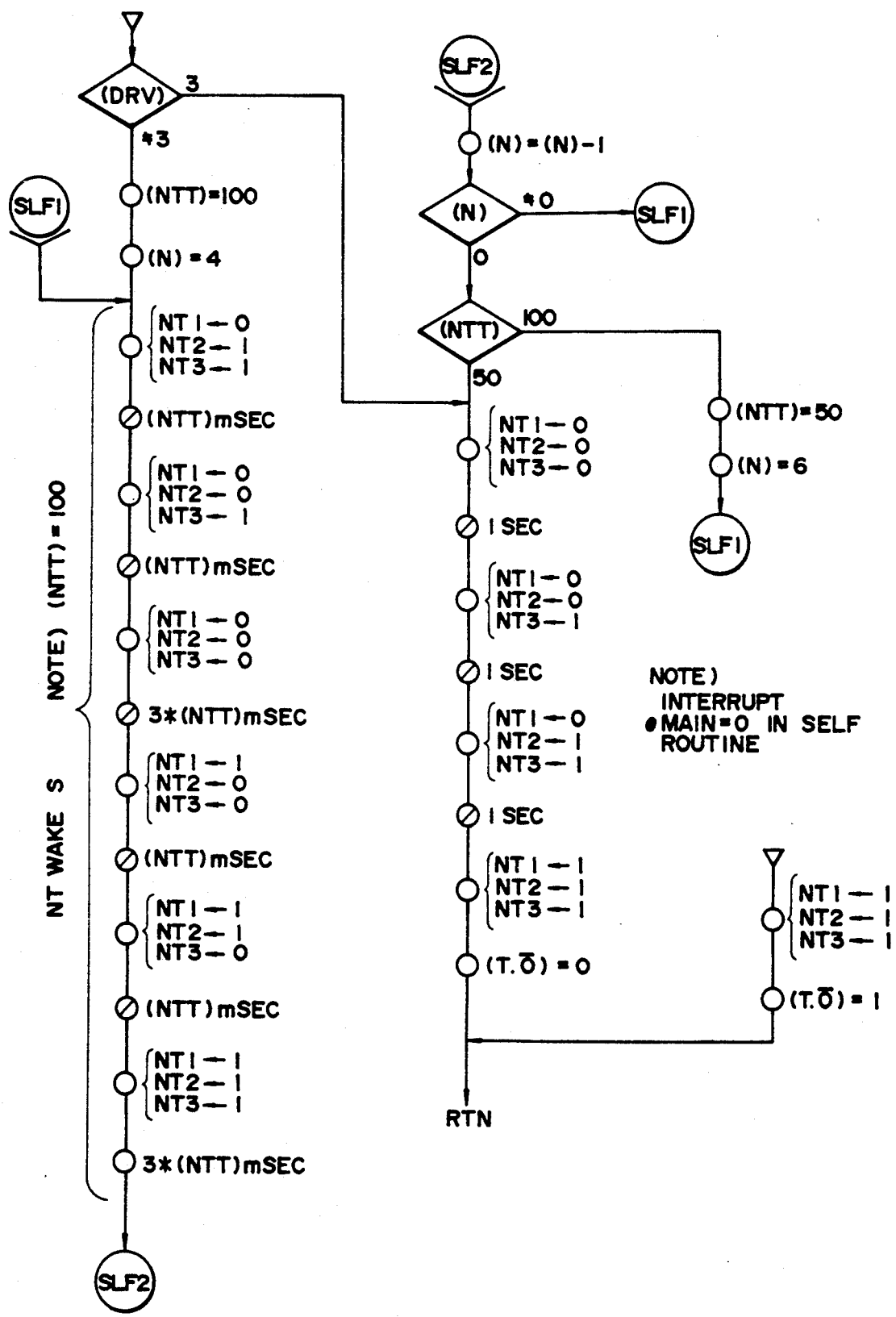

FIG. 62 shows a flow wherein zoom driving motor MZ in FIGS. 60 and 61 is stopped. FIG. 63 shows a self-timer sub-routine and the explanation of its flow will be omitted.

SUB-CPU Routine

Figure 64:
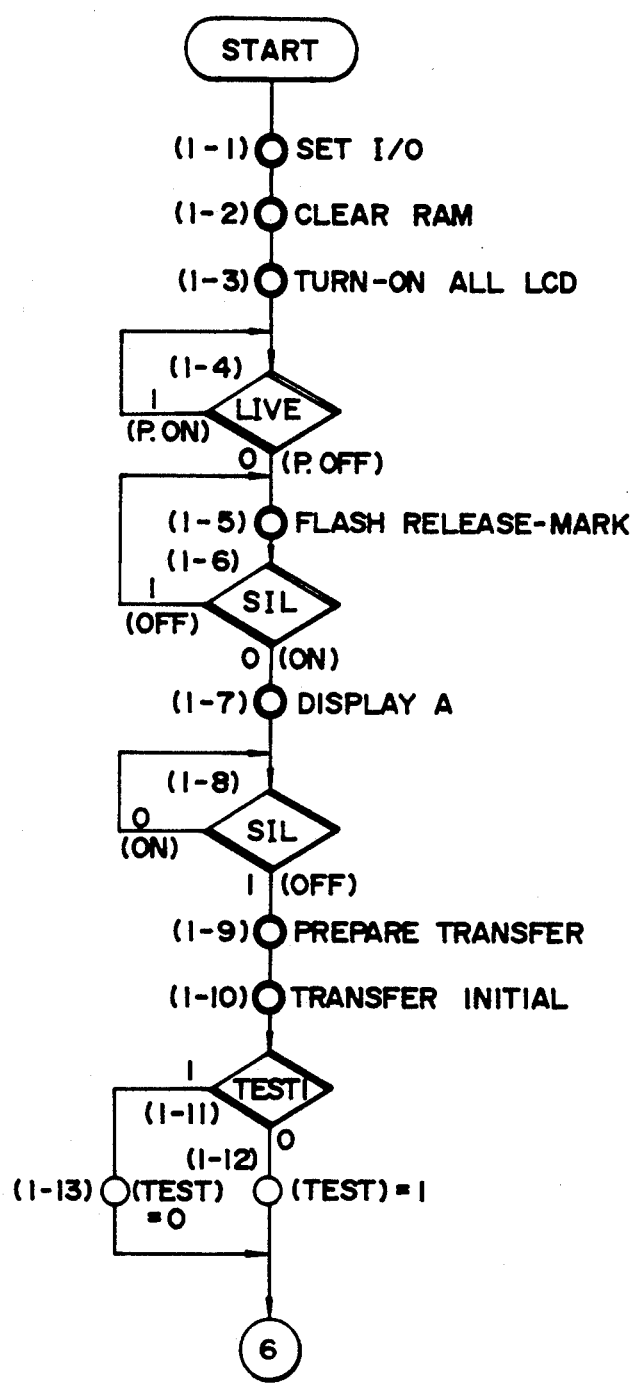

In FIG. 64, an input/output terminal is set (step 1 - 1), RAM is cleared (step 1 - 2), and external LCD and LCD in a view-finder are totally lit (step 1 - 3). Terminal LIVE is detected (step 1 - 4), and when the detection shows OFF, a release mark flickers (step 1 - 5) and terminal SIL is detected (step 1 - 6). When the first signal of release is ON, an indication such as release indication 36 shown in FIG. 7 is made (step 1 - 7). Display in step 1 - 7 represents the states of a film counter and a film, and indication of the state of the film is made by flag C. When flag C is '0', the display is put out without fail.

Terminal S1L is detected again (step 1 - 8) and when the first signal of release is OFF, preparation for the transfer from SUB-CPU 201 to MAIN-CPU 200 is made (step 1 - 9), initial transfer is conducted (step 1 - 10) and terminal TEST1 is detected (step 1 - 11). When the terminal TEST1 is detected to be '0', (TEST) is caused to be '1', (step 1 - 12), while when TEST1 is detected to be '1', (TEST) is caused to be '0' (step 1 - 13) and advances to FIG. 70.

In FIG. 70, an indication of step 1 - 7 is made (step 6 - 1), terminal PMH is caused to be 1 (step 6 - 2), each flag is cleared (step 6 - 3), and terminal LIVE is detected (step 6 - 4). When the terminal LIVE is detected to be on level L, flag MEERR is detected (step 6 - 5), and when MEERR is '1', flag MEERR is caused to be '0' and advances to 6B, while, when MEERR is '0', the step advances to FIG. 65.

In step 6 - 4, when terminal LIVE is on level H, terminal SST is detected (step 6 - 7), while, when it is on level L, information is transferred from MAIN-CPU 200 to SUB-CPU 201, and each flag is set (step 6 - 8) based on aforesaid information. Flag CHG is detected (step 6 - 9), and when film charge is conducted with '1', flag C is detected (step 6 - 10). When flag C is not '0', charging is conducted (step 6 - 11). In (step 6 - 9), when flag CHG is '0', flag REWST is detected (step 6 - 12) and when the detection shows '1', the step advances to 2A in FIG. 66, while, when the detection shows '0', flag ERR is detected (step 6 - 13). When the detection shows '1', error correction is made, while, when it is '0', flag CF is detected (step 6 - 14) and when the detection shows '1', counter display is conducted (step 6 - 15).

In step 6 - 14, when flag CF is '0', flag LCDF is detected (step 6 - 16) and when the detection shows '1', LCD display such as BC, AE and AF is made (step 6 - 17) and when the detection shows '0' flag MVF is detected (step 6 - 18) wherein when the detection shows '1', MV display is made (step 6 - 19).

In step 6 - 18, when flag MVF is '0', flag SWERR is detected (step 6 - 20), and in the case of error in the detection, error correction is made (step 6 - 21) and then terminal MAINL is detected (step 6 - 22). After that, when a main switch is turned off, SWERR is caused to be '0' (step 6 - 23) and the step advances to FIG. 65.

Figure 65A:
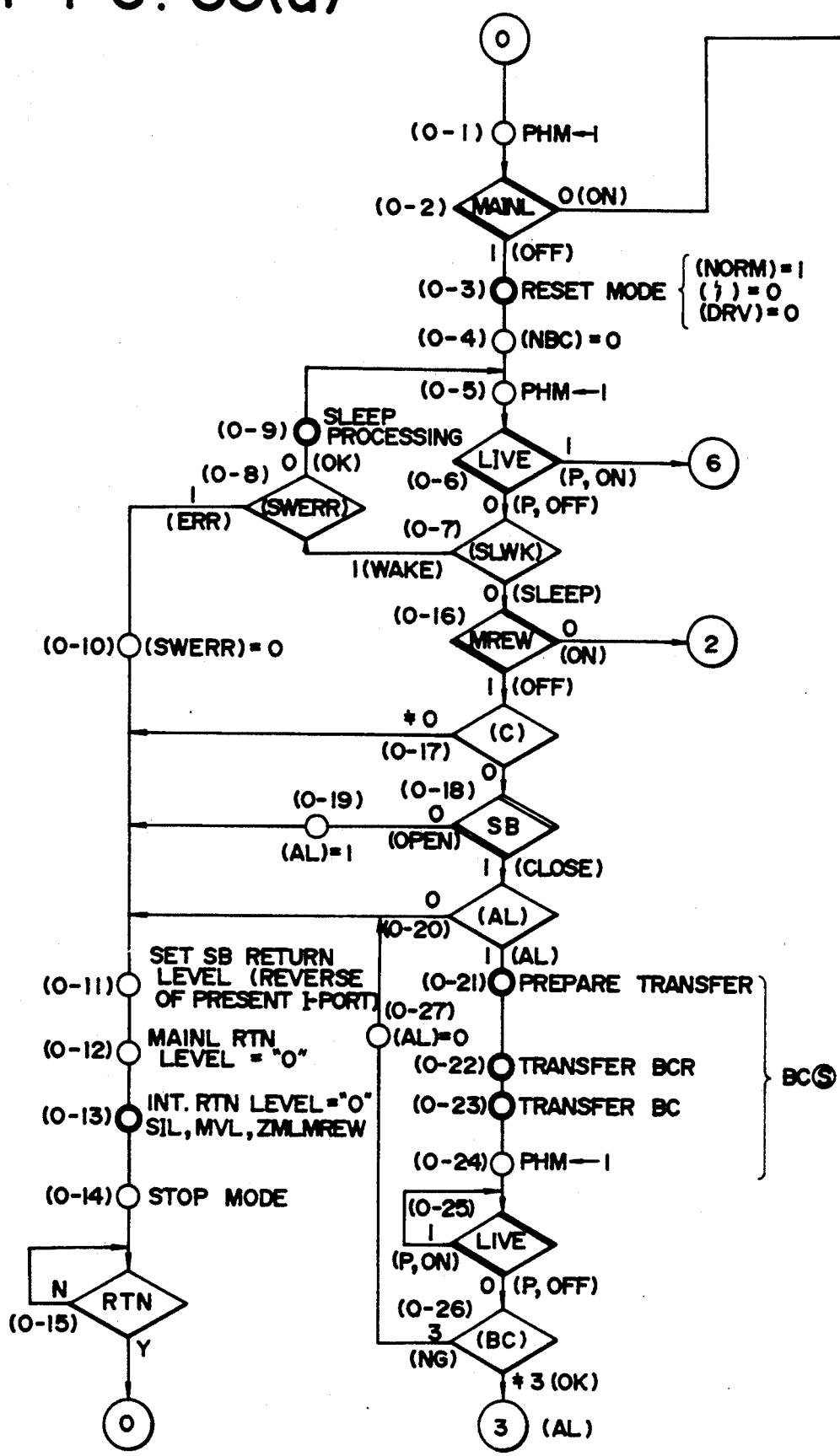
Figures 65, 65B:
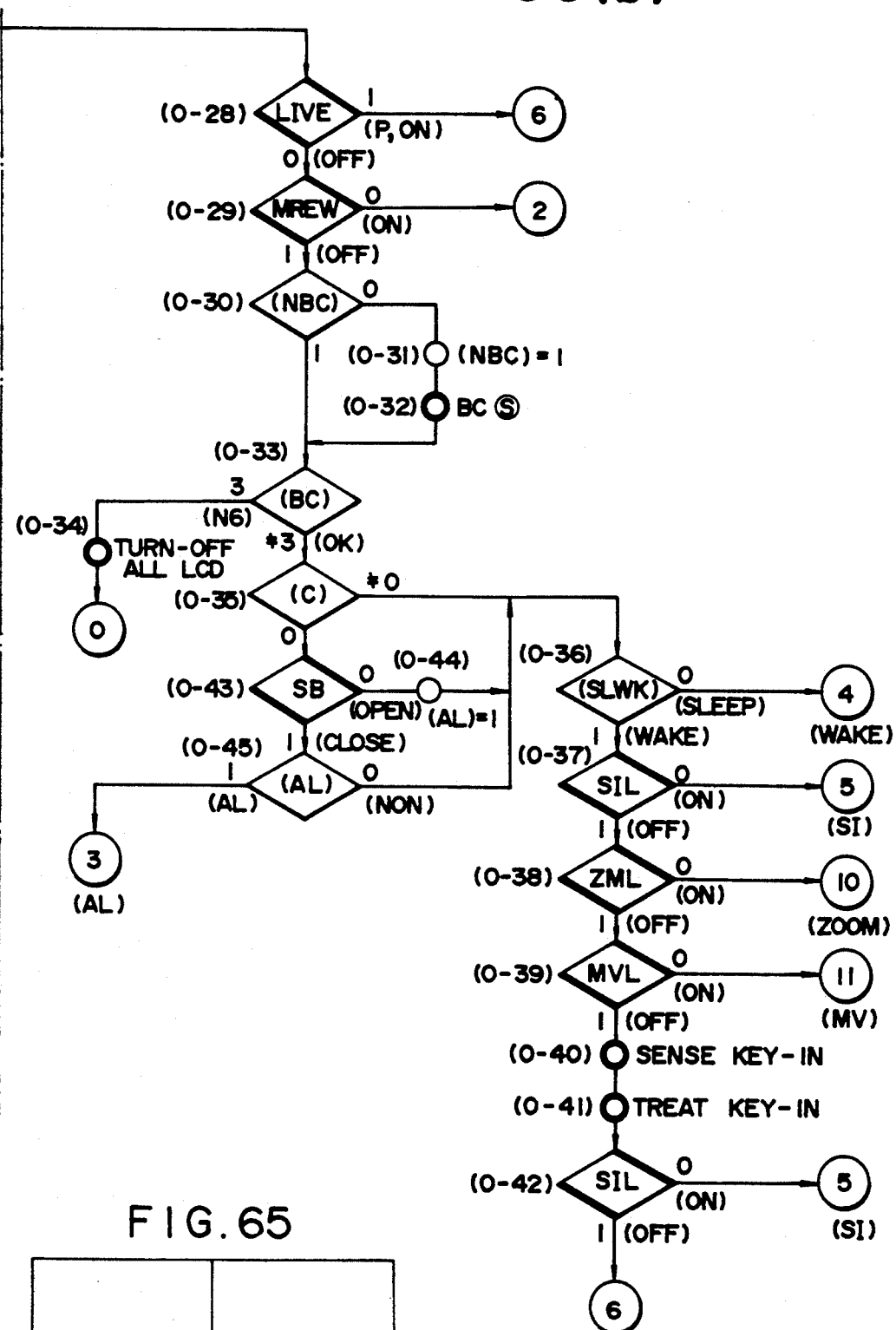

In FIG. 65, terminal PHM is caused to be on level H (step 0 - 1), terminal MAINL is detected (step 0 - 2), mode-reset is conducted when a main switch is OFF (step 0 - 3), flag NBC is caused to be '0' (step 0 - 4), terminal PHM is caused to be on level H again (step 0 - 5), terminal LIVE is detected in terms of its ON and OFF (step 0 - 6), the step advances to FIG. 70 in the case of ON, flag SLWK is detected in the case of OFF (step 7), flag SWERR is detected in the case of WAKE (step 0 - 8), sleep operation is conducted when the detection shows no error (step 0 - 9) and the step goes to step 0 - 5. In the case of error in step 0 - 8, SWERR is caused to be '0' (step 0 - 10), the level with which SUB-CPU 201 returns from STOP mode to interruption is set to be opposite to the present state of terminal SB (step 0 - 11), the level with which the terminal MAINL returns to interruption is caused to be '0' (step 0 - 12), the level with which terminals SIL, MVL, ZML and MREW return to interruption is caused to be '0' (step 0 - 13), STOP mode is executed (step 0 - 14), the levels set for returning to interruption are detected (step 0 - 15), and the state of STOP mode of SUB-CPU 201 is released to go to step 0 1 in the case of interruption returning level.

Figure 66:
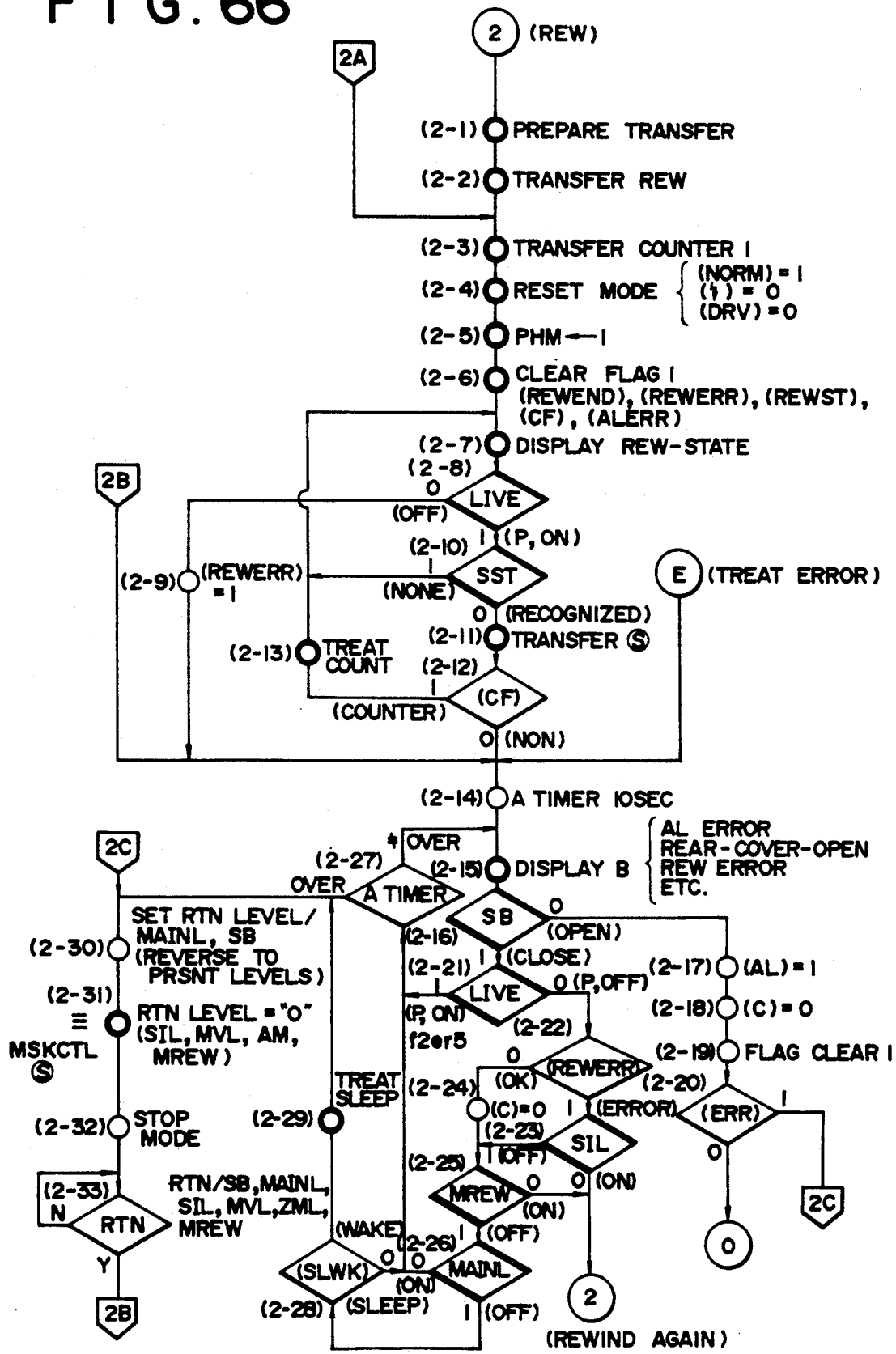

In step 0 - 7, terminal MREW is detected (step 0 - 16) in the case of SLEEP, and when the detection shows ON, the step goes to FIG. 66, while, when the detection shows OFF, flag C is detected (step 0 - 17) and when the detection shows '0', terminal SB is detected (step 0 - 18) wherein when a back lid is opened, flag AL is caused to be '1' (step 0 - 19). When the back lid is closed, flag AL is detected (step 0 - 20) and battery check is conducted during the steps from 0 - 21 to 0 - 25. Then, flag BC is detected (step 0 - 26) and when a battery shows the voltage lower than the prescribed level, flag AL is caused to be 0 (step 0 - 27) to go to step 0 - 11. When a battery shows the voltage higher than the prescribed level, the step goes to FIG. 67.

Figure 68:
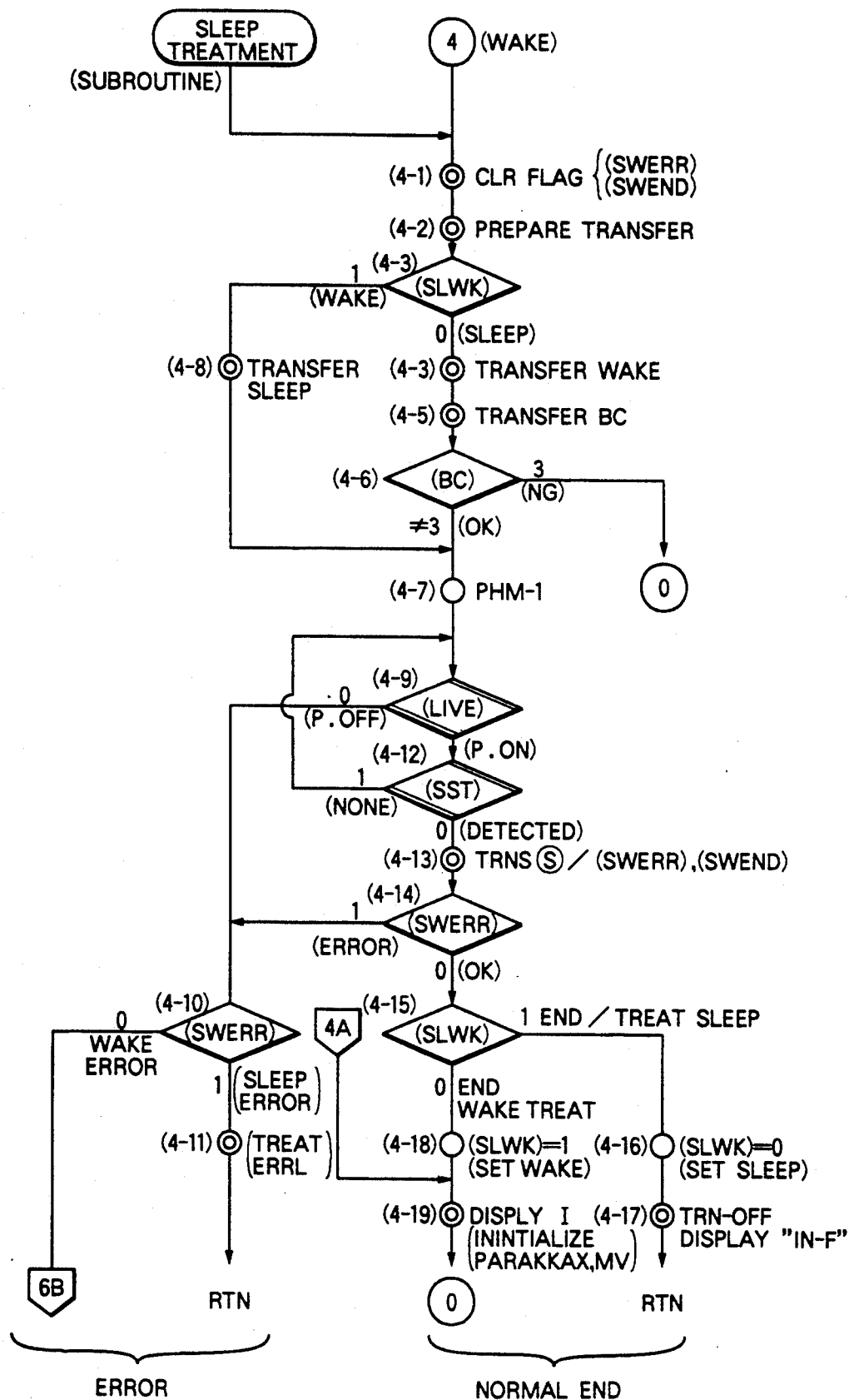

When terminal MAINL is on level L in step 0 - 2, terminal LIVE is detected (step 0 - 28), and when it is ON, the step goes to FIG. 70, while, when it is OFF, terminal MREW is detected (step 0 - 29) wherein, when it is ON, the step goes to FIG. 66, while, when it is OFF, flag NBC is detected (step 0 - 30) wherein, when it is '0', NBC is set to '1' (step 0 - 31) and battery check and information transfer are conducted (step 0 - 32) under the condition of light load such as, for example, of peripheral equipment in the non-operation state, then flag BC is detected (step 0 - 33) wherein, when a battery is equal to or lower than a prescribed voltage, the LCD's are not lit (step 0 - 34), while when the battery is higher than the prescribed voltage flag C is detected (step 0 - 35) and when the result of the detection is not '0', flag SLWK is detected (step 0 - 36) and when the detection shows SLEEP, the step goes to FIG. 68.

As stated above, the first battery-checking means checks a battery with light load when a main switch is turned on, and it is possible to detect in advance whether or not a battery voltage is on the level capable of preventing malfunctioning and runaway of an electronic control device caused by a sudden drop of battery voltage in a battery check with a heavy load of operating peripheral equipment, because battery check is conducted with a light load such as, for example, the load of equipment in non-operation state in the battery check by means of the first battery check means. Therefore, it is possible to prevent malfunctioning and runaway of an electronic control device through battery check.

Figure 69B:
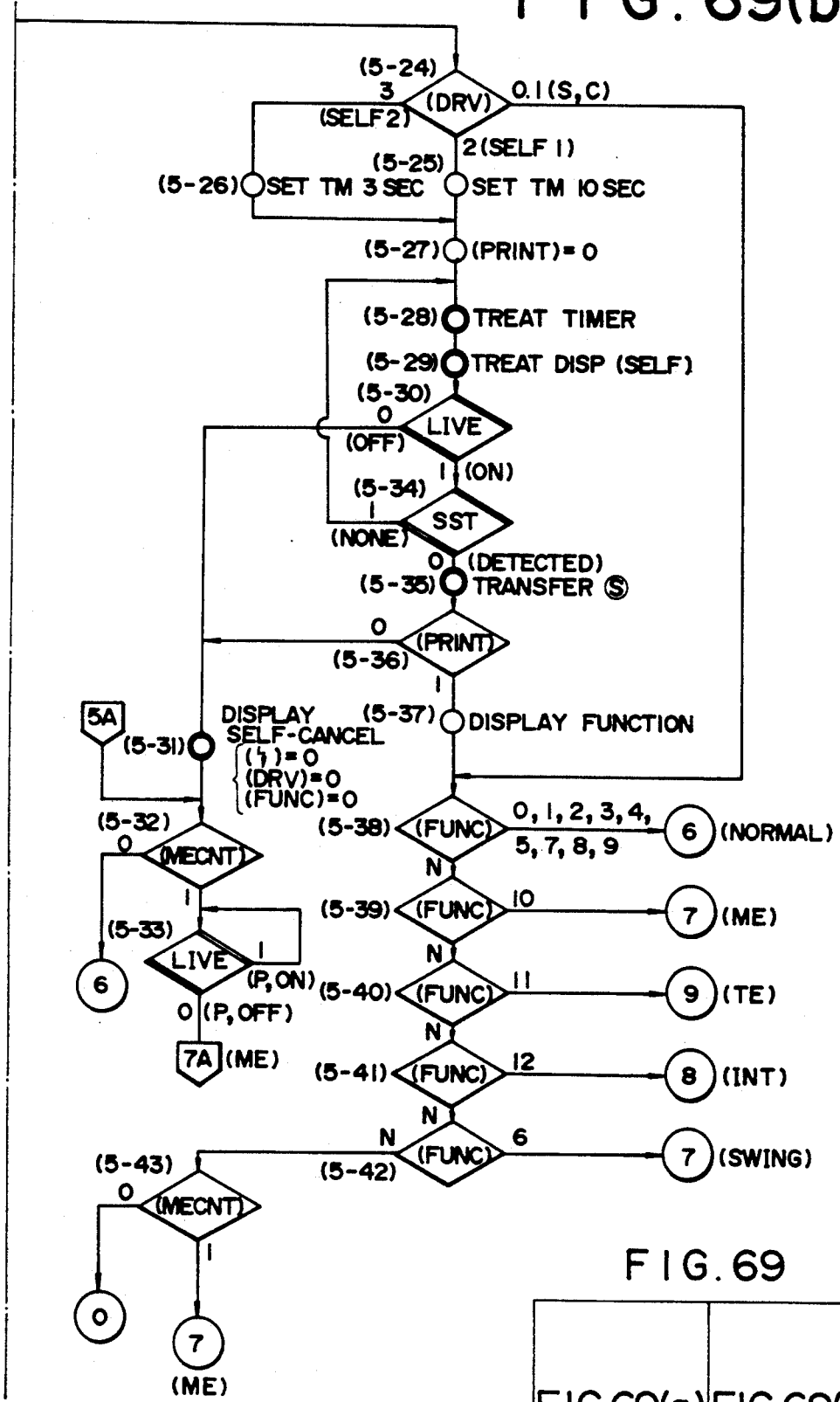
Figure 69:
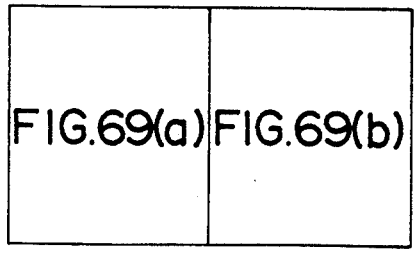
Figure 75:
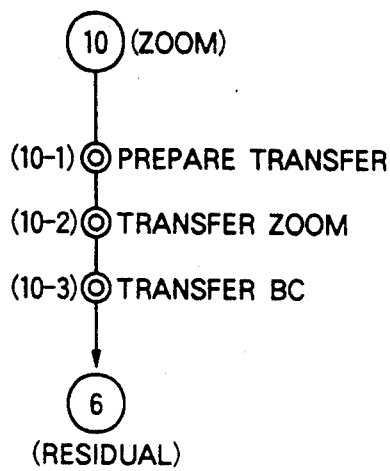

In the case of WAKE in step 0 - 36, terminal SIL is detected (step 0 - 37) and when the first signal of release is inputted, the step goes to FIG. 69, and when it is not inputted, terminal ZML is detected (step 0 - 38) and when zoom operation signals are inputted, the step goes to FIG. 75. When zoom operation signals are not inputted, terminal MVL is detected (step 0 - 39) and when MV operation signals are inputted, the step goes to FIG. 76, and when they are not inputted, Key processing are conducted at steps 40 and 41, and then terminal S1L is detected (step 0 - 42) and when the first signal of release is inputted, the step goes to FIG. 109 and when it is not inputted, the step goes to FIG. 70.

Figure 67:
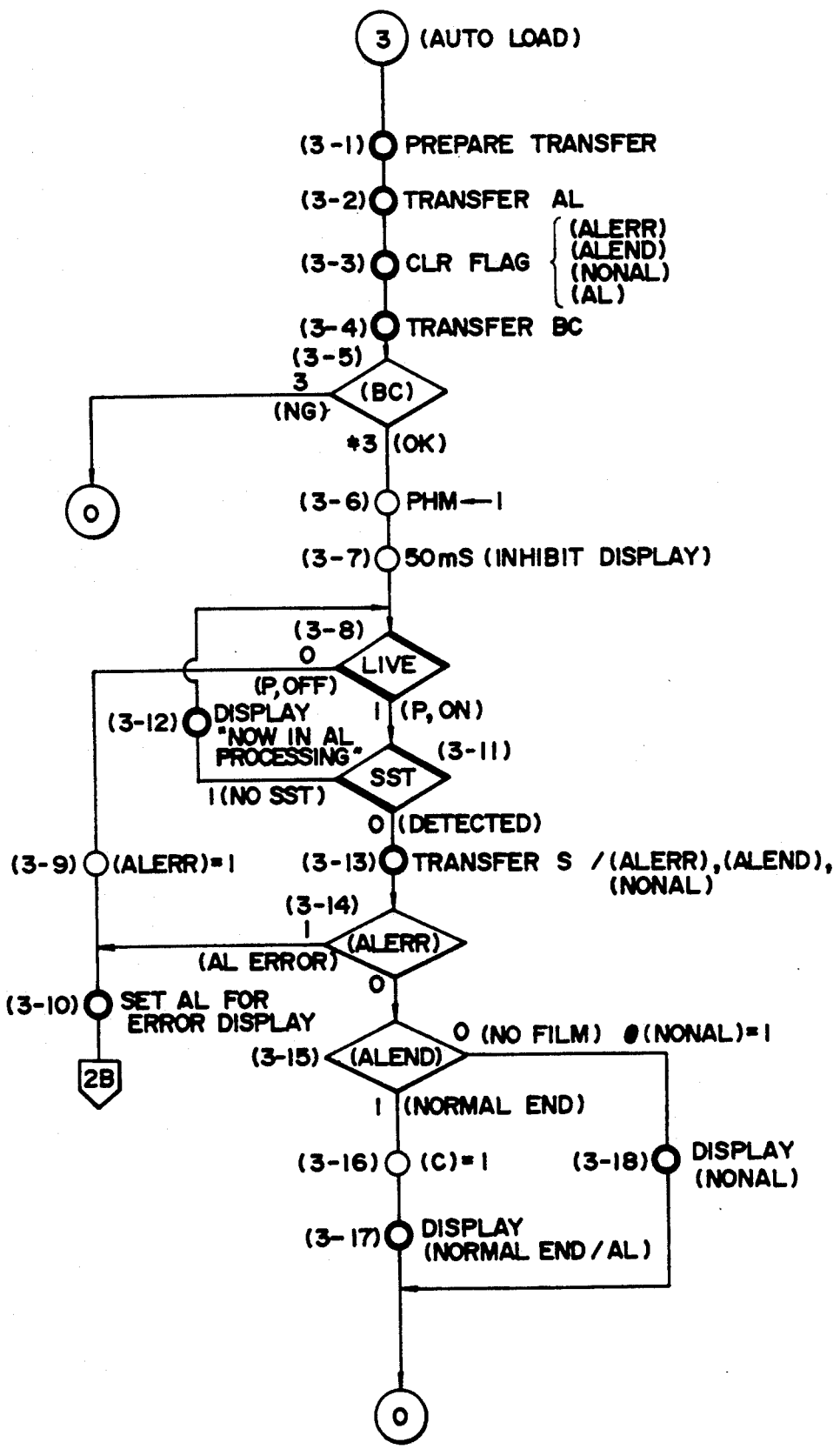

Further, in step 0 - 35, when flag C is '0', terminal SB is detected (step 0 - 43) and when the back lid is opened, flag AL is caused to be 1 (step 0 - 44) and the step goes to step 0 - 36, while, when the back lid is closed, flag AL is detected (step 0 - 45) and when the detection does not show automatic loading, the step goes to step 0 - 36, while, when automatic loading is shown, the step goes to FIG. 67.

In FIG. 66, transfer preparation is conducted (step 2 - 1), REW transfer is conducted from SUB-CPU 201 to MAIN-CPU 200 (step 2 - 2), counter 1 transfer is conducted (step 2 - 3), and mode resetting is conducted (step 2 - 4). Terminal PHM is caused to be on level H (step 2 - 5), and each flag is cleared (step 2 - 6). Display of 'in process of rewinding' is indicated (step 2 - 7), terminal LIVE is detected (step 2 - 8) and when MAIN-CPU power monitor is OFF, flag REWERR is caused to be 1 (step 2 - 9), while, when MAIN-CPU power monitor is ON in step 2 - 8, terminal SST is detected (step 2 - 10) and when SST is Yes, counter transfer is conducted from MAIN-CPU 200 to SUB-CPU 201 (step 2 - 11) and then flag CF is detected (step 2 - 12) wherein, when the detection shows '1', counter processing is conducted (step 2 - 13) and goes to step 2 - 7, while, when '0' is shown, A timer is set to 10 sec for starting (step 2 - 14) and display shown in FIG. 7 is indicated and indications of AL error 32 and back lid open 31 in FIG. 7 are caused to flicker (step 2 - 15).

Terminal SB is detected (step 2 - 16), and when the back lid is opened, flag AL is caused to be 1 (step 2 - 17), flag C is caused to be 0 (step 2 - 18), flags are totally cleared (step 2 - 19) and flag ERR is detected (step 2 - 20), and in the case of error the step goes to step 2 - 30, while, when there is no error, the step goes to FIG. 65.

When the back lid is closed in step 2 - 16, terminal LIVE is detected (step 2 - 21) and when MAIN-CPU power monitor is OFF, flag REWERR is detected (step 2 - 22) and in the case of an error, terminal SIL is detected (step 2 - 23), while, when the first signal is ON, the step goes to step 2 - 1 for another rewind processing.

In step 2 - 22 wherein REWERR is detected, when the detection does not show an error, flag C is caused to be 0 (step 2 - 24) and terminal MREW is detected (step 2 - 25) wherein when the detection shows ON, the step goes to step 2 - 1, while, when the detection shows OFF, terminal MAINL is detected (step 2 26) wherein when a main switch is ON, the step keeps going to step 2 - 15 until A timer shows time-over, and after the time-over, the step goes to step 2 - 30.

Interruption return levels for terminals MAINL and SB are set (step 2 - 30), interruption return levels of terminals S1L, MVL, ZML and MREW are caused to be '0' (step 2 - 31), STOP mode is executed (step 2 - 32) and interruption return which has been set is detected (step 2 - 33), and when the detection shows the interruption return level, STOP mode of SUB-CPU 201 is released and the step goes to step 2 - 14.

In FIG. 67, transfer preparation is conducted (step 3 - 1), AL transfer from SUB-CPU 201 to MAIN-CPU 200 is conducted (step 3 - 2), each flag is cleared (step 3 - 3) and BC transfer is conducted (step 3 - 4). Flag BC is detected (step 3 - 5) and when the battery voltage is not higher than the predetermined voltage, the step goes to FIG. 65, which forms the second battery checking means, and when the battery voltage is not lower than the predetermined voltage, terminal PHM is caused to be on level H (step 3 - 6), 50 m sec is set (step 3 - 7) and no indication is made during automatic loading in NONAL.

The second battery checking means performs, after a light-load battery check, a heavy load battery check with peripheral equipments in operation, and this second battery checking means is constituted so that a battery may be checked with a heavy load of electrification for driving shutter blades to be closed. Since a battery check with a heavy load is made by means of the second battery checking means after a battery check with a light load by means of the first battery checking means as stated above, when the voltage supplied by a battery is equal to or lower than the predetermined voltage in a battery check by means of the first battery checking means, an operation of an electronic control device can be stopped, thus it is possible to prevent the electronic control device from running into malfunction and runaway.

Further, since the second battery checking means is constituted so that it may check a battery with a heavy load of electrification for driving shutter blades to be closed, a camera does not operate during the course of a battery check and an electric current of a certain level can flow, thus, it is possible to detect voltage of the power supply simply and accurately.

Terminal LIVE is detected (step 3 - 8), flag ALERR is caused to be 1 (step 3 - 9) when MAIN-CPU power monitor is OFF, automatic erroneous indication is set, and the step goes to FIG. 66 2(B), and when MAIN-CPU power monitor is ON in step 3 - 8, terminal SST is detected (step 3 - 11) and when SST is NO, 'In Process of Automatic Loading' is indicated (step 3 - 12) and the step goes to step 3 - 8, while when SST is Y, serial transfer from MAIN-CPU 200 to SUB-CPU 201 (AL completion, NONAL transfer or AL error transfer) is conducted (step 3 - 13). Flag ALERR is detected (step 3 - 14) and when the detection shows an automatic load error, the step goes to step 3 - 10 and when it is not an error, flag ALEND is detected (step 3 - 15) and when an automatic loading is completed normally, flag C is caused to be 1 (step 3 - 16) and 'Normal Completion of Automatic Loading' is indicated (step 3 - 17), while in step 3 - 15, when no film is loaded, it is indicated that no automatic loading is conducted (step 3 - 18).

In FIG. 68, flag clearance (SWERR and SWEND) is conducted (step 4 - 1), transfer preparation is made (step 4 - 2), flag SLWK is detected (step 4 - 3) and WAKE transfer is conducted (step 4 - 4) in the case of SLEEP (the state of main switch OFF), and then BC transfer is conducted (step 4 - 5). Flag BC is detected (step 4 - 6) and when the battery voltage is not higher than the predetermined voltage in checking by means of the second battery checking means, the step goes to FIG. 65, while in the case of the battery voltage not lower than the predetermined voltage, terminal PHM is caused to be level H (step 4 - 7). In the case of WAKE (the state of main switch ON) in step 4 - 3, SLEEP transfer is conducted (step 4 - 8) to go to step 4 - 7. Terminal LIVE is detected (step 4 - 9) and when MAIN-CPU power monitor is OFF, flag SLWK is detected (step 4 - 10) and when the detection shows WAKE FAULT, the step goes to FIG. 70 6B, while in the case of SLEEP FAULT, error processing is conducted (step 4 - 11) for returning. In step 4 - 9, when MAIN-CPU power monitor is ON, terminal SST is detected (step 4 - 12), and when SST is NO, the step goes to step 4 - 9, while when SST IS Y, SW completion transfer from MAIN-CPU 200 to SUB-CPU 201 or SW error transfer is conducted (step 4 - 13). Flag SWERR is detected (step 4 - 14) and in the case of an error, the step goes to step 4 - 10, while when the detection does not show an error, flag SLWK is detected (step 4 - 15) and in the case of SLEEP processing completion, flag SLWK is caused to be 0, SLEEP setting is conducted (step 4 - 16), and a display in a view-finder is put out (step 4 - 17) for returning. In the case of WAKE processing completion in step 4 - 15, flag SLWK is caused to be 1, WAKE setting is made (step 4 - 18), a display I in FIG. 122 which is initialized for compensation of moving target and parallax is conducted (step 4 - 19), and the step goes to FIG. 65.

In FIG. 69, transfer preparation is made (step 5 - 1) and flag TEST is detected (step 5 - 2) wherein in the case of '1', the step goes to a test mode, while in the case of '0', S1 transfer is conducted (step 5 - 3), terminal PHM is caused to be on level H (step 5 - 4) and BC transfer is conducted (step 5 - 5). Flag BC is detected (step 5 - 6) and when a battery shows its voltage not higher than the predetermined voltage in checking by means of the second battery checking means, the step goes to step 5 - 32, while when the voltage of the battery is not lower than the predetermined value, set transfer is conducted in step 5 - 7 through step 5 - 10, flag BC is detected (step 5 - 11) and flag BC is detected again, and when the voltage is not higher than the predetermined value, flag FUNC is detected (step 5 - 12), while in the case of an interval mode of function, the step goes to step 5 - 35, and in the case of another mode, it goes to step 5 - 13. In the case of the voltage not lower than the predetermined value, the remaining amount is indicated according to battery indication 34 in FIG. 7 (step 5 - 13).

Terminal LIVE is detected (step 5 - 14) and when MAIN-CPU power monitor is OFF, the step goes to step 5 - 35, while when MAIN-CPU power monitor is ON in step 5 - 14, terminal SST is detected (step 5 - 15), and when SST is NO, the step goes to step 5 - 13, while when SST is Y, transfers of AE, AF, PRINT, ERR, MEWORK, MV, PARA, TESTD and SWERR are conducted (step 5 - 16), an error judge is made (step 5 - 17) and flag ST is detected (step 5 - 18) and when the detection shows '1', the step goes to FIG. 70 6A. When flag ST is 0, flag PRINT is detected (step 5 - 19) and when the detection shows '0', flag MEWORK is detected (step 5 - 20) and when the detection shows '1', the step goes to FIG. 71, while in the case of '0', flag TESTD is detected (step 5 - 21) and when the detection shows '0', the step goes to step 5 - 13, while in the case of '1', flag TEST transfer is conducted (step 5 - 22) and flag TESTD is caused to be '0' for going to step 5 - 13.

In the case of '1' in step 5 - 19, flag DRV is detected (step 5 - 24), and when the detection shows '0' or '1', the step goes to step 5 - 38 with single photographing or continuous photographing respectively, when the detection shows '2', 10 sec is set on a timer by self 1 (step 5 - 25), and in the case of '3', 3 sec is set on a timer by self 2 (step 5 - 26). After these settings, flag PRINT is caused to be 0 (step 5 - 27) and timer processing is conducted (step 5 - 28) and indication processing is executed (step 5 - 29).

Terminal LIVE is detected (step 5 - 30) and when MAIN-CPU power monitor is OFF, indication of self-cancel is conducted (step 5 - 31), and flag MECNT is detected (step 5 - 32). When the detection shows '0', the step goes to FIG. 70 and when it is '1', terminal LIVE is detected (step 5 - 33) and when MAIN-CPU power monitor is OFF, the step goes to FIG. 71. When MAIN-CPU power monitor is ON in step 5 - 30, terminal SST is detected (step 5 - 34) and when SST is NO, the step goes to step 5 - 28, and when it is Y, the transfer is conducted (step 5 - 35) and flag PRINT is detected (step 5 - 36) wherein when the detection shows '0', the step goes to step 5 - 31, while when the detection shows '1', function indication is conducted (step 5 - 37).

Figure 71:
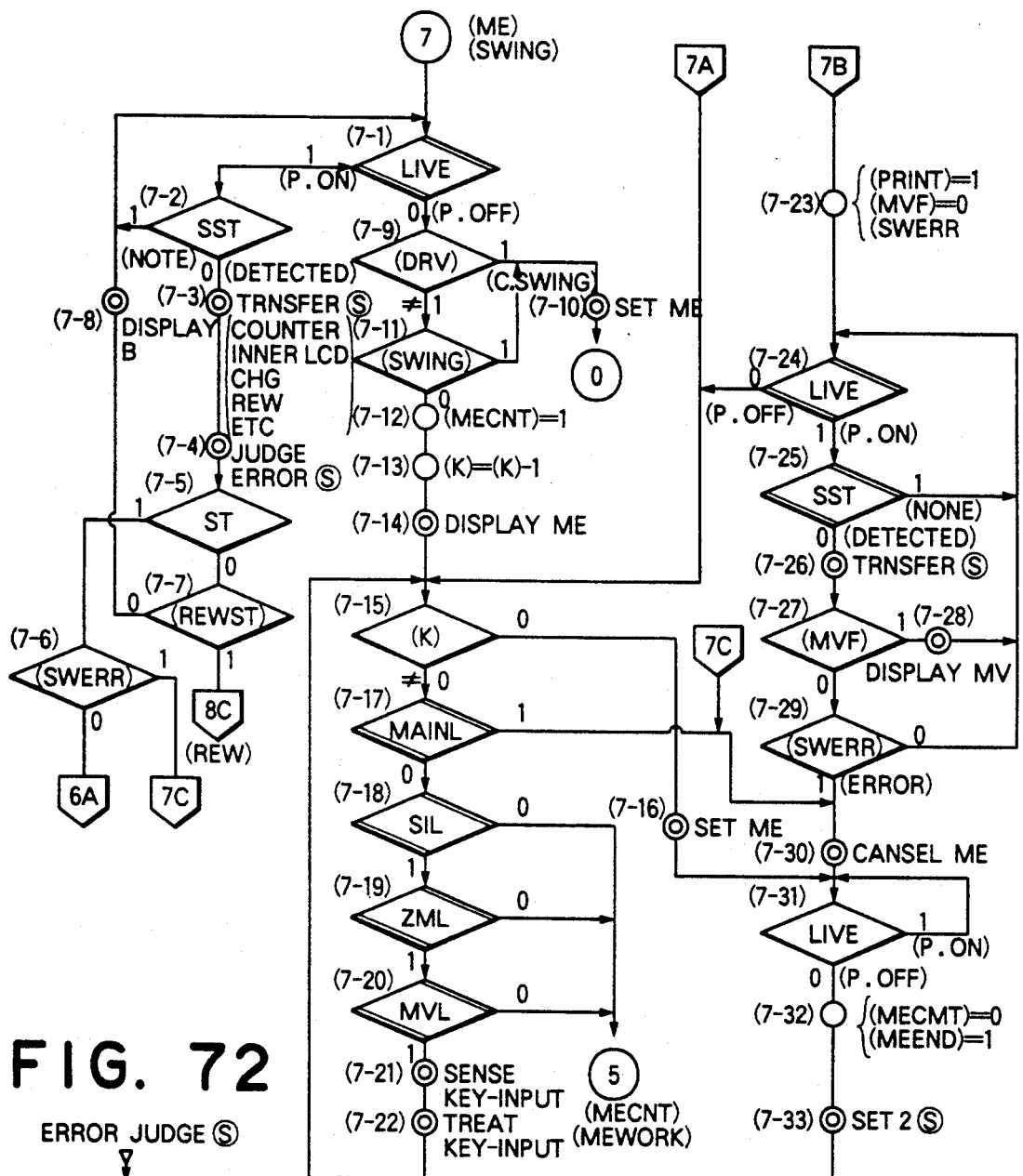
Figure 73:
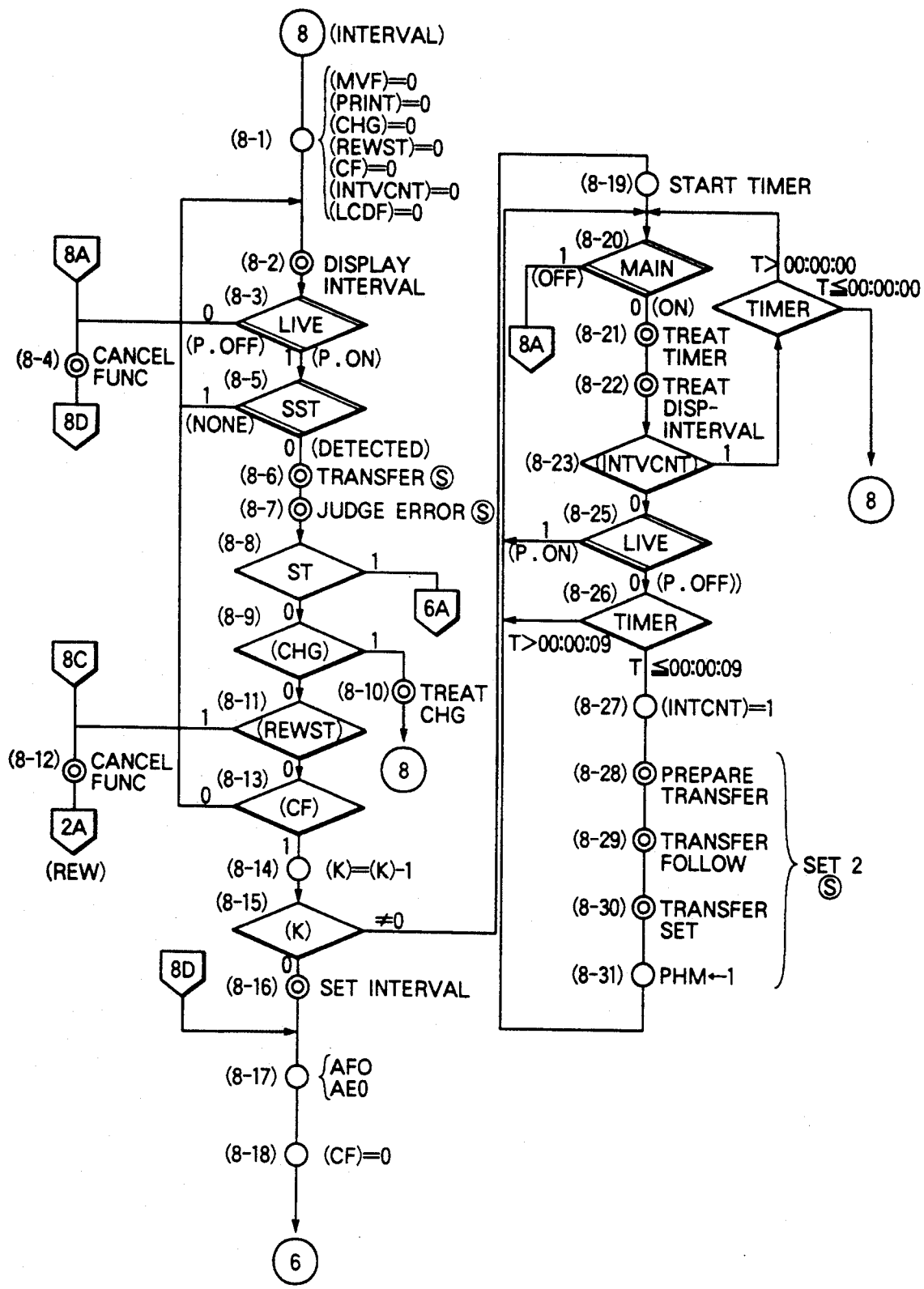
Figure 74:
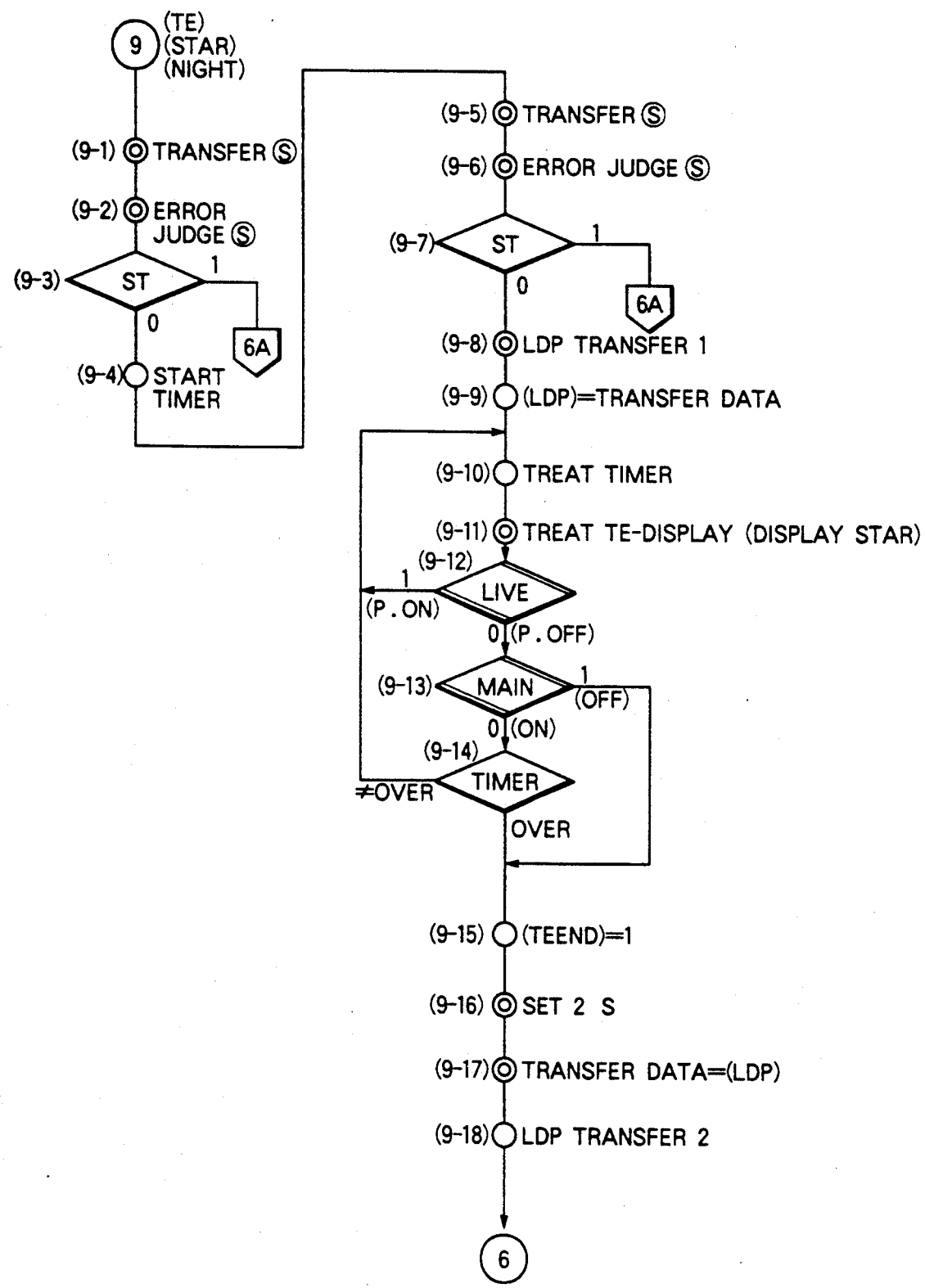

In the detection of flag FUNC in steps 38 through 42, when the detection shows '0 - 5, 7, 8 and 9', the step goes to FIG. 70, while in the case of '10', the step goes to FIG. 71, in the case of '11', step goes to FIG. 74, in the case of '12', the step goes to FIG. 73 and in the case of '6', the step goes to FIG. 71. When the detection shows numbers other than the foregoing, flag MECNT is detected (step 5 - 43) and when the detection shows '0', the step goes to FIG. 65, while when '1' is shown in the detection, the step goes to FIG. 71.

Figure 72:
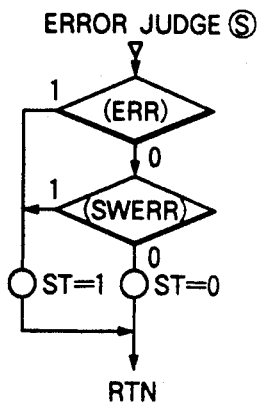

In FIG. 71, terminal LIVE is detected (step 7 - 1) and when MAIN-CPU power monitor is ON, flag SST is detected (step 7- 2) and when the detection shows '0', transfer is conducted (step 7 - 3), error judge is conducted (step 7 - 4), and flag ST is detected (step 7 - 5) wherein when the detection shows '1', flag SWERR is detected (step 7 - 6), while when it is '0', the step goes to FIG. 70 and when the detection shows '1', the step goes to step 7 - 28. A routine in error judgment in step 7 - 4 is shown in FIG. 72.

In the case of '0' in step 7 - 5, flag REWST is detected (step 7 - 7) and when the detection shows '1', the step goes to FIG. 73, while when the detection shows '0', indication B is conducted (step 7 - 8) for advancing to step 7 - 1.

When MAIN-CPU power monitor is OFF in step 7 - 1, flag DRV is detected (step 7 - 9) and when detection shows continuous photographing with '1' and SWING in a swing mode, ME resetting is conducted (step 7 - 10) and the step goes to FIG. 65, while the detection does not show '1', flag SWING is detected (step 7 - 11). In the case of '1' in step 7 - 11, the step goes to step 7 - 10, while in the case of '0', processings of steps 7 - 12 and 7 - 13 are conducted and ME indication processing is conducted (step 7 - 14).

Flag K is detected (step 7 - 15) and when the detection shows '0', ME resetting id conducted (step 7 - 16) and then the step goes to step 7 - 31, while when detection does not show '0', terminal MAINL is detected (step 7 - 17) wherein when the detection shows level H, the step goes to step 7 - 30, while when the detection shows level L, terminal SIL is detected (step 7 - 18) and then terminal ZML is detected (step 7 - 19) in the case of level H wherein when the detection shows level H, terminal MVL is detected (step 7 - 20) and then processings of steps 21 and 22 are conducted in the case of level H to go to step 7 - 15. In the case of level L in the steps 18 - 20, the step goes to FIG. 69.

In step 7 - 23, flags PRINT, MVF and SWERR are cleared, and then terminal LIVE is detected (step 7 - 24) wherein when MAIN-CPU power monitor is OFF, the step goes to step 7 - 15, while when it is ON, flag SST is detected (step 7 - 25) wherein when the detection shows '1', the step goes to step 7 - 24, while when '0' is shown, transfer is conducted (step 7 - 26). Terminal MVF is detected (step 7 - 27) wherein when '1' is shown, MV display processing is conducted (step 7 - 28) to go to step 7 - 24, while when '0' is shown, SWERR is detected (step 7 - 29) wherein when '0' is shown, the step goes to step 7 - 24, while when error of '1' is shown, ME is released (step 7 - 30) and then LIVE is detected (step 7 - 31) wherein when MAIN-CPU power monitor is OFF, flag MECNT is caused to be 0 and flag MEEND is caused to be 1 (step 7 - 32). Then, transfer preparation, follow transfer and setting for causing set transfer flag PHM to be 1 are conducted (step 7 - 33) and then SWERR is detected (step 7 - 34) and flag MEERR is caused to be 1 (step 7 - 35) to go to FIG. 70.

In FIG. 73, flags MVF, PRINT, CHG, REWST, CF, INTVCNT and LCDF are cleared (step 8 - 1), interval indication is conducted (step 8 - 2) and then terminal LIVE is detected (step 8 - 3). When the detection in step 8 - 3 shows that MAIN-CPU power monitor is OFF, FUNC is released (step 8 - 4) to go to step 8 - 17, while when the detection shows that MAIN-CPU power monitor is ON, terminal SST is detected (step 8 - 5) wherein when SST is NO, the step goes to step 8 - 2, while when SST is Y, transfer is conducted (step 8 - 6), error judge is conducted (step 89 - 7) and then flag ST is detected (step 8 - 8). When '1' is shown in step 8 - 8, the step goes to FIG. 70, while when '0' is shown, flag CHG is detected (step 8 - 9) wherein when '1' is shown, CHG processing of film charging is conducted (step 8 - 10) to go to step 8 - 1, while when '0' is shown, flag REWST is detected (step 8 - 11). When '1' is shown in step 8 - 11, FUNC is released (step 8 - 12) to go to FIG. 66, while when '0' is shown, flag CF is detected (step 8 - 13). When '0' is shown in step 8 - 13, the step goes to step 8 - 2, while when '1' is shown, K is caused to be K-1 (step 8 - 14) and then K is detected (step 8 - 15). When '0' is shown in step 8 - 15, interval resetting is conducted (step 8 - 16) and then AF indication and AE indication both in a range-finder are cleared (step 8 - 17) and flag CF is caused to be 0 (step 8 - 18) to go to FIG. 70.

When K is not '0' in step 8 - 15, timer setting is conducted (step 8 - 19) and terminal MAIN is detected (step 8 - 20) wherein when '1' is shown and a main switch is OFF, the step goes to step 8 - 4, while when '0' is shown and a main switch is ON, timer processing is conducted (step 8 - 21), interval indication processing is conducted (step 8 - 22) and then flag INTVCNT is detected (step 8 - 23). When '1' is shown in step 8 - 23, timer judgment is conducted in step 8 - 24 wherein when the value not longer than the set period of time is shown, the step goes to step 8 - 1, while when the value not shorter than time set is shown, the step goes to step 8 - 20.

When flag INTVCNT is '0' in step 8 - 23, terminal LIVE is detected (step 8 - 25) wherein when MAIN-CPU power monitor is OFF, timer judgment is made in step 8 - 26 wherein when the judgment shows what is not more than the set period of time, flag INTVCNT is caused to be 1 (step 8 - 27) and then settings are conducted in steps 8 - 28 through 8 - 31 to go to step 8 - 20.

In FIG. 74, TE transfers are conducted in steps 9 - 1 through 9 - 3 during which, when conditions are normal, PRINT transfer is received, and then a timer is started (step 9 - 4) to conduct TE transfers again in steps 9 - 5 through 9 - 7. Then, processings in steps 9 - 8 and 9 - 9 are made, timer processing is made (step 9 - 10), TE indication processing is made (step 9 - 11) and terminal LIVE is detected (step 9 - 12) wherein when MAIN-CPU power monitor is OFF, terminal MAIN is detected in step 9 - 13 (step 9 - 13). In the case of time-over in step 9 - 14, processings in steps 9 - 15 through 9 - 18 are conducted to go to FIG. 70.

In FIG. 75, transfer preparation (step 10 - 1), zoom transfer (step 10 - 2) and BC transfer (step 10 - 3) are conducted to go to FIG. 70.

Figure 76:
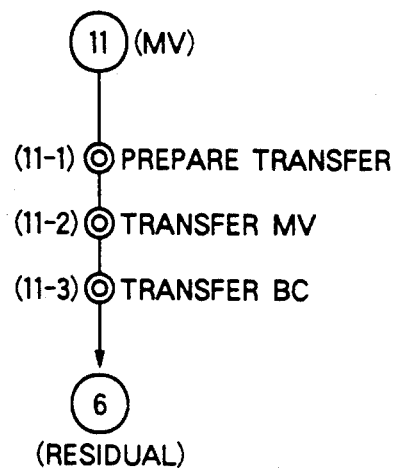
Figure 77:
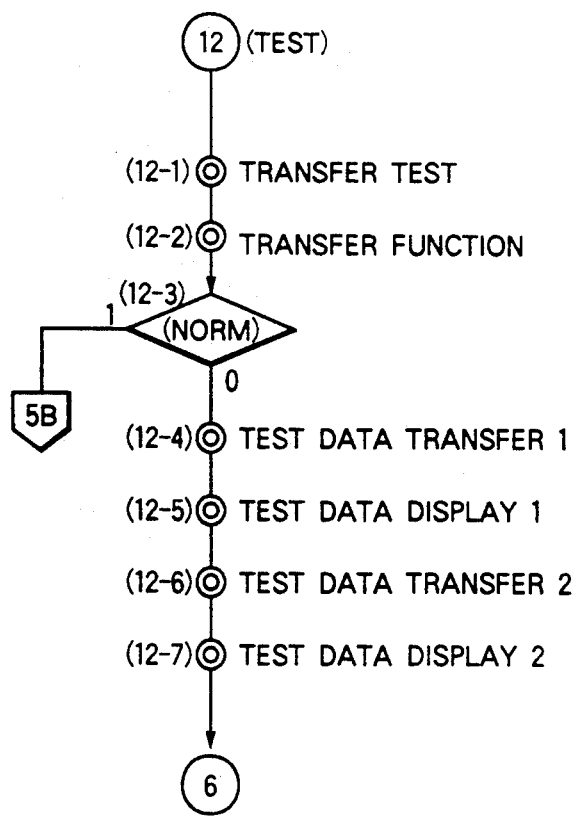

In FIG. 76, transfer preparation (step 11 - 1), MV transfer (step 11 - 2) and BC transfer (step 11 - 3) are conducted to go to FIG. 70.

Transfer Preparation Sub-Routine

Figure 78:
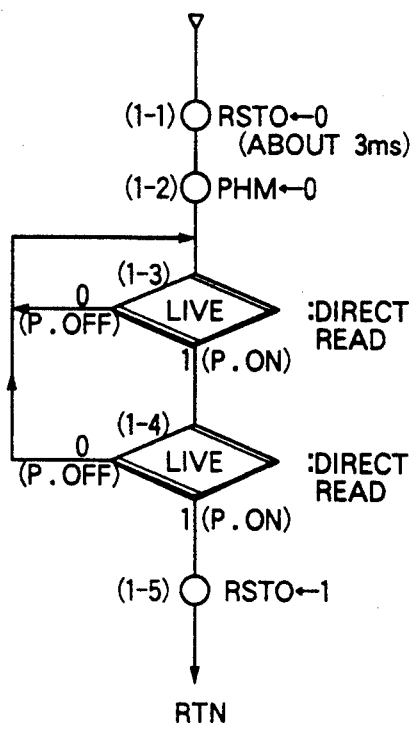

In the transfer preparation, as shown in FIG. 78, terminal RSTO is caused to be level L (step 1 - 1), terminal PHM is caused to be level L (step 1 - 2) and direct reading is conducted in steps 1 - 3 and 1 - 4, and then terminal RSTO is caused to be level H (step 1 - 5) for returning.

As described above, in the present invention, the display position of the range finding direction of the view-finder is set according to the focal distance information of the zoom lens and the positional information of the range finding direction. Accordingly, when the range finding point is changed by changing the range finding direction, it is possible to make the display position of the range finding direction of the view-finder agree with the range finding direction position of the range finding device, so that the variation of the range finding point can be prevented by changing the focal distance to the telephotography side or the wide-angle photography side.

Especially, in the case of telephotography, the field angle becomes large, so that the range finding outside the field angle can be prevented.

What is claimed is:

1. A camera comprising
   a zoom lens, having an optical axis, for altering the magnification of a photographic image of an object by alteration of the focal length of said lens;
   a view finder for displaying an object image corresponding to said photographic image, said view finder altering the magnification of said object image in said view finder in accordance with the magnification of said photographic image;
   a detector for detecting the focal length of the zoom lens to obtain focal length information;
   a device for measuring an object distance in a distance measuring direction to obtain object distance information;
   a shifter for shifting said distance measuring direction toward a target in said photographic image;
   an element for measuring the distance measuring direction to obtain shift angle information, said shift information representing an angle between said distance measuring direction and said optical axis; and
   a display for indicating said distance measuring direction overlapped on said object image based on said shift information and said focal length information.

2. The camera of claim 1 wherein said display calculates a display position of said target portion in said view finder and visually indicates the position of said display whereby said display locks on an image of said target portion regardless of movement of said image of said target portion in said view finder caused by a change in said magnification.

3. The camera of claim 1 wherein said display comprises:
   an array of indicator segments disposed in said view finder; and
   a selector for selecting an indicator segment which is nearest to said position of said display of said target portion in said view finder; and
   a driver for activating said selected indicator segment.

4. The camera of claim 3 wherein said selector selects said indicator segment based on said shift angle information and said focal length information whereby a selected said indicator segment, by activation thereof, visually indicates the position of said target portion in said view finder overlapped on said object image.

5. The camera of claim 3 wherein said driver further comprises a memory for storing reference data in a data table for the selection of said indicator segment, said selector selecting said indicator segment based on said focal length information and said distance measuring direction using said reference data.

6. The camera of claim 1 wherein said display comprises a liquid crystal cell.

* * * * *